(12) United States Patent
Sheykh-Zade et al.

(10) Patent No.: US 9,978,034 B1
(45) Date of Patent: *May 22, 2018

(54) SYSTEMS AND METHODS INVOLVING FEATURES OF TERMINAL OPERATION

(71) Applicant: Ports America Group, Inc., Jersey City, NJ (US)

(72) Inventors: Irina Sheykh-Zade, San Ramon, CA (US); Teresa Duffy, Alameda, CA (US); Geeta Desai, Dublin, CA (US); Sophie Miron, San Leandro, CA (US); Chung Daniel Song, Newark, CA (US); Nathan Johnson, Paradise Valley, AZ (US); Theresa Hill, Port Richmond, CA (US); Eldar Sheykh-Zade, San Ramon, CA (US)

(73) Assignee: Ports America Group, Inc., Jersey City, NJ (US)

( * ) Notice: Subject to any disclaimer, the term of this patent is extended or adjusted under 35 U.S.C. 154(b) by 579 days.

This patent is subject to a terminal disclaimer.

(21) Appl. No.: 13/987,447

(22) Filed: Jul. 24, 2013

Related U.S. Application Data

(60) Provisional application No. 61/741,647, filed on Jul. 24, 2012, provisional application No. 61/741,666, filed on Jul. 24, 2012, provisional application No. 61/741,668, filed on Jul. 24, 2012.

(51) Int. Cl.
*G06Q 10/08* (2012.01)

(52) U.S. Cl.
CPC ............... *G06Q 10/0831* (2013.01)

(58) Field of Classification Search
CPC .................................... G06Q 10/0831
See application file for complete search history.

(56) References Cited

U.S. PATENT DOCUMENTS

| | | | | |
|---|---|---|---|---|
| 5,917,925 A | * | 6/1999 | Moore | G09F 3/00 382/101 |
| 6,246,778 B1 | * | 6/2001 | Moore | G07B 17/00435 340/5.1 |

(Continued)

FOREIGN PATENT DOCUMENTS

| CN | 101301982 A | 11/2008 |
|---|---|---|
| CN | 101996358 A | 3/2011 |

OTHER PUBLICATIONS

Shen, Yi, Yao, Junfeng, and Zhang, Hui, "Design and Implementation of the Container Terminal Operating System Based on Service-Oriented Architecture (SOA)," International Conference on Cyberworlds 2008, IEEE Computer Society, 2008.*

(Continued)

*Primary Examiner* — Nathan Erb
(74) *Attorney, Agent, or Firm* — DLA Piper LLP US

(57) ABSTRACT

Systems and methods are disclosed for processing information related to a terminal operating system. In one exemplary implantation, there is provided a method for providing information of terminal operating system management. The method may include processing information related to an input to manage the terminal operating system management. Other exemplary implementations may include processing to generate a result such that an output of a result of the managed terminal operating system management functionality is produced.

42 Claims, 60 Drawing Sheets

(56) References Cited

U.S. PATENT DOCUMENTS

| | | | |
|---|---|---|---|
| 6,456,729 B1* | 9/2002 | Moore | G07B 17/00435 235/491 |
| 6,817,008 B2 | 11/2004 | Ledford et al. | |
| 6,983,186 B2* | 1/2006 | Navani | G06Q 10/06 700/29 |
| 7,088,995 B2* | 8/2006 | Rao | H04L 29/06 455/410 |
| 7,120,896 B2* | 10/2006 | Budhiraja | G06F 8/20 717/105 |
| 7,225,425 B2* | 5/2007 | Kompalli | G06F 8/20 717/108 |
| 7,323,991 B1* | 1/2008 | Eckert | G07C 9/00111 235/382 |
| 7,360,691 B2* | 4/2008 | Takayama | G06Q 20/3226 235/380 |
| 7,448,046 B2* | 11/2008 | Navani | G06Q 10/06 705/37 |
| 7,474,330 B2* | 1/2009 | Wren | G07G 1/14 348/150 |
| 7,487,163 B2* | 2/2009 | Nomura | G06Q 10/103 |
| 7,508,956 B2* | 3/2009 | Scheppmann | G06K 9/00785 348/148 |
| 7,526,777 B2* | 4/2009 | Gazda | G06F 8/20 717/147 |
| 7,539,764 B2* | 5/2009 | Bagsby | G06Q 40/02 709/229 |
| 7,548,881 B2* | 6/2009 | Narayan | G06Q 10/063 705/24 |
| 7,568,020 B2* | 7/2009 | Bagsby | G06Q 30/04 709/223 |
| 7,571,166 B1* | 8/2009 | Davies | G06Q 10/06 |
| 7,610,233 B1* | 10/2009 | Leong | G06Q 10/087 705/26.3 |
| 7,620,583 B2* | 11/2009 | Sundel | G06Q 10/08 705/35 |
| 7,667,604 B2* | 2/2010 | Ebert | G06K 17/00 340/10.4 |
| 7,730,039 B2* | 6/2010 | Holmes | G06Q 10/06 707/690 |
| 7,735,731 B2* | 6/2010 | Skaaksrud | G06Q 10/08 235/384 |
| 7,737,857 B2* | 6/2010 | Ebert | G06K 17/00 340/572.1 |
| 7,752,142 B2* | 7/2010 | Bjerre | G06Q 10/0834 705/333 |
| 7,753,271 B2* | 7/2010 | Skaaksrud | G06Q 10/08 235/384 |
| 7,756,794 B2* | 7/2010 | Bjerre | G06Q 10/0834 705/330 |
| 7,761,387 B2* | 7/2010 | Bjerre | G06Q 10/0834 705/333 |
| 7,766,230 B2* | 8/2010 | Skaaksrud | G06Q 10/08 235/384 |
| 7,775,431 B2* | 8/2010 | Skaaksrud | G06Q 10/08 235/384 |
| 7,792,997 B2* | 9/2010 | Lee | G06F 9/546 709/246 |
| 7,798,400 B2* | 9/2010 | Skaaksrud | G06Q 10/08 235/384 |
| 7,805,338 B2* | 9/2010 | Kolls | G06Q 30/0601 345/672 |
| 7,810,724 B2* | 10/2010 | Skaaksrud | G06Q 10/08 235/375 |
| 7,827,119 B2* | 11/2010 | Bjerre | G06Q 10/0834 705/333 |
| 7,837,105 B2* | 11/2010 | Skaaksrud | G06Q 10/08 235/384 |
| 7,853,480 B2* | 12/2010 | Taylor | G06Q 10/08 705/22 |
| 7,870,999 B2* | 1/2011 | Skaaksrud | G06Q 10/08 235/375 |
| 7,883,013 B2* | 2/2011 | Skaaksrud | G06Q 10/08 235/384 |
| 7,886,972 B2* | 2/2011 | Skaaksrud | G06Q 10/08 235/384 |
| 7,895,094 B2 | 2/2011 | Tandon et al. | |
| 7,969,306 B2* | 6/2011 | Ebert | G06K 17/00 340/539.11 |
| 7,972,102 B2* | 7/2011 | Ward | B65G 63/004 414/137.1 |
| 7,987,017 B2 | 7/2011 | Buzzoni et al. | |
| 8,032,552 B2* | 10/2011 | Davies | G06Q 10/06 707/716 |
| 8,150,780 B2* | 4/2012 | Brandt | G06Q 10/08 705/330 |
| 8,170,951 B2* | 5/2012 | Sundel | G06Q 10/08 705/35 |
| 8,181,868 B2* | 5/2012 | Thomas | B66C 13/46 235/384 |
| 8,219,466 B2* | 7/2012 | Gui | G06Q 10/08 705/28 |
| 8,322,118 B2* | 12/2012 | Ozias | B65D 81/107 53/473 |
| 8,370,272 B2* | 2/2013 | Wickel | G06Q 10/067 705/1.1 |
| 8,380,192 B2* | 2/2013 | Kim | H04W 8/22 455/414.1 |
| 8,533,069 B2* | 9/2013 | Sanguinetti | G06Q 10/08 705/26.1 |
| 8,606,768 B2* | 12/2013 | Mathur | G06F 17/227 707/703 |
| 8,645,228 B2* | 2/2014 | Moussa | G06Q 10/08 705/26.81 |
| 8,661,021 B2* | 2/2014 | Davies | G06Q 10/06 707/716 |
| 8,671,064 B2* | 3/2014 | Schmitt | G06Q 10/08 705/330 |
| 8,972,515 B2* | 3/2015 | Kuehn | G06F 17/30587 709/213 |
| 8,977,679 B2* | 3/2015 | Van Biljon | G06Q 30/04 709/203 |
| 9,350,947 B2* | 5/2016 | Asai | H04L 12/1813 |
| 9,410,804 B2* | 8/2016 | Rintanen | G01S 7/4808 |
| 9,672,560 B2* | 6/2017 | Malapati | G06Q 30/0635 |
| 2001/0016819 A1* | 8/2001 | Kolls | G06Q 10/10 705/44 |
| 2001/0039615 A1 | 11/2001 | Bowker et al. | |
| 2002/0049622 A1* | 4/2002 | Lettich | G06Q 10/063 705/7.11 |
| 2002/0049667 A1* | 4/2002 | Navani | G06Q 10/06 705/37 |
| 2002/0052769 A1* | 5/2002 | Navani | G06Q 10/06 719/316 |
| 2002/0069210 A1* | 6/2002 | Navani | G06Q 10/06 |
| 2002/0123911 A1* | 9/2002 | Bjerre | G06Q 10/0834 705/5 |
| 2002/0143929 A1 | 10/2002 | Maltz et al. | |
| 2002/0144256 A1* | 10/2002 | Budhiraja | G06F 8/67 717/174 |
| 2002/0178023 A1* | 11/2002 | Bjerre | G06Q 10/0834 705/331 |
| 2002/0184308 A1* | 12/2002 | Levy | G06F 8/38 709/203 |
| 2003/0009361 A1 | 1/2003 | Hancock et al. | |
| 2003/0018490 A1* | 1/2003 | Magers | G06Q 10/06 703/6 |
| 2003/0084127 A1* | 5/2003 | Budhiraja | G06F 8/20 709/220 |
| 2003/0105704 A1* | 6/2003 | Sundel | G06Q 10/08 705/37 |
| 2003/0182461 A1* | 9/2003 | Stelting | G06F 8/10 719/310 |
| 2003/0227392 A1* | 12/2003 | Ebert | G06K 17/00 340/8.1 |
| 2004/0024644 A1* | 2/2004 | Gui | G06Q 10/08 705/22 |

(56) References Cited

U.S. PATENT DOCUMENTS

| | | |
|---|---|---|
| 2004/0024658 A1* | 2/2004 | Carbone .............. G06Q 10/08 705/28 |
| 2004/0024660 A1* | 2/2004 | Ganesh ............... G06Q 10/08 705/28 |
| 2004/0044721 A1 | 3/2004 | Song et al. |
| 2004/0064502 A1 | 4/2004 | Yellepeddy et al. |
| 2004/0088245 A1* | 5/2004 | Narayan ............. G06Q 10/063 705/38 |
| 2004/0155960 A1* | 8/2004 | Wren ..................... G07G 1/14 348/150 |
| 2005/0027435 A1 | 2/2005 | Scheppmann |
| 2005/0027886 A1* | 2/2005 | Putnam ............... G06Q 30/06 709/247 |
| 2005/0076059 A1* | 4/2005 | Nomura .............. G06Q 10/103 |
| 2005/0091089 A1* | 4/2005 | Bjerre ............... G06Q 10/0834 705/5 |
| 2005/0091090 A1* | 4/2005 | Bjerre ............... G06Q 10/0834 705/5 |
| 2005/0091091 A1* | 4/2005 | Bjerre ............... G06Q 10/0834 705/5 |
| 2005/0173518 A1* | 8/2005 | Takayama ......... G06Q 20/3226 235/380 |
| 2005/0201592 A1* | 9/2005 | Peach ................. G06K 9/3258 382/104 |
| 2005/0216294 A1 | 9/2005 | Labow |
| 2005/0216555 A1* | 9/2005 | English .............. G06Q 50/18 709/204 |
| 2005/0246716 A1 | 11/2005 | Smith et al. |
| 2005/0256608 A1* | 11/2005 | King .................. B65G 63/004 700/213 |
| 2005/0262161 A1* | 11/2005 | Holmes .............. G06Q 10/06 |
| 2005/0275545 A1* | 12/2005 | Alioto ................ B66C 19/002 340/600 |
| 2006/0158338 A1* | 7/2006 | King .................. B66C 13/16 340/679 |
| 2006/0220851 A1* | 10/2006 | Wisherd ............. G06Q 10/08 340/568.1 |
| 2006/0251498 A1* | 11/2006 | Buzzoni ............. B65G 63/004 414/139.9 |
| 2006/0271348 A1* | 11/2006 | Rossow ............. G06F 9/45537 703/26 |
| 2007/0033161 A1 | 2/2007 | Park et al. |
| 2007/0156505 A1 | 7/2007 | Agassi et al. |
| 2007/0168813 A1 | 7/2007 | El Far et al. |
| 2007/0182556 A1* | 8/2007 | Rado .................. G01S 5/0294 340/572.1 |
| 2007/0222674 A1* | 9/2007 | Tan .................... G01S 19/49 342/357.32 |
| 2008/0027737 A1* | 1/2008 | Watkins ........... G06Q 10/08345 705/80 |
| 2008/0040179 A1* | 2/2008 | Masermann ........ G06Q 10/08 705/330 |
| 2008/0071557 A1* | 3/2008 | Brandt ............... G06Q 10/08 705/330 |
| 2008/0111693 A1* | 5/2008 | Johnson ............. G01S 13/74 340/572.1 |
| 2008/0121690 A1* | 5/2008 | Carani ................ G01S 5/0027 235/376 |
| 2008/0122656 A1* | 5/2008 | Carani ................ G07C 5/008 340/995.28 |
| 2008/0122691 A1* | 5/2008 | Carani ................ H04W 4/02 342/357.48 |
| 2008/0125964 A1* | 5/2008 | Carani ................ G06Q 10/08 701/408 |
| 2008/0125965 A1* | 5/2008 | Carani ................ G07C 5/008 701/408 |
| 2008/0143545 A1* | 6/2008 | King .................. B66C 13/16 340/679 |
| 2008/0150746 A1* | 6/2008 | King .................. B66C 13/16 340/686.1 |
| 2008/0169343 A1* | 7/2008 | Skaaksrud .......... G06Q 10/08 235/376 |
| 2008/0172303 A1* | 7/2008 | Skaaksrud .......... G06Q 10/08 235/384 |
| 2008/0173706 A1* | 7/2008 | Skaaksrud .......... G06Q 10/08 235/375 |
| 2008/0174485 A1* | 7/2008 | Carani ................ G06Q 10/08 342/357.46 |
| 2008/0179398 A1* | 7/2008 | Skaaksrud .......... G06Q 10/08 235/384 |
| 2008/0191937 A1* | 8/2008 | Wisherd ............. G01S 19/09 342/357.44 |
| 2008/0193246 A1* | 8/2008 | Bohman .............. B60P 7/132 410/82 |
| 2008/0203147 A1* | 8/2008 | Skaaksrud .......... G06Q 10/08 235/375 |
| 2008/0210749 A1* | 9/2008 | Skaaksrud .......... G06Q 10/08 235/375 |
| 2008/0210750 A1* | 9/2008 | Skaaksrud .......... G06Q 10/08 235/375 |
| 2008/0222096 A1 | 9/2008 | Ungureanasu et al. |
| 2008/0252417 A1* | 10/2008 | Thomas .............. B66C 13/46 340/10.1 |
| 2008/0266131 A1* | 10/2008 | Richardson ........ G01S 19/07 340/4.62 |
| 2008/0283586 A1 | 11/2008 | Marks et al. |
| 2008/0294536 A1* | 11/2008 | Taylor ................ G06Q 10/08 705/28 |
| 2009/0007098 A1 | 1/2009 | Chevrette et al. |
| 2009/0008450 A1* | 1/2009 | Ebert ................. G06K 17/00 235/439 |
| 2009/0037234 A1 | 2/2009 | Gabrielson |
| 2009/0063559 A1 | 3/2009 | Rhodes et al. |
| 2009/0106122 A1* | 4/2009 | Elberbaum ........ G06Q 30/0601 705/26.1 |
| 2009/0112359 A1* | 4/2009 | Sanguinetti ........ G06Q 10/08 700/228 |
| 2009/0132494 A1 | 5/2009 | Gutlapalli et al. |
| 2009/0132641 A1* | 5/2009 | Sanguinetti ........ G06Q 10/08 709/203 |
| 2009/0146832 A1* | 6/2009 | Ebert ................. G06K 17/00 340/8.1 |
| 2009/0150363 A1 | 6/2009 | Gross et al. |
| 2009/0164500 A1* | 6/2009 | Mathur ............... G06F 17/2247 |
| 2009/0171500 A1 | 7/2009 | Matsumoto et al. |
| 2009/0172099 A1* | 7/2009 | Lee .................... G06F 9/546 709/204 |
| 2009/0222159 A1* | 9/2009 | Bauer ................. B60L 11/1803 701/23 |
| 2009/0276338 A1* | 11/2009 | Masermann ........ G06Q 10/08 705/28 |
| 2009/0307039 A1* | 12/2009 | Seeds ................. G06Q 10/06 705/332 |
| 2009/0307599 A1* | 12/2009 | Davies ............... G06Q 10/06 715/738 |
| 2009/0319677 A1* | 12/2009 | Masermann ........ G06Q 10/08 709/229 |
| 2009/0327009 A1* | 12/2009 | Schmitt .............. G06Q 10/08 705/330 |
| 2009/0327105 A1* | 12/2009 | Moussa .............. G06Q 10/08 705/29 |
| 2010/0021272 A1* | 1/2010 | Ward .................. B65G 63/004 414/137.1 |
| 2010/0030370 A1* | 2/2010 | King .................. B65G 63/004 700/214 |
| 2010/0057596 A1* | 3/2010 | Sundel ................ G06Q 10/08 705/31 |
| 2010/0109947 A1* | 5/2010 | Rintanen ............ B66C 13/46 342/357.23 |
| 2010/0145501 A1 | 6/2010 | Guilbert et al. |
| 2010/0161627 A1 | 6/2010 | Vossen et al. |
| 2010/0318437 A1* | 12/2010 | Yee .................... G06Q 10/08 705/26.1 |
| 2011/0010005 A1 | 1/2011 | Tan et al. |
| 2011/0025496 A1* | 2/2011 | Cova ................... G01S 5/0027 340/539.13 |
| 2011/0052001 A1* | 3/2011 | Tan .................... G06Q 10/08 382/103 |

(56) References Cited

U.S. PATENT DOCUMENTS

| | | | |
|---|---|---|---|
| 2011/0055172 A1* | 3/2011 | Tan | G06F 17/30241 707/692 |
| 2011/0131587 A1 | 6/2011 | Rapp et al. | |
| 2011/0148589 A1* | 6/2011 | Johnson | G01S 13/74 340/10.1 |
| 2011/0163159 A1* | 7/2011 | Thomas | B66C 13/46 235/384 |
| 2011/0163895 A1* | 7/2011 | Rado | G01S 5/0294 340/933 |
| 2011/0238381 A1 | 9/2011 | Edwards | |
| 2011/0251716 A1* | 10/2011 | Buzzoni | B65G 63/004 700/213 |
| 2011/0264588 A1 | 10/2011 | Jensen et al. | |
| 2011/0280448 A1* | 11/2011 | Hofman | G06K 9/00973 382/104 |
| 2011/0307404 A1* | 12/2011 | Wickel | G06Q 10/067 705/331 |
| 2012/0017082 A1* | 1/2012 | Davies | G06Q 10/06 713/156 |
| 2012/0092643 A1* | 4/2012 | Rintanen | B66C 13/46 356/4.01 |
| 2012/0102144 A1* | 4/2012 | Fritsche | H04L 12/42 709/217 |
| 2012/0109841 A1* | 5/2012 | Moussa | G06Q 10/08 705/332 |
| 2012/0173446 A1* | 7/2012 | Brandt | G06Q 10/08 705/330 |
| 2012/0185081 A1* | 7/2012 | King | B65G 63/004 700/215 |
| 2012/0185652 A1* | 7/2012 | Peters | G06F 17/30587 711/152 |
| 2012/0185653 A1* | 7/2012 | Peters | G06F 17/30587 711/152 |
| 2012/0209788 A1* | 8/2012 | Sundel | G06Q 10/08 705/340 |
| 2012/0293664 A1* | 11/2012 | Hofman | G06K 9/00973 348/169 |
| 2012/0310704 A1* | 12/2012 | Vogel | G06Q 10/04 705/7.31 |
| 2013/0165157 A1* | 6/2013 | Mapes | H04W 4/02 455/456.5 |
| 2013/0167111 A1 | 6/2013 | Moore et al. | |
| 2013/0275265 A1 | 10/2013 | Burckart et al. | |
| 2014/0002273 A1* | 1/2014 | King | B65G 63/004 340/870.01 |
| 2014/0014188 A1* | 1/2014 | Szydlowski | E03B 3/30 137/2 |
| 2014/0032427 A1* | 1/2014 | Gannon | G06Q 50/182 705/309 |
| 2014/0046587 A1* | 2/2014 | Rintanen | G01S 7/4808 701/469 |
| 2014/0046952 A1* | 2/2014 | McPhail | G06F 17/30569 707/741 |
| 2014/0258032 A1* | 9/2014 | Psota | G06Q 30/02 705/26.35 |
| 2014/0347180 A1* | 11/2014 | Rado | G01S 5/02 340/539.13 |
| 2015/0073929 A1* | 3/2015 | Psota | G06Q 50/28 705/26.2 |
| 2015/0134557 A1* | 5/2015 | Cova | G06Q 10/06 705/333 |
| 2015/0140962 A1* | 5/2015 | Mapes | H04W 4/02 455/406 |
| 2015/0360919 A1* | 12/2015 | King | B65G 63/004 340/572.1 |
| 2016/0028827 A1* | 1/2016 | Ahmed | G06F 9/541 709/206 |
| 2016/0071055 A1* | 3/2016 | Beckwitt | G06Q 10/08345 705/39 |
| 2016/0292029 A1* | 10/2016 | McPhail | G06F 17/30569 |
| 2016/0299804 A1* | 10/2016 | McPhail | G06F 17/30569 |
| 2016/0299817 A1* | 10/2016 | McPhail | G06F 17/30569 |
| 2016/0300277 A1* | 10/2016 | Marlowe | G06Q 10/087 |

OTHER PUBLICATIONS

Choi, H., Park, N. and Lee, S., An ERP Approach for Container Terminal Operating Systems, Maritime Policy Management [online], Jul.-Sep. 2003, vol. 30, No. 3, pp. 197-210, [retrieved Oct. 22, 2013], retrieved from the internet http://web.itu.edu.tr/~keceli/container/(ENG)%20an%20ERP%20approach%20for%20container%20terminal%20operating%20systems.pdf.
International Search Report and Written Opinion dated Jul. 24, 2013, in PCT Application No. PCT/US2013/000171, 15 pages.
International Preliminary Report on Patentability from PCT/US2013/051914 dated Jun. 2, 2015.
International Preliminary Report on Patentability from PCT/US2013/000171 dated Jan. 27, 2015.
File History from corresponding U.S. Appl. No. 13/950,275, filed Jul. 24, 2013.
File History from corresponding U.S. Appl. No. 13/987,448, filed Jul. 24, 2013.
File History from corresponding U.S. Appl. No. 14/605,994, filed Jan. 26, 2015.
File History from corresponding U.S. Appl. No. 13/987,445, filed Jul. 24, 2013.
International Search Report and Written Opinion in PCT application No. PCT/US13/51914, dated Mar. 18, 2014, 14 pgs.
Chinese Office Action from Chinese Patent Application No. 201380049799.7 dated Dec. 2, 2016.
English Translation of Chinese Office Action from Chinese Patent Application No. 201380049799.7 dated Dec. 2, 2016.
English Translation of CN101301982A dated Nov. 12, 2008.
English Translation of CN101996358A dated Mar. 30, 2001.
Partial File History from corresponding U.S. Appl. No. 13/950,275, filed Jul. 24, 2013 from Jun. 21, 2016 to present.
Partial File History from corresponding U.S. Appl. No. 13/987,448, filed Jul. 24, 2013 from Jun. 21, 2016 to present.
Partial File History from corresponding U.S. Appl. No. 14/605,994, filed Jan. 26, 2015 from Jun. 21, 2016 to present.
Partial File History from corresponding U.S. Appl. No. 13/987,445, filed Jul. 24, 2013 from Jun. 21, 2016 to peresent.
Partial File History from corresponding U.S. Appl. No. 13/987,448, filed Jul. 24, 2013 from Mar. 13, 2017 to present.
Partial File History from corresponding U.S. Appl. No. 14/605,994, filed Jan. 26, 2015 from Mar. 13, 2017 to present.
Partial File History from corresponding U.S. Appl. No. 13/987,445, filed Jul. 24, 2013 from Mar. 13, 2017 to present.
U.S. Appl. No. 13/950,275, filed Jul. 24, 2013, Pending.
U.S. Appl. No. 13/987,448, filed Jul. 24, 2013, Pending.
U.S. Appl. No. 14/605,994, filed Jan. 16, 2013, Pending.
U.S. Appl. No. 13/987,445, filed Jul. 24, 2013, Pending.
Partial File History from corresponding U.S. Appl. No. 14/605,994.
Partial File History from corresponding U.S. Appl. No. 13/987,445.

* cited by examiner

| | | | USER (USER A) | | | |
|---|---|---|---|---|---|---|
| Home | Import | Export | Equipment | Gate | Admin | Log Off |
| | | | TERMINAL [TERMINAL A ▼] | | SSCO [SSCO F ▼] | |

Gate > EIR

| Equipment Types | | |
|---|---|---|
| Equipment No* | [Container ▼] | |
| | XXXU4539731 | |

Move Date: From [ ]
Move Date: To [ ]

☑ Full In    ☑ Empty In    ☑ Chassis In    ☐ Rail In
☑ Full Out   ☑ Empty Out   ☑ Chassis Out   ☐ Rail Out

[Go] [Clear]

| EIR | Date | Trucker | Move Type | Cntr No. | SSCO | Seal No | Chassis No | Gate Pass No |
|---|---|---|---|---|---|---|---|---|
| EIR | 2/23/2012 9:02:28 | SERVICES, LLC | Full Out | XXXU4539731 | | | XXXZ700431 | 9457 |
| EIR | 2/23/2012 10:21:45 | SERVICES, LLC | Empty In | XXXU4539731 | | | XXXZ700431 | 9697 |
| EIR | 2/23/2012 10:26:25 | XYZ TRANSPORT, inc. | Empty Out | XXXU4539731 | | | XXXZ700431 | 1814 |

2680 2682   2684   2686   2688   2690   2692   2694   2696

2698 (bracket over Cntr No, SSCO, Seal No, Chassis In/Out columns)

USER (USER A)
TERMINAL: TERMINAL A
SSCO: SSCO H

PORTSAMERICA — Log Off

Home | Import | Export | Equipment | Gate | Admin

Export > Vessel Manager > Details

| Vessel - Voyage | Vessel A - 342S | | | Port of Discharge | Select Please | | Container Length | |
|---|---|---|---|---|---|---|---|---|
| Booking Number | | | | Booking Status | | | Container Height | |
| | | | | | | | Container Type | |

[Go] [Clear]

*Vessel - Voyage or Booking number is required

Vessel/ Booking Summary

| Length | Booked | Containers In | To Come | Late Receipt |
|---|---|---|---|---|
| 20' | 2332 | 3 | 2329 | 1 |
| 40' | 579 | 9 | 570 | 1 |

2930

Booking List

To Vessel For Roll All/BInc: Select Please

| Edit | Roll All | Roll BInc | Delete | No Partial | Late Receipt | Early Receipt | Booking Number | Length | Height | Type | Booked | Container In | Empty out | To Come | CBR |
|---|---|---|---|---|---|---|---|---|---|---|---|---|---|---|
| | ☐ | ☐ | ☐ | No | No | No | XYZ2300958 | 40' | 9'6" | RE - Reefer | 1 | 0 | 0 | 1 | |
| | ☐ | ☐ | ☐ | No | No | No | XYZ2300969 | 40' | 9'6" | RE - Reefer | 1 | 0 | 0 | 1 | |
| | ☐ | ☐ | ☐ | No | No | No | XYZ2300980 | 40' | 9'6" | RE - Reefer | 1 | 0 | 0 | 1 | |
| | ☐ | ☐ | ☐ | No | No | Yes | XYZ2 | 20' | 8'6" | ST - Standard | 100 | 3 | 0 | 97 | |
| | ☐ | ☐ | ☐ | No | No | Yes | XYZ040401 | 40' | 8'6" | ST - Standard | 10 | 0 | 0 | 10 | |
| | ☐ | ☐ | ☐ | No | No | No | | 40' | 8'6" | ST - Standard | 10 | 0 | 0 | 10 | |
| | ☐ | ☐ | ☐ | No | No | No | XYZ233086 | 40' | 8'6" | ST - Standard | 1 | 1 | 0 | 0 | |
| | ☐ | ☐ | ☐ | No | No | No | XYZ236738 | 40' | 9'6" | ST - Standard | 1 | 0 | 0 | 1 | |
| | ☐ | ☐ | ☐ | No | No | No | XYZBR3 | 40' | 8'6" | ST - Standard | 88 | 3 | 0 | 85 | |
| | ☐ | ☐ | ☐ | No | No | No | XYZ040401 | 40' | 8'6" | RE - Reefer | 10 | 0 | 0 | 10 | |
| | ☐ | ☐ | ☐ | No | No | No | XYZ040402 | 40' | 8'6" | RE - Reefer | 10 | 0 | 0 | 10 | |
| | ☐ | ☐ | ☐ | No | No | No | XYZOOK2 | 40 | 8' | ST - Standard | 23 | 0 | 0 | 23 | |

2940 2942 2944 2950 2952 2954 2956

[Apply] [Clear]   [Save] [Reset]

Displaying 12 to 32 inquiries   [View All] [◄◄] [◄] 2 [▼] Of 2 [►] [►►]

Copyright©2012 Ports America. All rights reserved. Terms of Use | Privacy Policy | Contact us

USER (USER A)

Home | Import | Export | Equipment | Gate | Admin

TERMINAL [TERMINAL A ▼]   SSCO [SSCO I ▼]   Log Off

Equipment > Equipment Control

Equipment Type ⦿ Container ○ Chassis    Equipment Number [      ]

Action for Container  [Select Please ▼] — 3076

[Go] [Clear]
[Save] [Reset]

PORTSAMERICA

| | Equipment Number | Status | Service Code |
|---|---|---|---|
| ☐ | XXXU4600005 | Empty Import On Ship | OFF LEASE |
| ☐ | XXXU1462951 | Full Import On Ship | TO BE SOLD WHEN EMPTY |
| ☐ | XXXU4595207 | Unknown Container | AUTHORIZED FOR RECEIPT |
| ☐ | XXXU4357418 | Full Import In Yard | TO BE OFF LEASE |
| ☐ | XXXU1467803 | Empty Import In Yard | NOT TO BE RETURNED EMPTY |
| ☐ | XXXU1462118 | Empty Import In Yard | NOT TO BE RETURNED EMPTY |
| ☐ | XXXU3724515 | Full Import In Yard | TO BE SOLD WHEN EMPTY |
| ☐ | XXXU1468498 | Empty Import In Yard | NOT TO BE RETURNED EMPTY |

USER (USER A)

TERMINAL [TERMINAL A ▾]   SSCO [SSCO L ▾]

PORTSAMERICA
GLOBAL REACH. LOCAL RESULTS.

Log Off

| Home | Import | Export | Equipment | Gate | Admin |

Export > Hazardous Goods

Booking Number [____3202____]   Container Number [____3204____]
*Booking or Container number is required Prestaged Containers - Booking: XYZ123
Vessel Call: Vessel A - 340S | VESSEL A - 341S  } 3210

[Add New Container] ⟵ 3222    [Go] [Clear]

| | Containers ▲ | Status | Hazardous Items (UNNO - IMDG Code) |
|---|---|---|---|
| ☐ ⊞ | XXXU021999 | Add or Update Prestaged hazardous items | 07 - 1.2 |
| ☐ ⊞ | XXXU0404010 | Container XXXU0404010 is in terminal. Hazardous data update is not allowed | 38 - 1.1 |
| ☐ ⊞ | XXXU0404020 | Add or Update Prestaged hazardous items | 38 - 1.1 3220 - 6.1 |
| ☐ ⊞ | XXXU0404030 | Document received for Container XXXU0404030. Hazardous data update is not allowed* | 38 - 1.1 |
| ☐ ⊞ | XXXU041966 | Add or Update Prestaged hazardous items | 07 - 1.2 0038 - 1.2 |
| ☐ ⊞ | XXXU0987654 | Add or Update Prestaged hazardous items | 76 - 33 |
| ☐ ⊞ | XXXU1987654 | Add or Update Prestaged hazardous items | 76 - 33 |
| ☐ ⊞ | XXXU2987654 | Add or Update Prestaged hazardous items | 76 - 33 |
| ☐ ⊞ | XXXU3987654 | Add or Update Prestaged hazardous items | 76 - 33 |
| ☐ ⊞ | XXXU400490 | Add or Update Prestaged hazardous items | 04 - 1.1 |
| ☐ ⊞ | XXXU5673452 | Add or Update Prestaged hazardous items | 54 - 5 54-5 54-5 |
| ☐ ⊞ | XXXU9876543 | Add or Update Prestaged hazardous items | 76 - 33 |

Displaying 12 to 12/Inquiries
3224    3220                                3230

*Document received. Hazardous data update is not allowed
                                                    3240

| Home | Import | Export | Equipment | Gate | Admin |
|------|--------|--------|-----------|------|-------|

Import > Bill of Lading > Details

Bills of Lading: 3047945  [+]  — 3440

3047945 | SSCO : Vessel Code: I In - Voyage: 1204A

| Port of Loading | ITGIT |
| Port of Discharge | USOAK |
| Final Destination | |
| Consignee | Sample Importer |
| Truck Co Assgn | |
| Hazardous? | No |
| Pcs/Cnt | 1 |

3446

| Customs Status | Released |
| Customs Remark | |
| USDA Status | Released |
| USDA Remark | |
| Carrier Status | Released |
| Carrier Remark | |
| Demurrage Status | Released ▸ |

3442

Container List

| Container | Pcs/cnt | Freight Status | Carrier Status | USA Status | USDA Status | Hold | Last Free Date | In Yard | Demurrage Status | Demurrage Due | Yard Location | Appointment Date | Gate Out Date | Truck Company |
|-----------|---------|----------------|----------------|------------|-------------|------|----------------|---------|------------------|---------------|---------------|------------------|---------------|---------------|
| 917351 | 1 | Released | Released | Released | Released | No | | M | Released | $0.00 | | 4/17/2012 3:45:07 | | |

Displaying 1 of 1 Containers

USER (USER A)

TERMINAL [TERMINAL A ▼]  SSCO [SSCO U ▼]  PORTSAMERICA  Log Off

Home  Import  Export  Equipment  Gate  Admin

Import > Container > Details — 3630

Container Number: 2917351

2917351 | SSCO: Vessel Code: In - Voyage: 1204A

| | | | | | |
|---|---|---|---|---|---|
| Freight Status | Released | | Service Code | 1 | |
| Carrier Status | Released | | Port of Loading | ITGIT | |
| Carrier Remark | | 3632 | Port of Discharge | USOAK | 3636 |
| Customs Status | Released | | Final Port of Discharge | | |
| Customs Remark | Released | | Final Destination | | |
| USDA Status | Released | | MLB Status | | |
| USDA Remark | | | In-Bond Destination | | |
| Terminal Hold | No | | Type | ST | |
| Terminal Remark | | | Length | 20' | |
| Door Delivery? | | 3634 | Seal Number | 3936114 | 3638 |
| Hazardous? | No | | Container Status | In Yard | |
| IMDG Class | | | Appointment Date | 4/17/2012 3:45:07 | |
| On/Off Dock | Off Dock | | Truck Co Assgn | | |

3640:
| | |
|---|---|
| Carrier Category | |
| Demurrage Due | $0.0 |
| Demurrage Total | |
| Demurrage Paid | |
| Last Free Day | |
| Demurrage Status | Released |

| | |
|---|---|
| Yard Location | |
| Yard Status | Import |
| Yard Type | |
| Out Date | |
| Gate Pass No | |
| Truck Co | |

[Go] [Clear]

3642:

| Bill of Lading | Pcs/cnt | Freight Status | Carrier Status | Customs Status | USDA Status | PGA Status | Customs Remark |
|---|---|---|---|---|---|---|---|
| 3047945 | 1 | Released | Released | Released | Released | Released | Released |

| Container Number | SSCO | Yard Loc | Yard Type | Assign PIN# | Freight Trucker | Exam Trucker | Svc | Local Clear | USDA Status | PGA Status | Freight Status | Demurrage Status |
|---|---|---|---|---|---|---|---|---|---|---|---|---|
| ☐ 4600005 | | 2051511 | Wheeled | | CRI - TRUCKS LINES | | | | ased | Released | Released | Released |
| ☐ 1462951 | | 2051241 | Wheeled | | DNHR - D CARRIERS | | | | ased | Released | Released | Released |
| ☐ 4357418 | | 2081381 | Wheeled | | HRBD - HARB DRAY EXPRESS, | | | | ased | Released | NoEntry | Released |
| ☐ 1467803 | | STR | | hr | HRBD - HARB EXPRESS, | | | | | | | |
| ☐ 1462118 | | 4151351 | Wheeled | | LCJE - CHRISTRUCK (Trucker agreement expried) | | | | ased | Released | Released | Released |
| ☐ 724515 | | D187C1 | Decked | | THCR - THREE COUNTRIES | | | | ased | Released | Released | Hold |
| ☐ 1468498 | | 4131601 | Wheeled | | TERV - THREE TRUCKS | | | | ased | Released | Released | Released |
| | | | | | LEHR - TRANSPORTATION 101 (Trucker agreement expried) | | | | | | | |
| | | | | | HRST - HURST TRUCKING, INC (Agreement not found) | | | | | | | |
| | | | | | THRW - THREE WISHES TRUCKING, INC (Agreement not found) | | | | | | | |

SYSTEMS AND METHODS INVOLVING FEATURES OF TERMINAL OPERATION

CROSS-REFERENCES TO RELATED APPLICATION(S)

This application claims benefit/priority of U.S. provisional patent application Nos. 61/741,647, 61/741,666 and 61/741,668, all filed Jul. 24, 2012, which are incorporated herein by reference in entirety.

APPENDIX MATERIALS

Appendices, labeled "Appendix 1", "Appendix 2", "Appendix A", and "Appendix B" are attached hereto and incorporated by reference herein in their entirety. This application also includes and hereby incorporates by reference the computer program appendix materials submitted herewith on compact disc (CD) as well as the Transmittal Letter regarding the CD materials, which lists the files on each compact disc. The incorporated computer program materials are contained on one compact disc, and a duplicate copy is also provided per 37 CFR 1.77(b)(5), thus two (2) discs are submitted herewith (labeled "Copy 1" and "Copy 2", respectively)

BACKGROUND

The process of importing and exporting containers and goods at a port involves multiple parties and requires significant communication and coordination. In addition, the parties involved must adhere to numerous regulations and guidelines.

Systems known as Terminal Operating Systems (TOS) have been developed to support this process at port terminals around the world. Many of the standard operating procedures related to activities at the terminal, such as import and export functions, have become a part of these TOS applications, although they are implemented differently.

However, aspects such as exception management, real-time exception management, TOS-agnostic software/platforms/components and other interrelated functionality are areas that have not been adequately addressed by existing Terminal Operating Systems.

The shipping industry, as briefly described in FIG. 1, includes both the actual transport of goods from and to overseas, but also the interface with port facilities and third parties. As FIG. 1 shows, there are multiple parties involved in the transportation of goods through port facilities, and the port interfaces are capable of introducing delays in the overall shipping time. These delays can be addressed using systems with smarter logistical coordination and by improving information flow throughout system(s) and among parties.

For example, an SSCO (Steamship Company) may submit a booking that includes specific counts and types of containers. For each container, attributes such as dimensions, etc. are specified. When an entity associated with such container (e.g., driver etc.) comes to the terminal to process or deliver the container, the attributes of one or more containers may not match the specified attributes of the booking. In this scenario, such entity typically will not be allowed to deliver the container until the booking information matches the container.

In the past, issues such as the one described above required a significant amount of communication and paperwork between parties to understand the nature of the problem and to update or correct the information so that the entity could continue with the desired handling of the container(s).

Overview of General Aspects

In one aspect, provided herein are systems and methods for controlling and managing shipments across different Terminal Operating System (TOS). In accordance with aspects of the present inventions, various computer hardware, software, user interface (UI), graphical user interface (GUI), backend (e.g., server, TOS, TOS-Agnostic and etc.) and/or communications features can be involved in novel ways to provide the innovative systems and methods herein. As used herein, a shorthand term utilized to refer to such systems and methods is "TOS Web Portal" or "TOS Web Portal implementation/integrations." According to certain implementations, for example, a TOS Web Portal can be a set of computer network based applications and machine readable instructions that interface with a Terminal's operating system (i.e., TOS). It will be understood that a TOS Web Portal or TOS Web Portal implementation/integrations refers to any interface that permits access to the system disclosed herein, via any type of network connections including but not limited to LAN, wireless, cellular, Bluetooth, infrared connections and etc. In some embodiments, implementations herein are capable of providing real-time access to information and tools for steam ship companies ("SSCOs") to update that information, e.g., via such interface. Consistent with the present disclosure, some TOS Web Portal implementations can drive operational efficiencies and/or improve customer service. Some additional beneficial characteristics of various a TOS Web Portal implementations can include, for example, one or more of the following:

Minimizing cargo movement problems at the terminal.

Improving terminal operators' ability to successfully service SSCOs and Trucking Companies.

Minimizing terminals from acting in the role of broker between trucking and steamship companies.

Eliminating reliance on phone, fax and other non-electronic instructions to the terminal.

Delivering real-time, accurate, free-flowing information carriers can use to quickly pass through terminal gates.

Preventing gate congestion.

Expedited Trouble Resolution resulting in improved trucker turn-times.

For example, an SSCO can submit a booking that includes specific counts and types of containers. For each container, attributes such as dimensions, etc. are specified. When a driver comes to the terminal to deliver the container, the attributes of one or more containers cannot match the specified attributes of the booking. In this scenario, the driver will not be allowed to deliver the container until the booking information matches the container.

In the pat, issues such as the one described above required a significant amount of communication and paperwork between parties to understand the nature of the problem and to update or correct the information so that the driver can continue on his way.

Various TOS Web Portal implementations herein have the capability of minimizing communication and can streamline the processes. Further, some implementations can also accomplish benefits herein by interfacing with other applications, such as an associated tracking application like VoyagerTrack. Here, for example such application can be an associated application, capable of complementing a TOS Web Portal implementation in facilitating logistical information sharing and communication flow among members of the shipping industry. Details of one illustrative tracking application, VoyagerTrack, setting forth illustrative aspects of such module/interface as, among other things, helping illustrate how such benefits are achieved are provided in Appendix A, attached hereto.

For example, via functioning associated with such systems, a TOS Web Portal implementation can allow SSCOs to be alerted when trouble occurs at a terminal. In addition, the SSCOs can be presented with the specifics of each issue and quick links to access, review and update their data related to the issue. Once the data has been corrected, the driver and terminal clerk can then proceed with completion of transactions.

According to other embodiments, a TOS Web Portal implementation can allow carriers to manage information relating to: Bookings (see, e.g., FIGS. 22A, 23A, and 23B); Trouble Resolution (see, e.g., FIGS. 24A and 25), Equipment interchange reports (EIRs) (see, e.g., FIG. 26A); Cargo and equipment status (see, e.g., FIG. 26A); Equipment pre-authorization (see, e.g., FIG. 26A); Equipment control (see, e.g., FIGS. 27 and 28A, 30A, and 30B); Vessel management (see, e.g., FIG. 29); multi-functional home portal (see, e.g., FIG. 31); Hazardous Goods (see, e.g., FIGS. 32A, 32B); Bills of lading (see, e.g., FIGS. 34A, 34B, 34C, and 34D); Containers (see, e.g., FIGS. 36A, 36B and 36C); Free day Demurrage assignments (see, e.g., FIGS. 34A-36C); Release (see, e.g., FIGS. 34A-36B); Trucker assignments and information (see, e.g., FIGS. 38A, 38B, and 38C); Dray In Containers (see, e.g., FIG. 40); Rail exports (see, e.g., FIG. 41); among other things.

Additionally, some implementations can allow users to manage releases for import management purposes, manage PIN assignments, trucker assignments and/or holds and releases. Further, implementations can again interface with tracking type applications to display demurrage rates and releases for bills of lading. Import functionality can also include free day assignments, and the ability to locally update statuses.

As a function of these systems, methods and features herein, a TOS Web Portal implementation has the ability to give terminals network-based visibility from a variety of places at any time. Terminals can view live trouble transactions by category, status, equipment number or gate pass number, with details of the same printed trouble tickets that the driver receives. In some implementations, a Trouble page within a TOS Web Portal implementation provides terminal operators and other responsible parties with the ability to expedite resolutions.

Additionally, system and methods of some TOS Web Portal implementations can provide user access to real-time vessel schedules, import and export container information, gate activity, and user account information generated from a TOS. Different reports can display the notifications and appointments that had been registered by the user. The terminal administrators can set up terminal-specific configuration and information, perform user account management, and set up for automatic send of emails or faxes to the users.

The figures and detailed description will elaborate on these inventions. This overview is not meant to be inclusive of all inventive ideas and is intended to be complemented and augmented by the detailed descriptions and figures.

BRIEF DESCRIPTION OF THE FIGURES

The accompanying drawings, which constitute a part of this specification, illustrate various implementations and features of the present inventions and together with the description, help explain aspects of the innovations herein. In the drawings:

FIG. 22A is a diagram of an exemplary Manage Booking user interface consistent with one or more aspects of the innovations herein.

FIG. 24A is a diagram of an exemplary trouble resolution user interface consistent with one or more aspects of the innovations herein.

FIG. 25 is a diagram of an exemplary Linked Page showing Trouble Resolver consistent with one or more aspects of the innovations herein.

FIG. 26A is a diagram of an exemplary Equipment Interchange Report user interface consistent with one or more aspects of the innovations herein.

FIG. 27 is a diagram of an exemplary Equipment Interchange user interface with picture consistent with one or more aspects of the innovations herein.

FIG. 28A is a diagram of an exemplary Equipment Release user interface consistent with one or more aspects of the innovations herein.

FIG. 29 is a diagram of an exemplary Export Vessel Manager user interface consistent with one or more aspects of the innovations herein.

FIG. 30A is a diagram of an exemplary Equipment Control user interface illustrating Multiple Actions functionality consistent with one or more aspects of the innovations herein.

FIG. 30B is a diagram of an exemplary Equipment Control user interface illustrating Single Action functionality consistent with one or more aspects of the innovations herein.

FIG. 32A is a diagram of an exemplary hazardous goods container list user interface consistent with one or more aspects of the innovations herein.

FIG. 32B is a diagram of an exemplary hazardous goods item user interface consistent with one or more aspects of the innovations herein.

FIG. 33 is a diagram showing an exemplary user interface showing illustrative cut and paste of multiple lists functionality consistent with one or more aspects of the innovations herein.

FIG. 34A is a diagram of an exemplary Bill of Lading (Import) user interface including columns of functionality for each bill consistent with one or more aspects of the innovations herein.

FIG. 34B is a diagram of another exemplary Bill of Lading (Import) user interface showing additional columns of functionality consistent with one or more aspects of the innovations herein.

FIG. 34C is a diagram of an exemplary user interface showing details of a selected Bill of Lading including container list features consistent with one or more aspects of the innovations herein.

FIG. 35 is a diagram of an illustrative user interface showing an exemplary 'apply all' functionality for assigning information to multiple containers at once, consistent with one or more aspects of the innovations herein.

FIG. 36A is a diagram of an exemplary import container user interface including columns of functionality for identified containers consistent with one or more aspects of the innovations herein.

FIG. 36B is a diagram of another exemplary import container user interface showing additional columns of functionality consistent with one or more aspects of the innovations herein.

FIG. 36C is a diagram of an exemplary user interface showing details and functionality for a selected import container consistent with one or more aspects of the innovations herein.

FIG. 37 is a diagram showing an example of auto suggest or auto-complete functionality consistent with one or more aspects of the innovations herein.

FIG. 38A is a diagram of an exemplary trucking management user interface consistent with one or more aspects of the innovations herein.

FIG. 38B is a diagram of an exemplary create new trucking company user interface consistent with one or more aspects of the innovations herein.

FIG. 38C is a diagram of an exemplary trucking company report user interface consistent with one or more aspects of the innovations herein.

FIG. 39B is a diagram of an exemplary administrator or user rights interface consistent with one or more aspects of the innovations herein.

FIG. 40 is a diagram of an exemplary dray in user interface for containers consistent with one or more aspects of the innovations herein.

FIG. 41 is a diagram of an exemplary rail exports user interface consistent with one or more aspects of the innovations herein.

DETAILED DESCRIPTION OF ILLUSTRATIVE IMPLEMENTATIONS

Reference will now be made in detail to various implementations, examples of which are illustrated in the accompanying drawings. In the following detailed description, numerous specific details are set forth in order to provide a sufficient understanding of the subject matter presented herein. But it will be apparent to one of ordinary skill in the art that implementations subject matter may be practiced without such specific details. Moreover, the particular implementations described herein are provided by way of example, and should not be used to limit the scope of the invention to particular embodiments. In other instances, well-known methods, procedures, components, and circuits have not been described in detail so as not to unnecessarily obscure aspects of the innovations herein.

Figure 1:
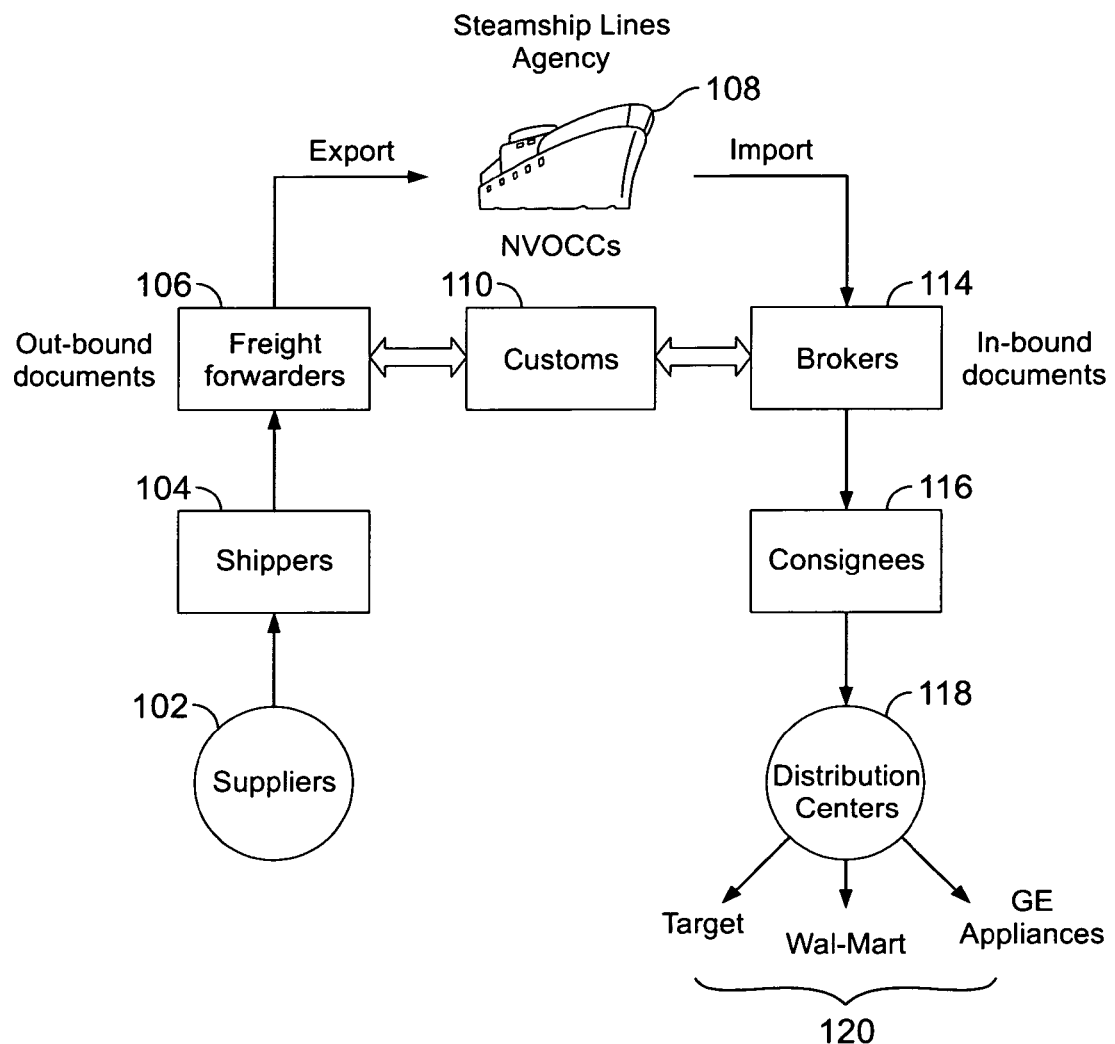
FIG. 1 is an illustration of a shipping cycle consistent with one or more aspects of the innovations herein.

FIG. 1 illustrates a shipping environment, parties involved and logistical framework. In a typical shipping cycle, for example, suppliers 102 use shippers 104 to transport freight, which is often handled by freight forwarders 106 during the freight's passage over a common carrier 108 and through customs 110. The goods are sometimes then handled by brokers 114, who deliver the goods to consignees 116 and eventually onto distribution centers 118 and retailers 120.

In accordance with aspects of the present inventions, various computer hardware, software, user interface (UI) and/or communications features may be utilized or involved in novel ways to provide the innovative systems and methods herein. According to certain embodiments, for example, an illustrative implementation may comprise a set of computer network based applications and machine readable instructions that interface with a Terminal's TOS (Terminal Operating System). In some embodiments, implementations herein are capable of providing real-time access to information and tools for SSCOs to update that information, e.g., via such interface. Consistent with the present disclosure, some implementations may drive operational efficiencies and/or improve customer service. Some additional beneficial characteristics of various implementations may include, for example, one or more of the following: minimizing cargo movement problems at the terminal; improving terminal operators' ability to successfully service SSCOs and carriers; removing terminals from the role of broker between trucking and steamship companies; eliminating reliance on phone, fax and other non-electronic instructions to the terminal; delivering real-time, accurate information carriers can use to quickly pass through terminal gates; preventing terminal/gate congestion; and/or expedited trouble resolution resulting in improved turn-times for entities transferring freight/cargo.

Various implementations herein have the capability of minimizing communication and can streamline various aspects of the processes. Further, some implementations may also accomplish benefits herein by interfacing with other applications, such as an associated tracking application. Here, for example such application may facilitate logistical information sharing and communication flow among members of the shipping industry.

For example, via features and functionality associated with the present systems and methods, implementations herein may allow SSCOs to be alerted when trouble occurs at a terminal. In addition, the SSCOs may be presented with the specifics of each issue and quick links to access, review and update their data related to the issue. Once the data has been corrected, the operating entity (e.g., driver, etc.) and terminal clerk can then proceed with their transactions.

As a function of these systems, methods and features herein, inventions herein possess capabilities and yield abilities to give terminals network-based visibility and functionality from a variety of places at any time. Terminals can view live trouble transactions by category, status, equipment number or gate pass number, with details of the same printed trouble tickets that the driver receives. In some implementations, a trouble page within the TOS web portal provides terminal operators with the ability to expedite resolutions.

Additionally, system and methods of some implementations may provide user access to real-time vessel schedules, import and export container information, gate activity, and/or user account information generated from a TOS. The terminal administrators can set up terminal-specific configuration and information; perform user account management and setup for automatic send of emails or faxes to users.

Figure 2:
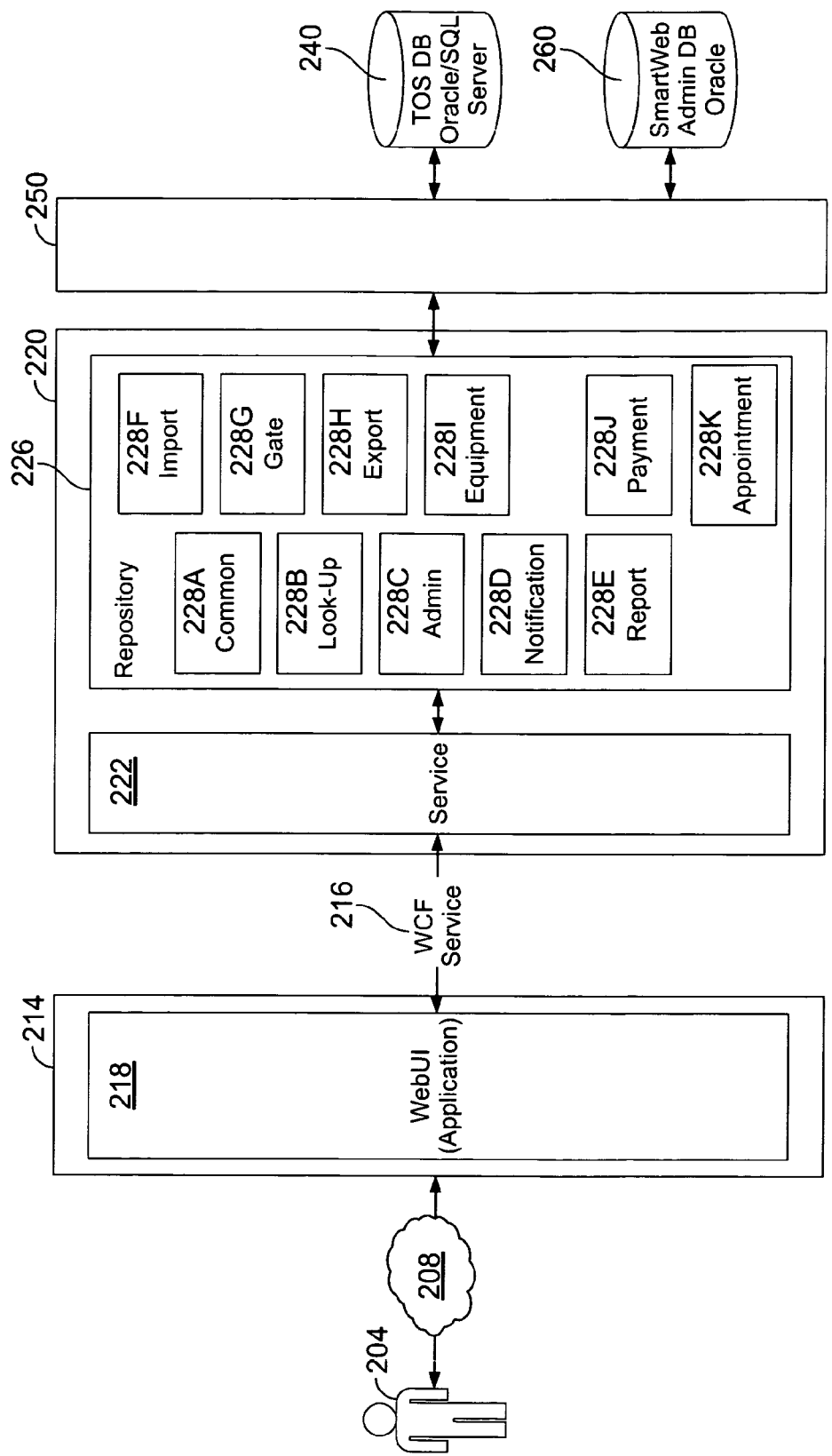
FIG. 2 is a block diagram of a Terminal Operating System consistent with one or more aspects of the innovations herein.

FIG. 2 details exemplary architecture of some illustrative implementations used to employ particular methods, which may be layered, module based and/or TOS agnostic. Examples of various features shown here are described below.

Layered Architecture

According to some implementations, innovative layered architecture(s) herein are capable of providing separation of concerns and factoring of code, which may also give a good maintainability and the ability to split out layers into separate physical tiers for scalability purposes. In one inception, innovations herein may perform processing and/or operate in four layers: Presentation 214, Service 222, Business Logic 220 and Data Access 250 layers. Here, the attached Appendices/computer program (CD) materials illustrate specific aspects and interrelations of the features described below and elsewhere herein.

Figure 3A:
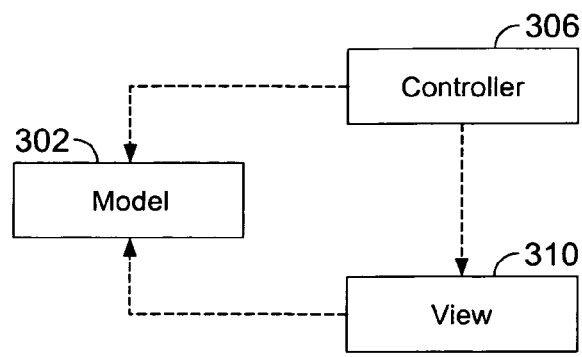
FIGS. 3A-3B are block diagrams of illustrative model, view and controller applications, components and/or interactions as may be associated with implementations of Terminal Operating Systems consistent with one or more aspects of the innovations herein.
Figure 3B:
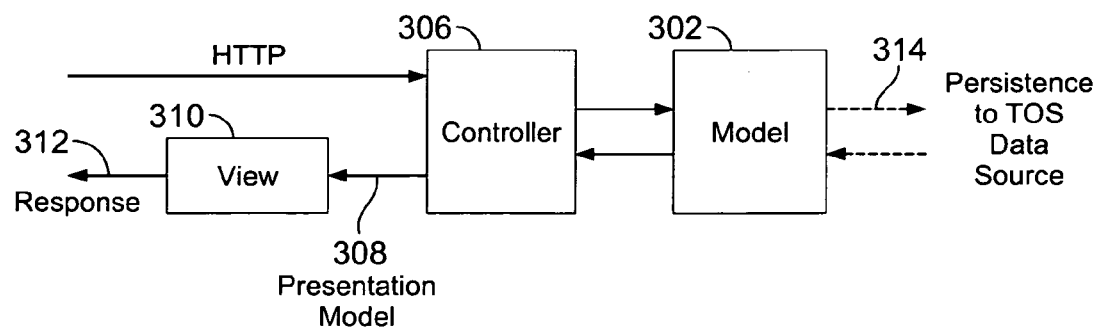

Referring to FIGS. 2 and 3, an illustrative system is shown in FIG. 2 including a representation of an exemplary Presentation Layer 214, which may be built on ASP.NET, and may include or involve components of a Model-View Controller (MVC) framework, e.g. as set forth in FIGS. 3A and 3B, able to implement the Model-View-Controller pattern. Such MVC pattern may separate the modeling of the domain, the presentation, and the actions based on user input 204 into three separate classes:

Model. The model 302 may contain or represents the data with which the user works. This can be either View Model or Domain Model. The model 302 manages the behavior and data of the application domain, responds to requests for information about its state (usually from the view), and responds to instructions to change state (usually from the controller).

View. The view 310 manages the display of information. Views may be utilized to render some part of the model 302 as a user interface ("UI").

Controller. The controller 306 interprets the mouse and keyboard inputs from the user 204, informing the model 302 and/or the view 310 to change as appropriate.

Exemplary details of such MVC framework are found in FIG. 3A which shows an example structural relationship between the three objects. Further, FIG. 3B shows an example set of Interactions in an MVC Application. In this example, the controller 306 incorporates HTTP input, and provides output represented as data in the model 302, which in some implementations may persist in a relational database 314. Finally, the controller may feed such data to the view 310 via a presentation model 308, which governs how the data are displayed, and may prompt or interact with a user regarding a response 312. For example, the controller receives HTTP messages which include details of user requests. Once the controller receives user request, the controller creates a model to process the request and uses it to communicate with database. The model is filled with information from database or used to update database. The model is then used to create a View that will be returned as a response.

Referring again to FIG. 2, a representative Service Layer 222 is shown, wherein an application's boundary with a layer may be defined that establishes a set of available operations and coordinates the application's response in each operation, the service layer 222 may include the service contracts and operation contracts that are used to define the service interfaces that will be exposed at the service boundary. Data contracts may also be defined to pass in and out of the service.

In one example instantiation, the invention may implement a WCF (Windows Communication Foundation) service 216, a framework for building service-oriented applications. However, in such instantiation(s), the service boundaries may be explicit, which means hiding all the details of the implementation behind the service boundary 222. This includes revealing or dictating what particular technology was used.

Figure 4:
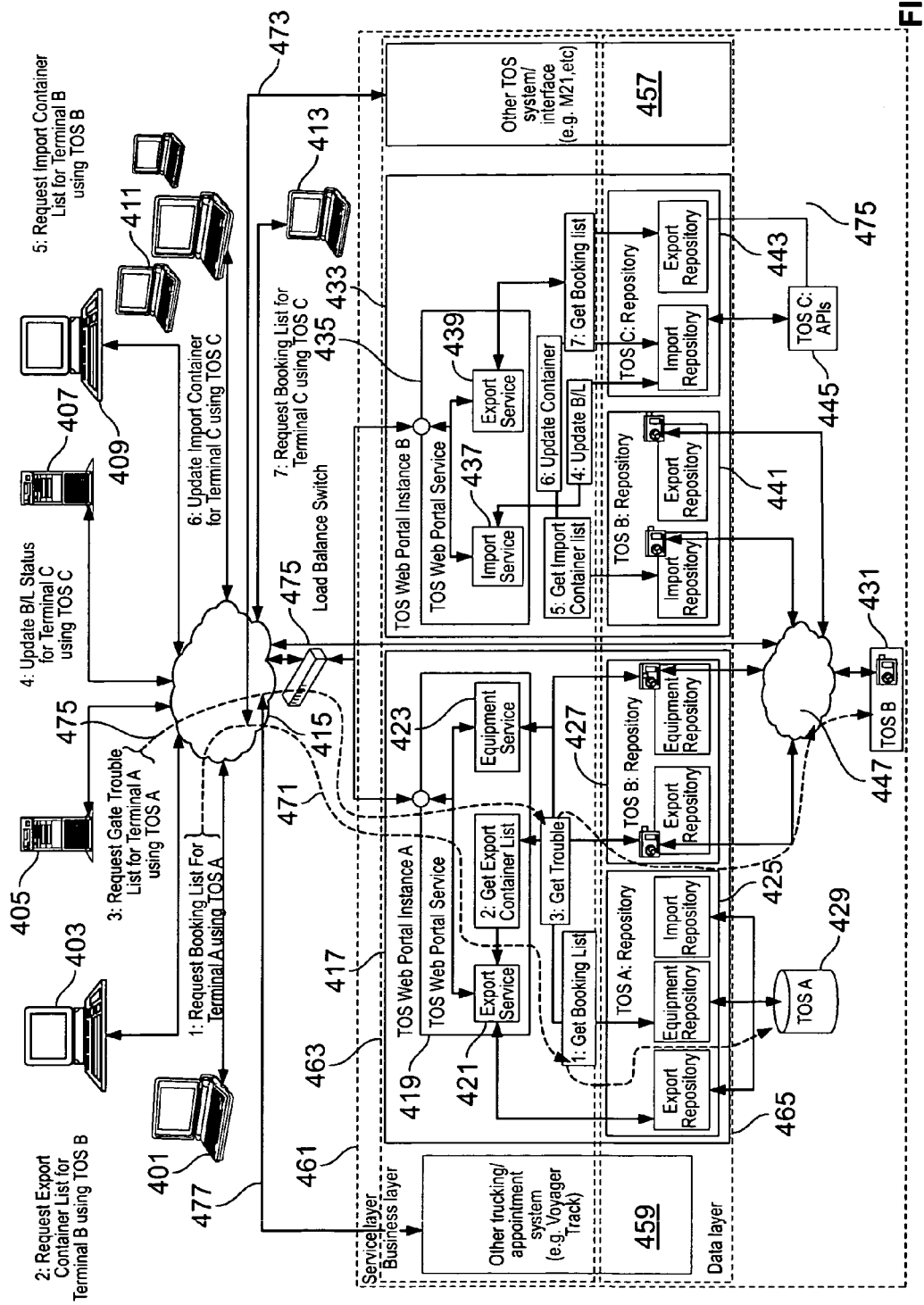
FIG. 4 is a block diagram showing various entities and interactions within or among such entities and an illustrative web- or network-based system consistent with one or more aspects of the innovations herein.

FIG. 4 is a block diagram showing various entities and interactions within or among such entities and an illustrative web- or network-based system consistent with one or more aspects of the innovations herein. Terminal Operating System information may be input by a device 401-413 that includes, but is not limited to a computer, laptop, mobile device, server, etc. that may request and obtain terminal information from any of a plurality of Terminal Operating Systems 429, 431 and 445. Any of the data requests 1-7 may be input at any of the devices 401-413. The requests for information are transmitted through a network 415 to a TOS web portal instance A 417 or TOS web portal instance B 433. In FIG. 4, requests 1-3 are processed by web portal A 417 and requests 4-7 are processed by web portal instance B 433. The request 1 is a request for the booking list for Terminal A that operates under the Terminal Operating System A. The request is routed to the web portal instance A and processed by the export service 421. A GetBookingList method is called by the export service to the TOS A repository 425, and specifically the export repository, where the booking list is obtained. If the requested booking repository type is already cached, then the data is retrieved from TOS A database 429 using the repository instance. However, if the requested booking repository type is not in the repository cache, then the repository instance is created and added to the cache. This newly created repository instance is utilized to retrieve the booking listing from the TOS A database 429. Once retrieved, the booking list information that is provided in the TOS A format is mapped by the repository 425 into a TOS agnostic format such as a business entity or business object format that is processed and presented to the user in the same manner, no matter which TOS the data is obtained from. Conversion from the TOS agnostic format to a TOS specific format is performed in the repository. Accordingly, all the data requests/commands inputted by any of the devices 401-413 are processed in a TOS agnostic format. Only when interfacing directly with the Terminal Operating Systems are the TOS agnostic data converted into data formats compatible with the different Terminal Operating Systems. Thus, a user is able to interact with a plurality of Terminal Operating Systems from a single device without concern for the Terminal Operating System employed by each terminal.

A similar process occurs for each of the remaining requests 2-7, with differences in which web portal instance, service and repository are accessed. For example, a user at device 403 requests an export container list (#2) for a Terminal B that operates using a Terminal Operating System B different from the Terminal Operating System A. The request 2 for the export container list is routed to the export service 421 of the web portal instance 417. A GetExportContainerList method is called to an export repository of the TOS B repository 427. This export repository retrieves the requested export container list from the web portal service TOS B 431 via a network 447. The web portal instance A 417 returns the export container list 403 to the device 403.

A user at device 407 may input an update for a bill of lading (B/L) status for a Terminal C using a Terminal Operating System C. The update is input in a TOS agnostic data format. The update is transmitted to the import service 437 of the web portal instance B 433. An update B/L method is called by the import service 437 to the import repository of the TOS C repository 443. Within the TOS C repository 443, the import repository maps the user input of the B/L update status into the TOS C data format and transmits the update to the TOS C API 445. In response, the TOS C API 445 may transmit an acknowledgement or other reply to the TOS C repository 443. The TOS C repository 443 transforms any data in the TOS C format into the TOS agnostic format and returns the relevant information to the device 407.

Taking one more example, a user at device 413 inputs a request for booking list information for the Terminal C that operates using a TOS C that is different from TOS A and TOS B. The request is forwarded to an export service 439 of the web portal instance B 433. The export service 439 calls a GetBookingList method to the export repository of the TOS C repository 443.

Referring to FIG. 4, interrelations with other entities, such as a trucking/appointment system 459 (e.g., a system like VoyagerTrack, etc.) and another TOS system/interface 457 (e.g., a system like M21, etc.) are shown. By features herein, information and data may be processed throughout the service layers of any such systems or entities. For example, a request 477 from a trucking/appointment system 459 may be processed consonant with a request 475 regarding gate trouble (#3) from entity 405. Also by way of example, a request 473 from another TOS system/interface 457 may be processed consonant with a request 471 for a booking list (#1) from entity 401.

Figure 5:
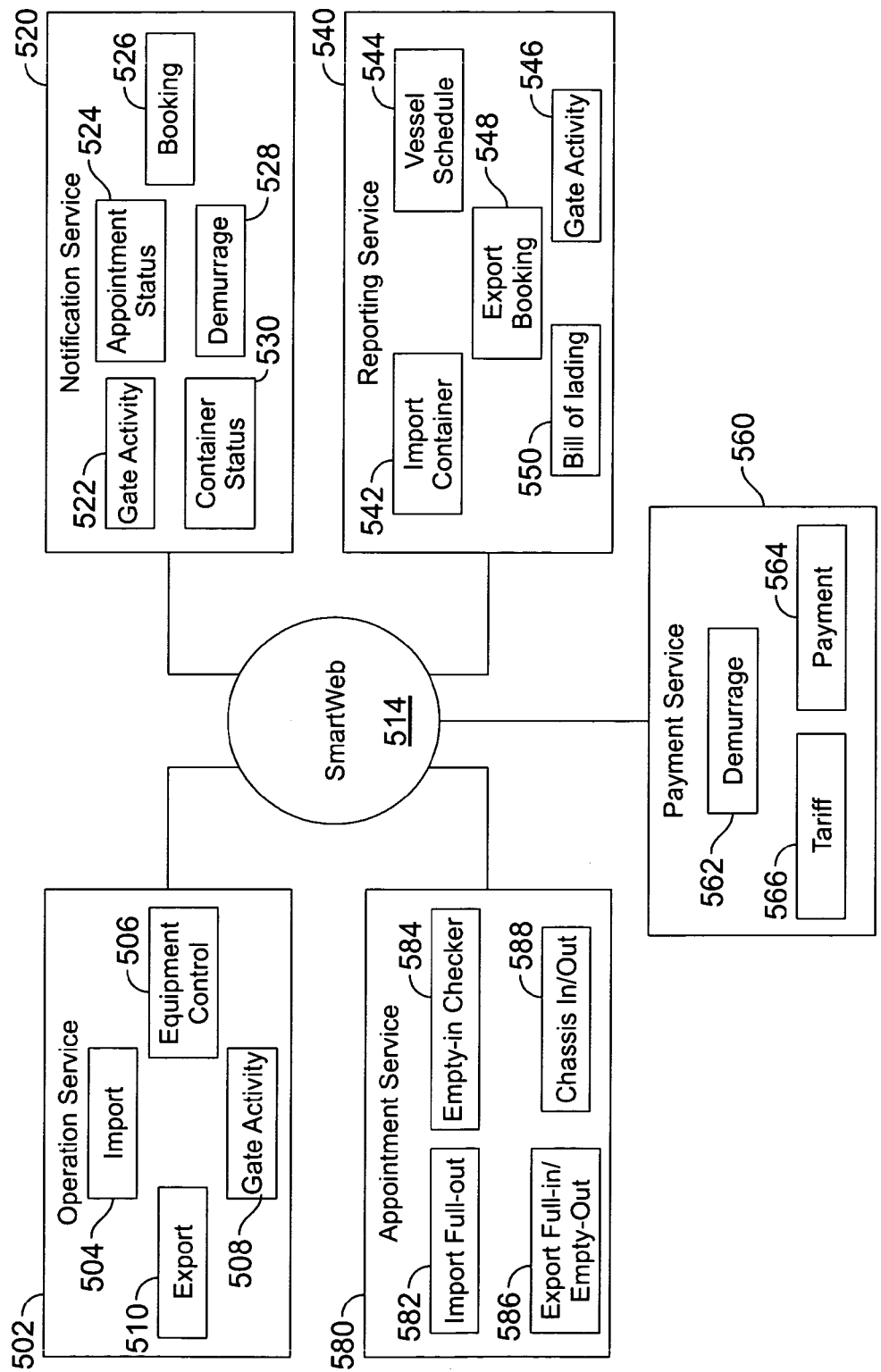
FIG. 5 is a block diagram depicting various exemplary features, services or components involved with present TOS web portal implementations consistent with one or more aspects of the innovations herein.

FIG. 5 is a block diagram depicting various exemplary features, services or components involved with present TOS web portal implementations 514 consistent with one or more aspects of the innovations herein. Referring to FIG. 5, implementations of the present systems may include or involve components such as an operation service 502, an appointment service 580, a payment service 560, a notification service 520 and/or report service 540, among other such components. Some of these example services are shown in FIG. 5. In some illustrative implementations, the operation service 502 component may include a subcomponent service to handle import 504, export 510, equipment control 506, and gate activity 508. Similarly, an illustrative notification service 520 may include subcomponent services for gate activity 522, appointment status 524, booking 526, demurrage 528, and container status 530. The reporting service 540 may include subcomponent services for import container 542, vessel schedule 544, export booking 548, gate activity 546, bill of lading 550. The payment service 560 may include subcomponent services for demurrage 562, tariff 566, and payment 564. The appointment service 580 may include subcomponent services for import full-out 582, empty-in checker 584, export full-in/empty-out 586, and chassis in/out 588.

In another example, the service layer 222 is compiled into a separate class assembly and hosted in a service host environment. The application layer 214 only knows about and has access to this layer. Whenever a request is receive by the service layer 222, the request is dispatched to the repository 226 and the business logic layer performs the work. If any database support is needed by the repository 226, it goes through the data access layer 250.

Referring again to FIG. 2, the third layer in this illustrated example is the Business Logic Layer 220. Such business logics associated with TOS web portal 514 implementations herein may be represented by a domain model which is a conceptual layer that represents the TOS web portal 514 business domain. Such domain model(s) may freely mingle data and process, have multi-valued attributes and a web of associations, and uses inheritance.

According to one illustrative TOS web portal 514 implementation, the domain model may be configured to look like the database design with mostly one domain object for each database table. Further, here, because the behavior of the business is subject to change, it is important to be able to modify, build, and test this layer easily. As such, minimum coupling features from the domain model to other layers in the system may be implemented.

Entities.

Figure 6:
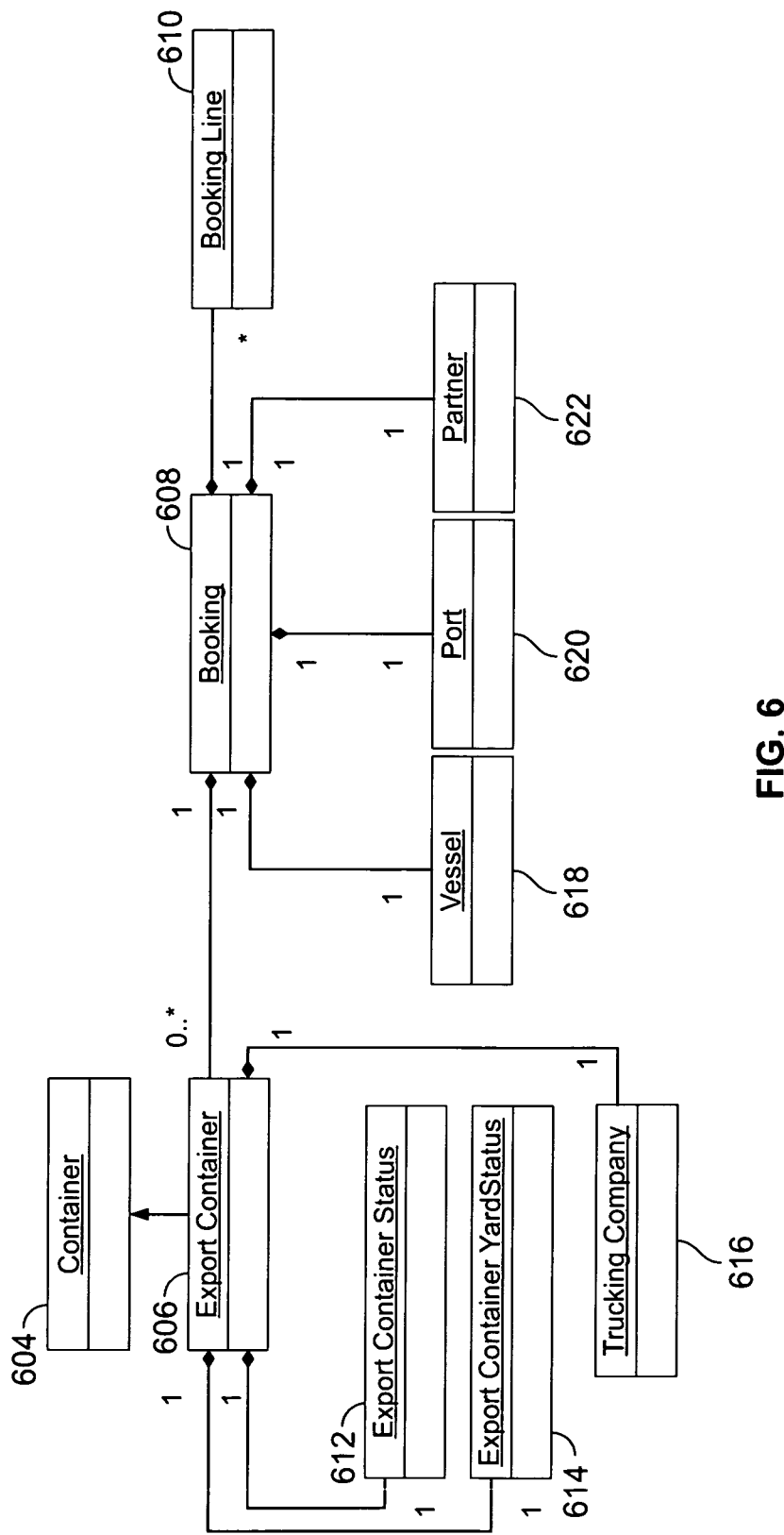
FIG. 6 is a block diagram depicting exemplary booking module aspects and entities consistent with one or more aspects of the innovations herein.

Implementations of such TOS web portal 514 may define business object as an entity, such as Bill of Lading, Container, Equipment, Booking, Release, etc. Each entity may represent some meaningful individual in business domain. These objects mimic the data in business and objects that capture the rules the business uses. Inheritance, compositions, aggregation relationships are defined among those entities. FIG. 6 depicts an example of Entities in the Booking Module. A Booking Entity has Vessel, Port, Partner and Booking Line entities as properties and there are one-to-one relationships between them except Booking Line. Booking and Booking Line has one-to-many relationships. Booking entity might have one or more Export Container entities which are inherited from Container object. Export Container entity has Export Container Status, Export Container Yard Status, and Trucking Company entities as properties and has one-to-one relationship. Here, for example, such booking object 608 may have vessels 618, port 620, partners 622 objects, as well as trucking company 616 and status of export containers 606.

Repository.

Referring once again to FIG. 2, the repository 226 mediates between the data source layer 250 and the business layers 220 of the application. In some implementations, it queries the data source for the data, maps the data from the data source to a business entity, and persists changes in the business entity, and presents changes to the data source. Further, the repository 226 may separate the business logic from the interactions with the underlying data sources.

Referring once again to FIG. 2, the fourth layer of the example is the data access layer 250. In some implementations, the data access layer 250 is the layer that is solely responsible for talking to the data store and persisting and retrieving business objects. The layer typically includes all the create, read, update and delete (CRUD) methods, transaction management, data concurrency, as well as a querying mechanism to enable the business logic layer to retrieve object for any given criteria.

Module Based Applications

In certain instances of the system and method here, such TOS web portal 514 may be a module-based application and is capable of having a collection of modules that can be added and removed independently. Each module may be defined as a .NET assembly (dynamic link library assembly) within the TOS web portal 514. Further, a module can be responsible for exposing business logic to a client which is any entity that uses the module.

If a user desires to modify a module implementation, changes may be constrained to that module only. Such module-based architecture allows modules and clients to evolve separately. New versions of the existing module can be deployed without affecting existing client applications. Also new version of the existing client application can be deployed without affecting existing modules.

Figure 7:
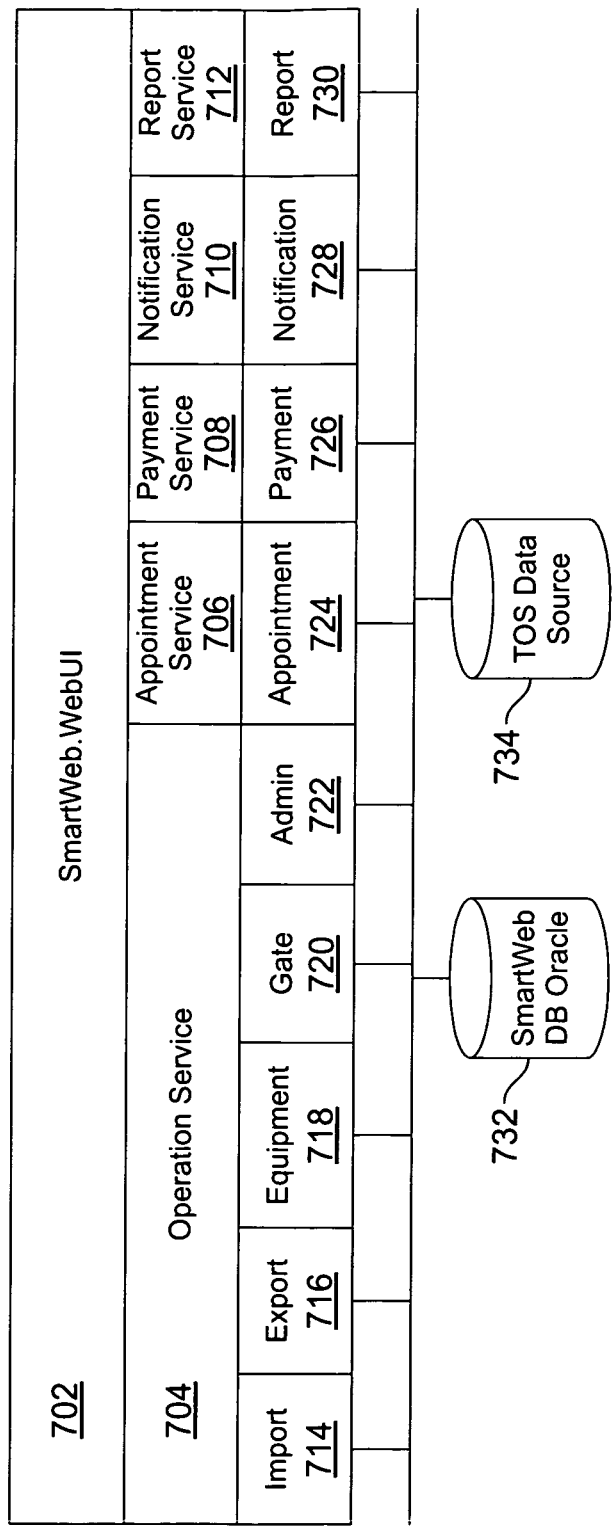
FIG. 7 is a diagram showing exemplary hierarchy and structure of illustrative web-based modules consistent with one or more aspects of the innovations herein.

According to some implementations herein, development of modules in such TOS web portal implementations may have one or more of the following characteristics, some of which are depicted in FIG. 7:

Interface-Based Programming
    Characterizing separation of interface from implementation. Here, for example, the client may be coded against an abstraction of a service (the interface), not a particular implementation of it (the object). As a result, changing an implementation detail on the server side or even switching to a different service provider does not affect the client.

Location Transparency
    TOS web portal implementations 514 may contain multiple modules. These modules can all exist in the same process, in different processes on the same machine, or on the different machines on a network. However, there may not be anything in the client's code pertaining to where the objects execute.

Versioning Support
    Implementations herein may deploy new versions or updated versions of existing modules without affecting other modules. As a result, a module can be allowed to evolve along different paths and different versions of the same module can be deployed on the same machine, or even in the same client process, side by side.

Further, embodiments of TOS web portal 514 herein may include, involve and/or have access to capabilities of import 714, export 716, gate 720 and equipment control modules 718 that are able to replace traditional functionalities in existing systems and report 730, appointment 724, payment 726 and notification modules 728 for associated tracking applications/components and admin module 722 that combines both applications.

TOS Agnostic

Some implementations or instantiations of the system and methods disclosed herein may include a TOS Agnostic design. That is, the system is configured so that operation may occur without 'care' for various processing as to which TOS it is dealing with. In the context of the frameworks set forth above, for example, such implementations may include configuration(s) as a Repository-Pattern. The repository pattern is used to enable Terminal Operating System (TOS) independence. Each TOS may utilize its own unique database schema.

Figure 8:
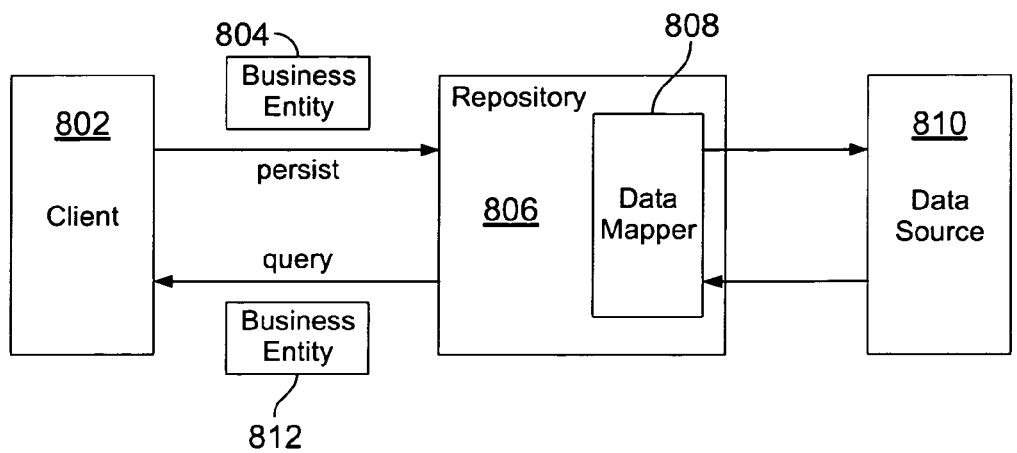
FIG. 8 is a block diagram showing illustrative aspects of repository mapping from TOS to business entities consistent with one or more aspects of the innovations herein.

FIG. 8 is a block diagram showing illustrative aspects of repository mapping from TOS to business entities consistent with one or more aspects of the innovations herein. Referring to FIG. 8, an illustrative repository 806 may separate the logic that retrieves the data and map it to the entity model from the business logic that acts on the model. Further, the business logic may be agnostic to the type of data that comprises the data source layer 810. For example, the data source layer 810 can be a database or a Web service. FIG. 8 shows an example repository mapping from TOS to business entities 804, 812.

Figure 9:
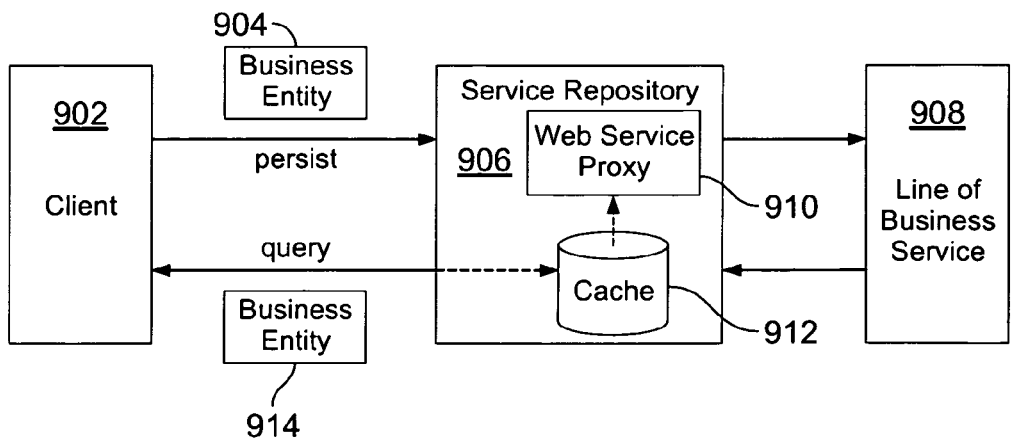
FIG. 9 is a diagram showing an illustrative repository caching scheme consistent with one or more aspects of the innovations herein.

FIG. 9 is a diagram showing an illustrative repository caching scheme consistent with one or more aspects of the innovations herein. Here, for example, a backing store for data can be a business service that is exposed by a line-of-business (LOB) application 908. Services are often expensive to invoke and benefit from caching strategies that are implemented within the repository 906. In such cases, the query logic in the repository 906 may first check to see whether the queried repository instance are in the cache 912. If they are not, the repository 906 accesses the Web service to retrieve the information. Such illustrative caching scheme is shown in FIG. 9.

Figure 10:
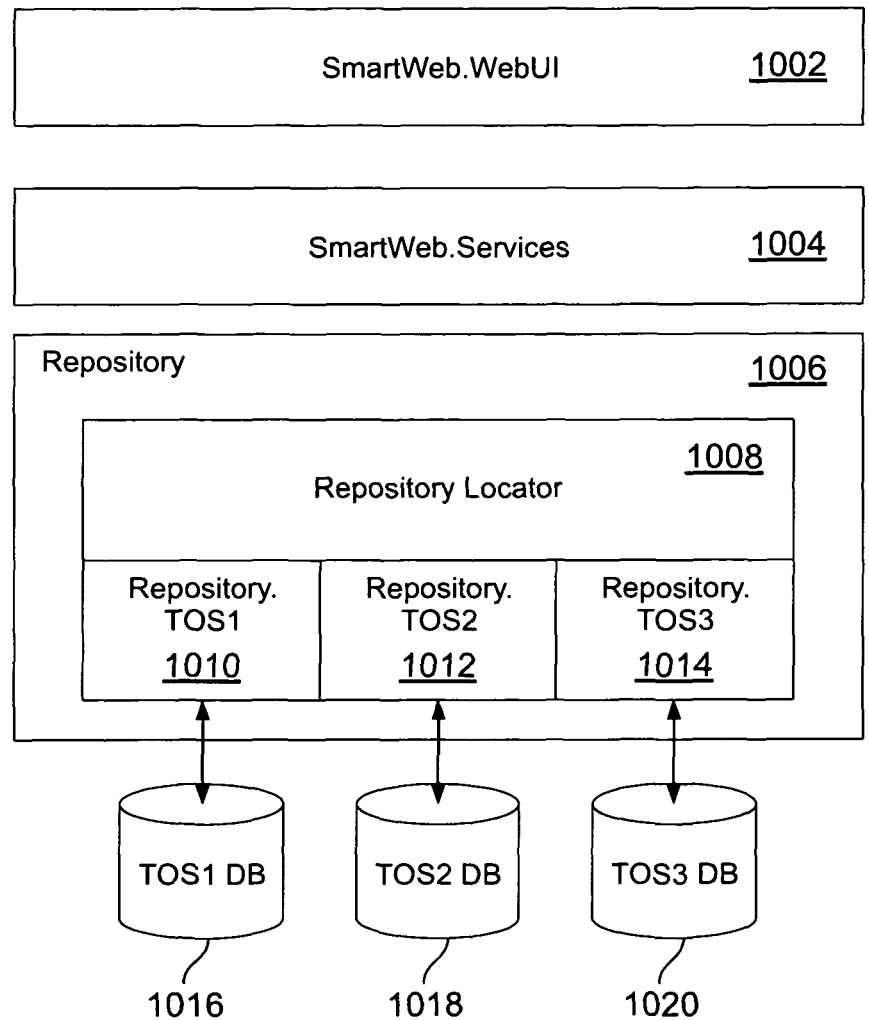
FIG. 10 is an illustration of an exemplary TOS-independent or TOS-agnostic repository locator consistent with one or more aspects of the innovations herein.

FIG. 10 is an illustration involving an exemplary TOS-independent or TOS-agnostic repository locator consistent with one or more aspects of the innovations herein. Referring to the representative diagram of FIG. 10, a services component 1004 of the TOS web portal may be designed to support multi-terminals with different Terminal Operating Systems. To support multi-terminals in a TOS agnostic way, the services component 1004 may include or involve another component or application that performs processing associated with and looks up the repository that provide access to distributed terminal databases 1016, 1018, 1020. Here, for example, such functionality may be accomplished via a repository locator component or device 1008.

According to implementations herein, such repository locator 1008 may centralize distributed repository lookups, provide a centralized point of control, and may act as a cache that eliminates redundant lookups. Again, an exemplary TOS independent repository locator is shown in FIG. 10. Additional technical details of some TOS agnostic innovations are set forth further below and in the included Appendix materials.

System and Process Architecture

The design and architecture of some of the examples of the system disclosed here, enable the present TOS Web Portal implementations 514 to be an add-on to any existing TOS as opposed to being integrated with a single TOS. This approach allows the present innovations and functionality to be incorporated into any existing TOS through a webservice API layer. Interfaces to other TOS's can be accomplished without the need to re-design or re-architect the TOS Web Portal implementations herein.

Figure 11:
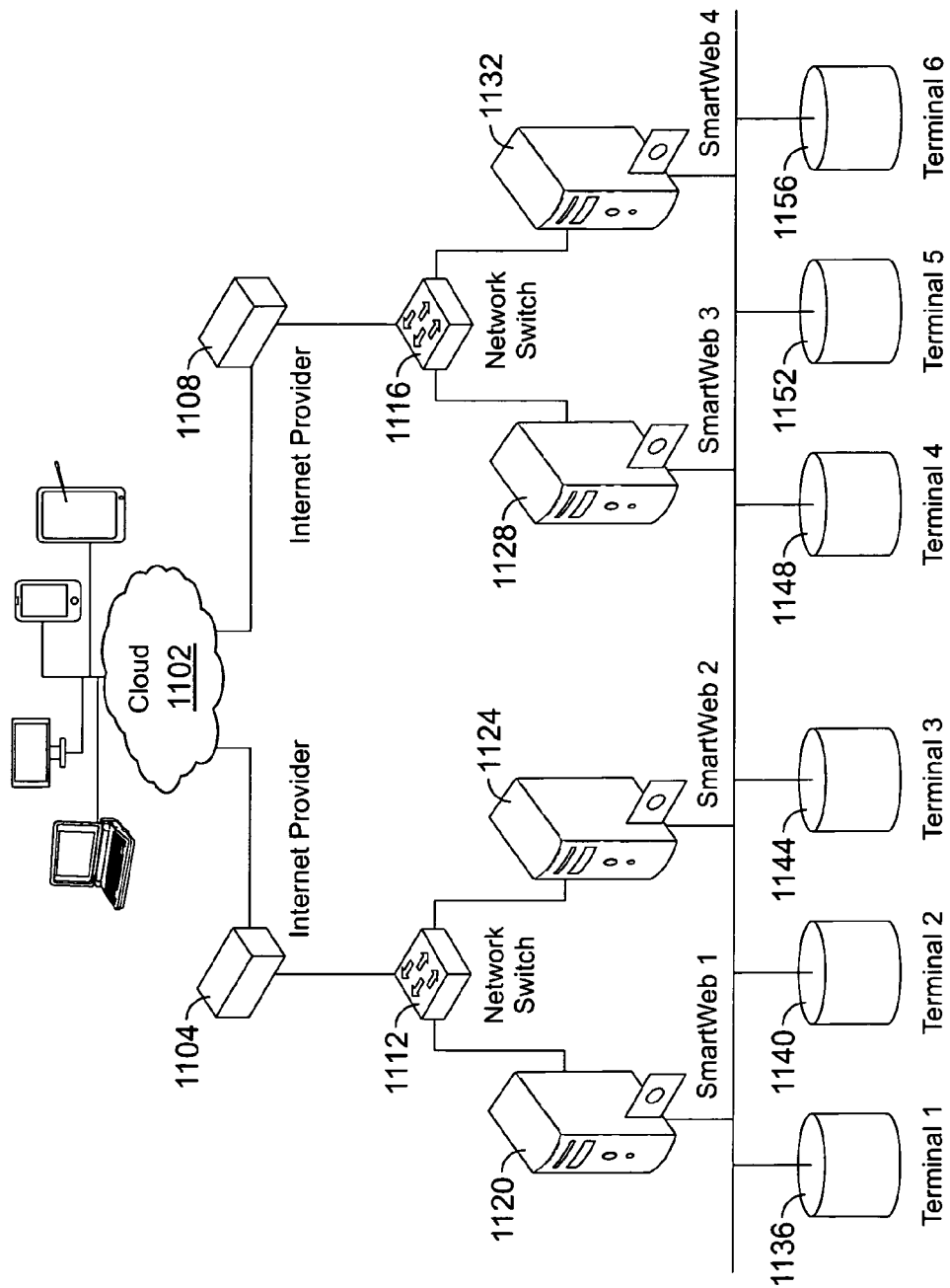
FIG. 11 is a block diagram illustrating exemplary system topology consistent with one or more aspects of the innovations herein.

FIG. 11 is a block diagram illustrating exemplary system topology consistent with one or more aspects of the innovations herein. For instance, multiple instances of the TOS web interface server will be deployed in two physical locations to support multiple terminals. One location has two instances (1120 and 1124) those are connected via Network Switch. Network Switch distributes user requests to balance load in each server instance. Another set of server instances (1128 and 1132) perform in the same way but are located in different physical location to recover problems such as earth quake, power shortage in a certain location, etc. As such, multiple instances of the present TOS Web Portal 1120, 1124, 1128, 1132 may be used to interface with multiple different TOS systems 1136, 1140, 1144, 1148, 1152, 1156, even across multiple internet providers 1104, 1108, all interfacing with a central cloud server 1102.

Object Oriented Programming (OOP)

Systems and methods herein may also be configured using concepts and rules of Object-Oriented Programming. Here, for example, some implementations may utilize objects—data structures consisting of data fields and methods—that are defined along with abstractions of business processes for Terminal Operation. Such implementations utilizing object-oriented features and/or programming may provide many benefits, such as in one or more areas of reusability, extensibility, decoupling, maintainability, and/or reducing complexities, among others.

Reusability.

Some illustrative object-oriented implementations with reusability features may be configured with classes, which can be used by several applications. For example, such systems and methods may define common business model as objects and represent them using classes, such as Container, Vessel, Port, Partner, etc. Illustrative constructs, here, may include configurations such as seen in Insert X1: Reusability Code Example:

X1: Reusability

In the object-oriented approach, we build classes, which can be used by several applications. smartWeb defines common business model as objects and represent them using classes, such as Container, Vessel, Port, Partner, etc.

```
public class Vessel: IEquatable<Vessel>
{
public string VesselCode {get; set;}
public string Name {get; set;}
public string CallYear {get; set;}
public string CallSequence {get; set;}
public string VoyageNumber {get; set;}
}
public class Container
{
public string Number {get; set;}
public string CombinedCode {get; set;}
public ContainerType Type {get; set;}
public ContainerLength Length {get; set;}
public ContainerHeight Height {get; set;}
}
public abstract class Partner
{
public PartnerKey Key {get; set;}
public string ScacOrSscoType {get; set;}
public string ScacOrSscoCode {get; set;}
public string EnglishShortName {get; set;}
public string AgreementNotSigned {get; set;}
public string InsuranceNotReceived {get; set;}
public string InsuranceExpired {get; set;}
public string PerDiemCheck {get; set;}
public string RepairCheck {get; set;}
public DateTime? EIAStartDate {get; set;}
public DateTime? EIAEndDate {get; set;}
public string CitationCheck {get; set;}
public virtual bool AgreementExists {get; set;}
private bool m_isOnHold;
public virtual bool IsOnHold
{
   get
   {
      return             AgreementExists             &&
         (AgreementNotSigned==DomainConstants.YES||
         InsuranceNotReceived==DomainConstants.YES||
         InsuranceExpired==DomainConstants.YES||
```

```
        PerDiemCheck==DomainConstants.YES||
        RepairCheck==DomainConstants.YES||
        CitationCheck==DomainConstants.YES);
    }
    private set {m_isOnHold=value;}
}
private bool m_isAgreementValid;
public virtual bool IsAgreementValid
{
    get
    {
        return AgreementExists && EIAStartDate.HasValue
            &&
            EIAEndDate.HasValue &&
            EIAStartDate.Value.Date <=DateTime.Today &&
            EIAEndDate.Value.Date >=DateTime.Today;
    }
    private set {m_isAgreementValid=value;}
}
}
```

Here, such constructs and definitions of objects may be reused throughout the application many times. Furthermore, the same object may be used to extend existing features or add new feature of the application. Accordingly, applications may be modified using working objects and thus code does not need to be written from scratch. Such reuse of objects reduces the effort of recreating them as well as reduces the chances of introducing errors. This not only saves development time but also improves the robustness of such applications.

Further, various OOP's programming functions and modules can be reused. For example, the following, Insert X2: Table Example may be used to call a method in service. The same function may also be used throughout application since the method is defined OOP practices.

X2: Reuse

These definitions of objects are reused throughout the application in many times. Furthermore, the same object is used to extend existing features or add new feature of the application. We modify applications using working objects and do not need to write code from scratch. The reuse of objects reduces the effort of recreating them as well as reduces the chances of introducing errors. This not only saves development time but also improves the robustness of the application.

In OOP's programming functions and modules can be reused. The following method is used to call a method in service. The same function is used throughout application since the method is defined OOP practices.

```
public TResponse Call<TRequest, TResponse>(
    TRequest request,
    Func<MainServiceClient, TRequest, TResponse> cal-
        lOperation,
    Action<string> onFailure=null)
{
    try
    {
        var principal=HttpContext.Current.User as PortsPrin-
            cipal;
        using (var contextScope=new OperationContextScope
            (ServiceClient.InnerChannel))
        {
            if (principal !=null)
                SetupMessageHeader(principal);
            return callOperation(ServiceClient, request);
        }
    }
```

```
    catch (FaultException<ServiceException> ex)
    {
        CLogManager.LogError("faultexception"+ex.Mes-
            sage);
        if (onFailure !=null)
            onFailure.Invoke(ex.Message);
        return default(TResponse);
    }
    catch (FaultException ex)
    {
        CLogManager.LogError("faultexception"+ex.Mes-
            sage);
        if (onFailure !=null)
            onFailure.Invoke(ex.Message);
        return default(TResponse);
    }
    catch (CommunicationException ex)
    {
        CLogManager.LogError("communication error");
        CLogManager.LogError(ex);
        CloseService( );
        m_serviceClient=new MainServiceClient( );
        if (onFailure !=null)
            onFailure.Invoke(ex.Message);
        return default(TResponse);
    }
    catch (Exception ex)
        if (onFailure !=null)
            onFailure.Invoke(ex.Message);
        return default(TResponse);
    }
    finally
    {
        CloseService( )
    }
```

Extensibility. To illustrate such features, see Insert X3 assume Trucker is the salient Partner. Here, then, implementations may define a trucker by inheriting Partner. Via such aspects implementations may eliminate redundant code and extend the use of existing classes.

X3: Extensibility

Trucker is a Partner. Thus, we define a trucker by inheriting Partner. Through this we can eliminate redundant code and extend the use of existing classes.

```
public class Trucker: Partner
{
public string TruckerCheck {get; set;}
public bool IsValid
{
    get
    {
        return IsAgreementValid && !IsOnHold;
    }
}
public override bool IsOnHold
{
    get
    {
        return    base.IsOnHold||TruckerCheck==Domain-
            Constants.YES;
    }
}
}
```

Decoupling. With regard to decoupling, systems and methods may be configured to decouple modules using an interface instead of using the implementation. In some implementations, for example Insert X4, a Repository object may be defined to satisfy interfaces. Such decoupling of interface from implementation enabling the application to be TOS agnostic; illustrative configurations, here, may be structured as follows.

X4: Decoupling

OOP practices in smartWeb decouple modules using an interface instead of using the implementation. For example, Repository object is defined to satisfy interfaces. This decoupling of interface from implementation allows for the application being TOS agnostic.

public override IBookingRepository LocateBookingRepository( )

public override IBookingOperationRepository LocateBookingOperationRepository( )

public override ITransshipBookingRepository LocateTransshipBookingRepository( )

public override IExportContainerRepository LocateExportContainerRepository( )

public override IBillOfLadingRepository LocateBillOfLadingRepository( )

public override IContainerRepository LocateContainerRepository( )

public override IImportDrayInRepository LocateImportDrayInRepository( )

public override IRailBookingRepository LocateRailBookingRepository( )

public override IPreStageHazardousRepository LocatePreStageHazardousRepository( )

public override IBookingNonHazardousRepository LocateBookingNonHazardousRepository( )

Maintainability. Via use of objects and various OOP features herein, functions defined in such implementations may have very simple return values and parameters compared to those in existing systems. The following table show some illustrative examples as seen in Insert X5:

X5: Maintainability

Using objects, functions defined in smartWeb have very simple return values and parameters compared to those in existing webTAMS. Following table show some example.

TABLE 1

| WebTAMS | smartWeb |
|---|---|
| Public Function FetchEquipment(<br>ByVal strEquipment As String, _<br>ByRef rsReturn As Variant, _<br>ByRef intContainerStatus As Variant, _<br>ByRef param0 As Variant, _<br>ByRef param1 As Variant, _<br>ByRef param2 As Variant, _<br>ByRef param3 As Variant, _<br>ByRef param4 As Variant, _<br>ByRef param5 As Variant, _<br>ByRef param6 As Variant, _<br>ByRef param7 As Variant, _<br>ByRef param8 As Variant, _<br>ByRef param9 As Variant, _<br>ByRef param10 As Variant, _<br>ByRef param11 As Variant, _<br>ByRef param14 As Variant, _<br>ByRef varInOutData As Variant, _<br>ByRef varAuthSSCO As Variant, _<br>ByRef varMessage As Variant, _ | public EquipmentContainer FindEquipmentContainer(string equipmentNumber, string ssco, IList<string> associatedSsco) |

TABLE 1-continued

| WebTAMS | smartWeb |
|---|---|
| ByRef pstrPendSvcCode As Variant, _<br>ByRef pstrPendRemark _<br>) As Integer | |
| Public Sub FetchInOutData(ByVal strCntr As String,<br>ByVal strVslCd As String,<br>ByVal strCallYr As String,<br>ByVal strCallSeq As String,<br>ByRef varReturn As Variant,<br>varMessage As Variant) | private EquipmentContainer GetInOutData (EquipmentContainer container) |
| Private Function UpdateALL(ByVal pstrTerminal,<br>ByVal strLocalCearValue As Variant,<br>ByVal pstruserid As Variant, _<br>ByVal strUSDAValue As Variant,<br>ByVal strFreightValue As Variant, _<br>ByVal pstrDemStatusValue As Variant,<br>ByVal pstrSSCO As Variant, _<br>ByVal pstrTruckerCode As Variant,<br>ByVal pstrTruckerName As String, _<br>ByVal pstrOrigTrucker As String,<br>ByVal pstrCustomRmk As String, _<br>ByVal lngPIN As Variant,<br>strOriginalPIN As Variant, _<br>ByVal strFreeDays As Variant,<br>ByVal strDemRateCode As Variant, _<br>ByVal strContNumber As Variant,<br>strMessage As Variant, _<br>ByVal pstrRights As Variant,<br>ByVal pstrDemDate As Variant, _<br>ByVal pstrServiceCode As Variant,<br>ByVal pstrBondDest As Variant, _<br>ByVal pstrCarrierStatus As Variant,<br>ByVal pstrCarrierCategory As Variant, _<br>ByVal pstrCarrierRemark As Variant, _<br>ByVal pstrBlNo As Variant, _<br>ByVal strVslCd As Variant,<br>ByVal strCallYear As Variant,<br>ByVal strCallSeq As Variant, _<br>ByVal pstrOverrideTRKCode As Variant,<br>ByVal pstrOverrideTRKName As String, _<br>ByVal pstrCustomStatus As Variant,<br>Optional ByVal boolUpdateTrk As Boolean = True, _<br>Optional ByVal boolUpdateOverrideTrk As Boolean = True) As Boolean | public bool Update (ImportContainer container) |
| Private Function ValidateTruckerFully(<br>ByRef pstrSTCTrucker As Variant,<br>ByVal pstrShippingCo As String, _<br>ByVal pstrTruckerCode As Variant,<br>ByRef pstrTruckerCompany As Variant, _<br>ByRef pstrTrucker As Variant,<br>ByRef pstrTruckerName As String, _<br>strMessage As Variant) As Integer | private bool ValidateTruckerInfo (ImportContainer container) |

Reducing complexity/complexities. Here, such advantages may be achieved in that a given problem in business can be viewed as a collection of difference objects. Each object represents a business entity and has all business properties and processes as properties and methods. This abstraction reduces the complexity of a problem and makes it easy to manage the complexity. For example, Insert X6, EquipmentControlEditModel object abstracts all business properties and processes relevant to managing containers or chassis in terminal.

X6: Reduced Complexity of a Problem

A given problem in business can be viewed as a collection of difference objects. Each object represents a business entity and has all business properties and processes as properties and methods. This abstraction reduces the complexity of a problem and makes it easy to manage the complexity.

For example, EquipmentControlEditModel object abstracts all business properties and processes relevant to managing containers or chassis in terminal.

```
public class EquipmentControlEditModel
{
public InquiryModel Inquiry {get; set;}
public MultiInquiryModel MultiInquiry {get; set;}
public string SteamshipCompany {get; set;}
public EquipmentState State {get; set;}
public string InventoryStatus {get; set;}
public string DamageCondition {get; set;}
public string Memo {get; set;}
public string InDate {get; set;}
public string OutDate {get; set;}
public string InGatePass {get; set;}
public string OutGatePass {get; set;}
public bool HasAction {get; set;}
public string ActionType {get; set;}
public string ServiceCodeDescription {get; set;}
public bool HasPendingAction {get; set;}
public bool ShowErrorMessage {get; set;}
public string ErrorMessage {get; set;}
}
```

Figure 12:
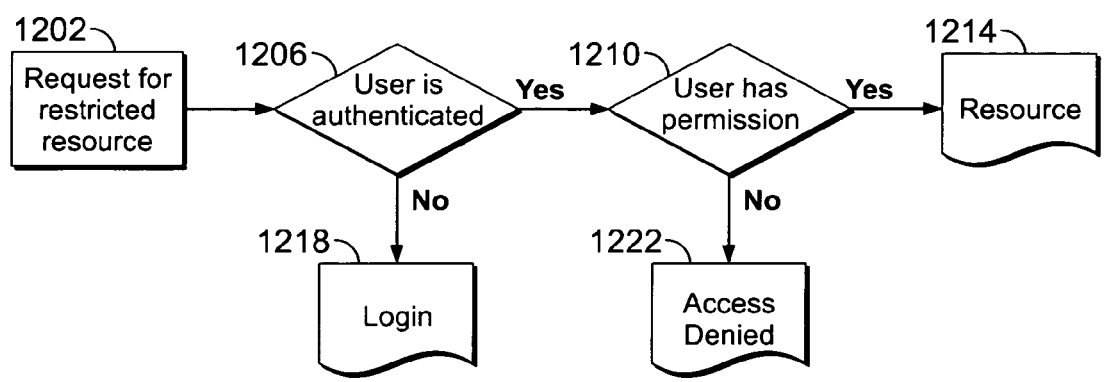
FIG. 12 is an exemplary flow diagram of an illustrative user authentication and authorization process consistent with one or more aspects of the innovations herein.

This modularity makes an object to be maintained independently of other objects. All these objects are independent of each other and are maintained separately. Also it can make modifications in an object without affecting functionalities of other objects Security Embodiments of the present TOS Web Portal systems and methods may have one or more of the following security implementations: authentication to authenticate users; authorization to decide which operations the user may execute and which resources the user may access; confidentiality to help ensure protection of sensitive data disclosure; and integrity to protect from changes, user data transmitted between client and server. FIG. 12 is an exemplary flow diagram of an illustrative user authentication and authorization process consistent with one or more aspects of the innovations herein. Referring to the exemplary processing of FIG. 12, a user submits a request for restricted resource 1202, and the system verifies whether the user is authenticated 1206. If not, the user must login 1218. Once the user is authenticated, the system may verify whether the user has permission 1210, and if so, allows access to the resource 1214, or else denies access 1222.

In certain example implementations of the system and methods, authentication may be found in different methods. Examples of these may be, inter alia, Windows Authentication (user signed into windows), Forms Authentication (using a web page to sign in), Passport Authentication (using Microsoft's Passport, also known as Live Id these days, to authenticate) etc.

Figure 13:
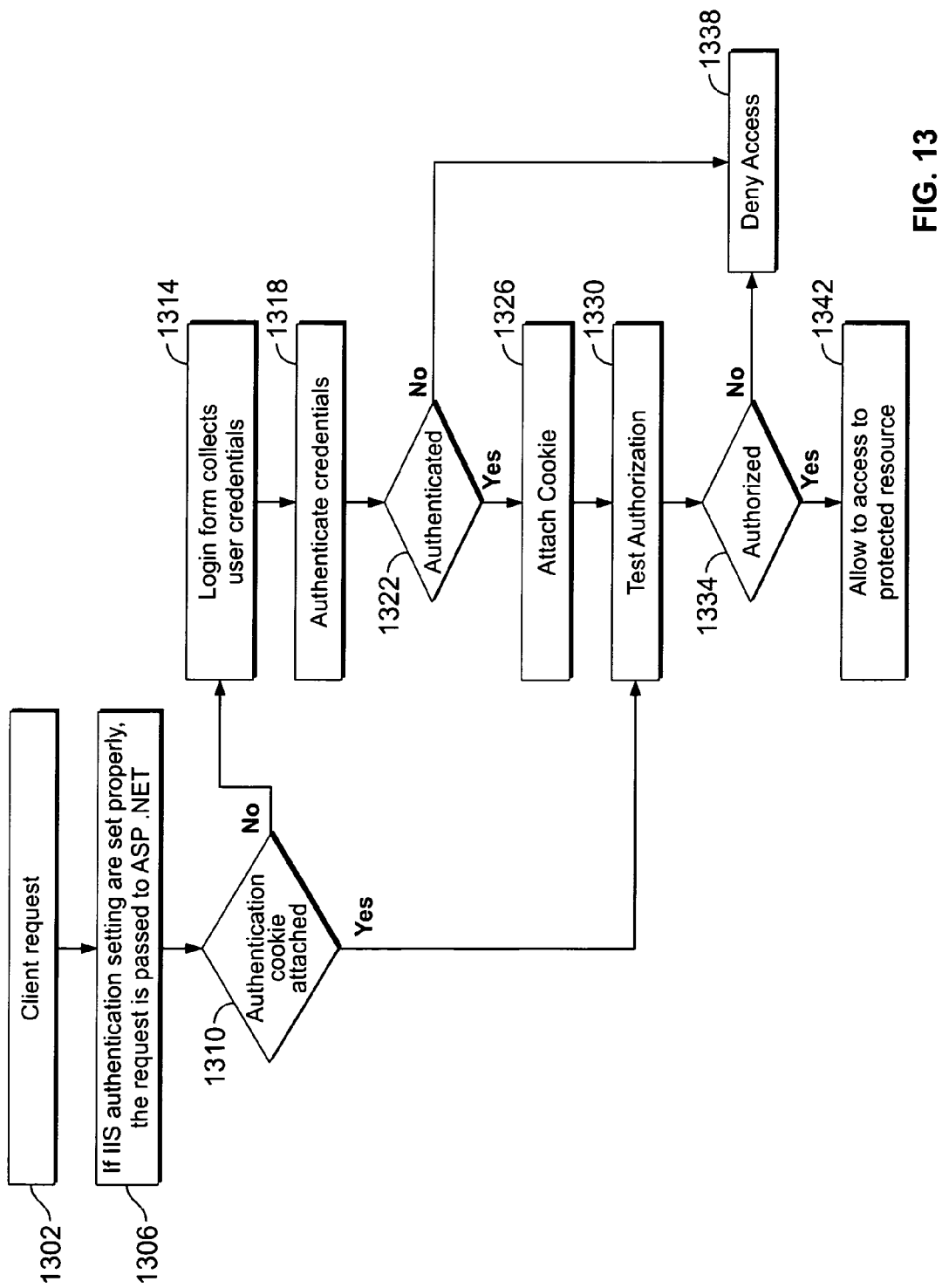
FIG. 13 is an exemplary flow diagram of an illustrative forms authentication and authorization process consistent with one or more aspects of the innovations herein.

Forms Authentication may allow use from the internet and restrict use to approved customers. Further, Forms authentication can be a token-based system. For example, when users log in, they receive a token with basic user information. This information may be stored in an encrypted cookie that is attached to the response so it is automatically submitted on each subsequent request. FIG. 13 is an exemplary flow diagram of an illustrative forms authentication and authorization process consistent with one or more aspects of the innovations herein. An example of this authentication process includes the initial client request 1302, which is passed to ASP.NET provided proper IIS Authentication settings 1306. The system verifies whether user has been assigned an authentication cookie 1310, and if no, the login form 1314 collects user credentials and authenticates the credentials 1318. If the credentials pass the authentication process 1322, then the system attaches a cookie 1326 and tests whether the credentials are authorized for access 1330. If the credentials are either not authenticated 1322 or authorized 1334, the system will deny access 1338. If the credentials are both authenticated 1322 and authorized 1334, the system will allow the user to access the protected resource 1342.

Further, system and methods herein may employ an authorization model. For example, implementations may be configured to use a permission-based security model. Such a model may have pre-defined roles such as those that perform similar functions as "Groups" or "Types" of existing systems. In the present systems, however, implementations may require permissions for each action that needs security validation, such as:

To view or update a page, user needs permission for the action.

To view or update a data/field, user needs permission for the action.

When a user wants to view Import Container list, user should have appropriate permission for the import container list page.

When a user wants to update or save contents in Import Container page, user should have appropriate permission for the import container list page.

According to these implementations, a role may be defined by a set of permissions that are allowed to the owner of the role. Users can have multiple roles and then will have all permissions belong to each role. Such features allow users to have different roles for a steamship company in a site, or have the same role for all steamship companies for the site or one role for all steamship companies and all sites.

Further, implementations may have pre-defined role(s) and custom role(s). Here, for example, pre-defined role examples may include, User Admin, Gate Clerk, Super Admin, SSCO User, Terminal User, And possibly others. Custom Role may allow a user to have customized role (a set of permissions). An admin module of the TOS Web Portal systems herein may provide tool(s) to assign permissions to a user that will be persisted as a new role, such as ABCD-Admin, XYZ-Bob, etc. Further, these custom roles can be reused. In still other implementations involving security, ASP.NET security framework can have a standardized user accounts system that supports all common user account tasks, including'registering, managing passwords, and setting personal preferences.

According to additional embodiments herein, there may be three functional areas that may be implemented, including one or more of:

Membership, including registering user accounts and accessing a repository of account details and credentials Roles, including putting users into a set of (possibly overlapping) groups, typically used for authorization Profiles, allowing users to store arbitrary data on a per-user basis It should be noted that ASP.NET provides implementations for each of these three areas, however, present systems may be configured with custom implementation through a system of providers. Here, for example, custom providers may be derived from "built-in" abstract provider classes.

Finally, with respect to some implementations, systems and methods herein involving the present TOS Web Portal features may use SSL (Security Sockets Layer) in all modules.

TOS-Agnostic Details and Aspects

Implementations herein may involve the layered architecture set forth above. A layer refers to a logical separation, such as a introducing a different assembly in the same process space. Layering provides separation of concerns and better factoring of code, which gives us maintainability and scalability. According to various implementations herein, there may be 4 layers in the present TOS Web Portal systems and methods—Presentation, Service, Business Logic and Data Access layers.

Business logics layer/aspects herein may be represented by domain model which is a conceptual model that represents the TOS Web Portal' business domain. A domain model mingles data and process, has multi-valued attributes and a complex web of associations, and may use inheritance. Further, the data access layer is the layer that is solely responsible for talking to the data store and persisting and retrieving business objects. The layer typically includes all the create, read, update and delete methods, transaction management, data concurrency, as well as a querying mechanism to enable the business logic layer to retrieve object for any given criteria.

Different Terminal Operating Systems may use different data persisting technologies and will require different method to access persisted data. It might be an access to relational databases but from different vendors (Oracle, MS Sql, MySql, etc.). Or it might be an access to the end point of WS*-compliant web services. For the system to be TOS agnostic, it is critical how system switches data access method with minimum impact on business logic layer and presentation layer.

Repository-Pattern.

Repository pattern features and functionality herein may be used to make smartWeb application be independent of Terminal Operating System (TOS). Repository separates the logic that retrieves the data and maps it to the entity model from the business logic that acts on the model. The business logic should be agnostic to the type of data that comprises the data source layer. For example, the data source layer can be a database or a Web service.

Further, in some implementations, a backing store for data can be a business service that is exposed by a line-of-business (LOB) application. Services are often expensive to invoke and benefit from caching strategies that are implemented within the repository. In this case, the logic first checks to see if the repository is in the cache. If it is not, the repository instance is created and placed into cache then utilized to retrieve the requested information.

Service Locator Pattern.

Service Locator pattern features and functionality herein may define a component that knows how to retrieve the services an application might need. The caller has no need to specify the concrete type; the caller normally indicates an interface or an abstract type. The Service Locator pattern may hide the complexity of component lookup, handle the caching or pooling of instances and, in general, offer common provisioning for component lookup and creation.

A focus in Service Locator Pattern may be to achieve the lowest possible amount of coupling between components. The locator represents a centralized console that an application uses to obtain all the external dependencies it needs.

As such, present implementations may be designed to support multi-terminals with different Terminal Operating Systems. To support multi-terminals in TOS agnostic way, the TOS web interface application may involve processing to look up the repository that provides access to each of distributed terminal databases.

Repository Initialization

Figure 14A:
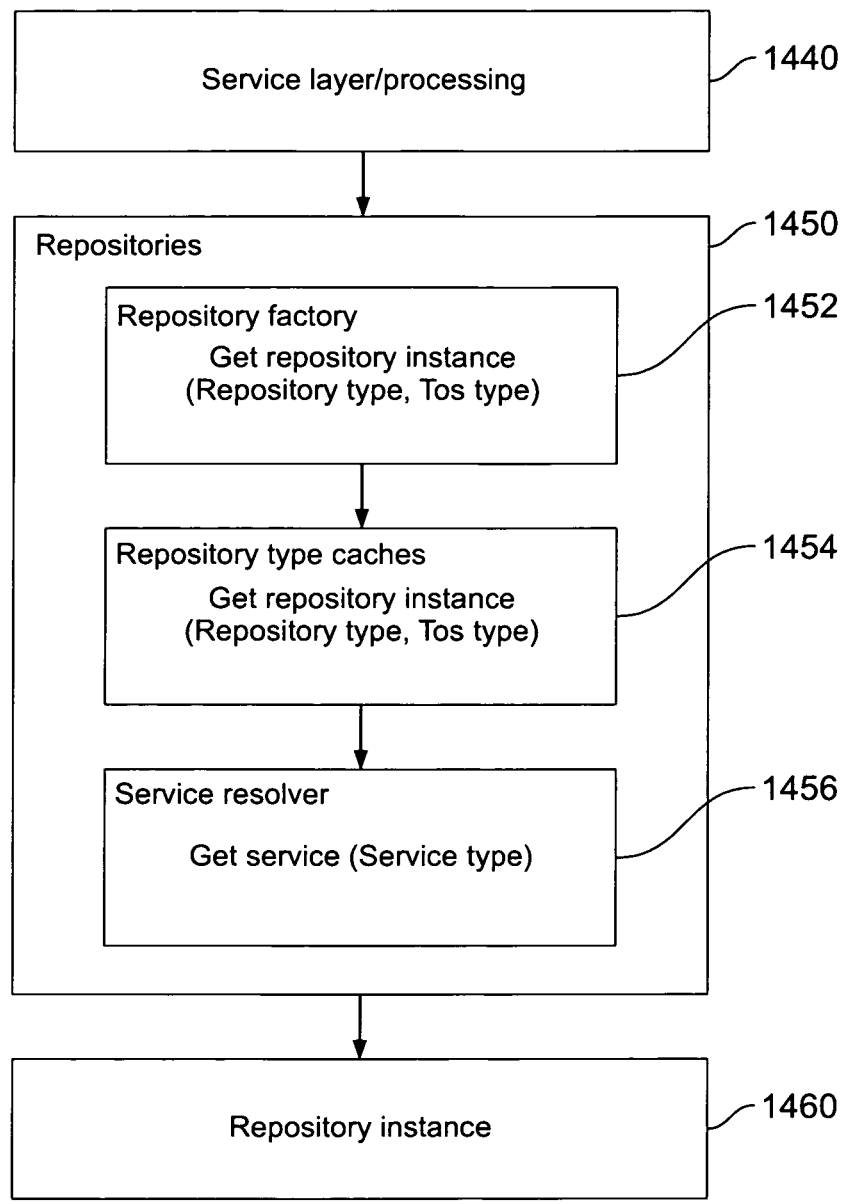
FIGS. 14A and 14B show exemplary flow diagrams involving illustrative repository processing consistent with one or more aspects of the innovations herein.
Figure 14B:
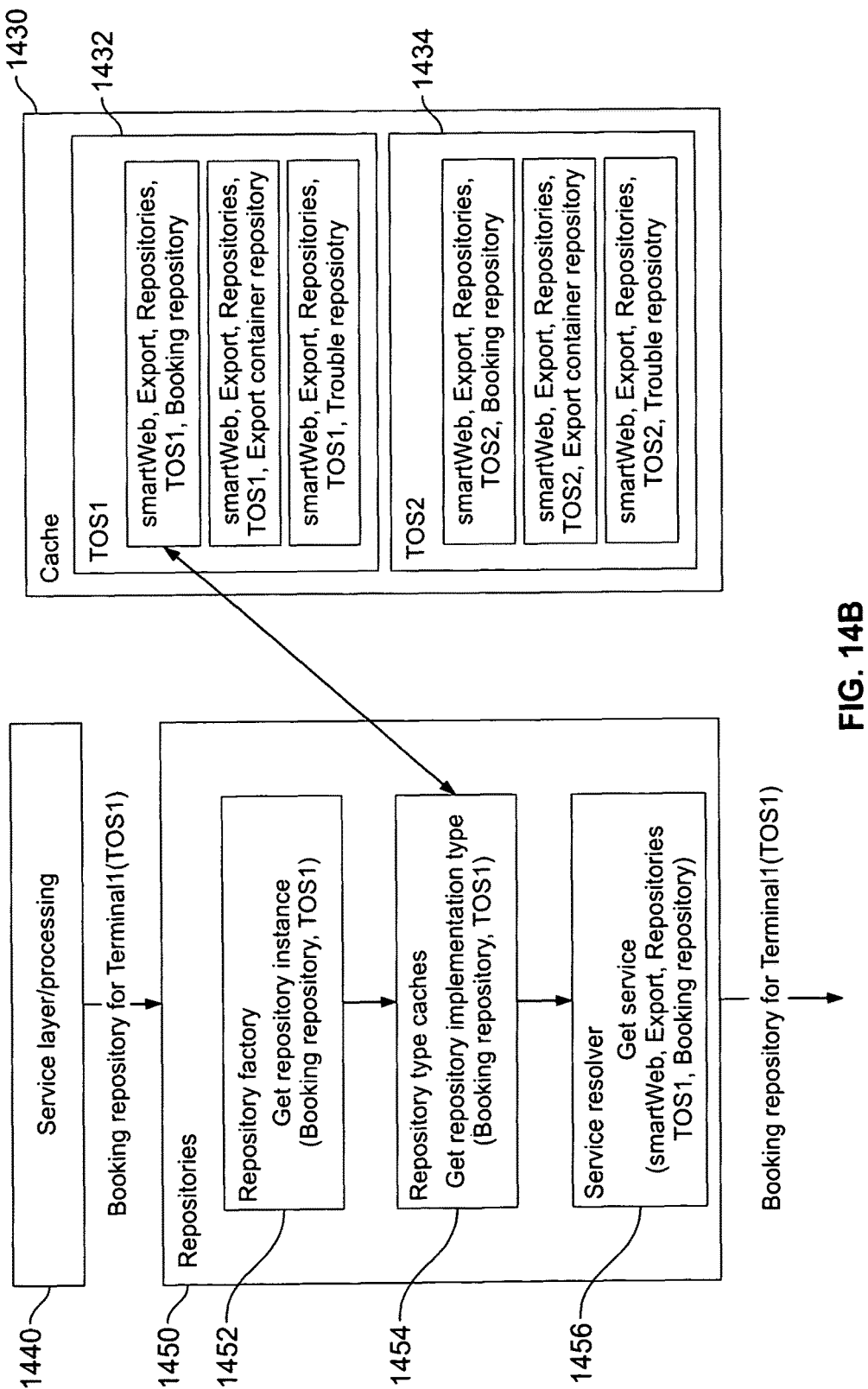

Turning back to overall aspects of the innovations herein, FIGS. 14A and 14B show exemplary flow diagrams involving illustrative repository processing methods consistent with one or more aspects of the innovations herein. FIG. 14B is a specific example illustrating the process outlined in FIG. 14A. Detailed examples of code which may be used by elements of systems performing the described exemplary methods of FIGS. 14A and 14B may be found in Appendix 1, attached hereto.

Turning first to FIG. 14A, in 1440 a processing request may be received via a service module/processing layer. For example, this request may be a request to access and/or manipulate data in a TOS or business object. In response, a repository instance may be created and/or retrieved to facilitate processing of the request. In 1450, the request and/or data associated with the request may be transmitted to a repository module/processing layer. In 1452, a repository factory module/processing layer associated with the repository module/processing layer may process information to determine a repository instance that may be appropriate for processing the request. The repository instance may be specific to a TOS type for a TOS to be accessed and/or a repository type associated with the type of request that was received. In 1454, a repository type cache may be accessed by the repository factory to retrieve a previously generated repository implementation type appropriate for the determined repository instance (e.g., based on the repository type and/or TOS type). For example, the system may have received a similar request to perform similar processing on the same TOS type in the past, and may have generated a repository in response and stored the repository in the cache. Default/commonly encountered repositories may also be stored. In some cases, there may be no appropriate repository in the cache, in which case the system may generate one and store it in the cache for future use. A relationship between the cached data and the TOS type may be determined by using a reflection operation, a helper attribute, a convention, and/or in some other way. For example, the reflection operation may be used to discover a TOS type that is configured to implement interfaces configured with an inversion of control container; is contained in a namespace of interest; and/or comprises a TOS type attribute of interest and/or is contained in a sub-namespace named after a TOS type of interest.

In 1456, a service resolver module/processing layer may instantiate the retrieved/generated repository, for example by resolving a service associated with the cached attribute data. In 1460, the repository instance may be delivered. For example, the instance may be provided to the user who made the initial request for interaction.

In one specific example shown for purpose of illustration not limitation in FIG. 14B, the service module/processing layer may send a request for a booking repository for a first terminal (Terminal 1) to the repository module/processing layer. As shown, Terminal 1 may use a first TOS type (TOS 1). In 1452, the repository factory module/processing layer may get a repository instance based on the booking repository type and the TOS 1 type. In 1454, the cache may be searched for the appropriate implementation. In this example, a subset of the cache 1430 contains booking repository instances for a TOS 1 type TOS 1432 and a TOS 2 type TOS 1434. Because the booking repository being requested is for TOS 1, the TOS 1 entry 1432 may be selected. In 1456, the service resolver module/processing layer may use data retrieved from the cache to instantiate the repository, and the appropriate booking repository may be sent to a desired recipient.

Figure 14C:
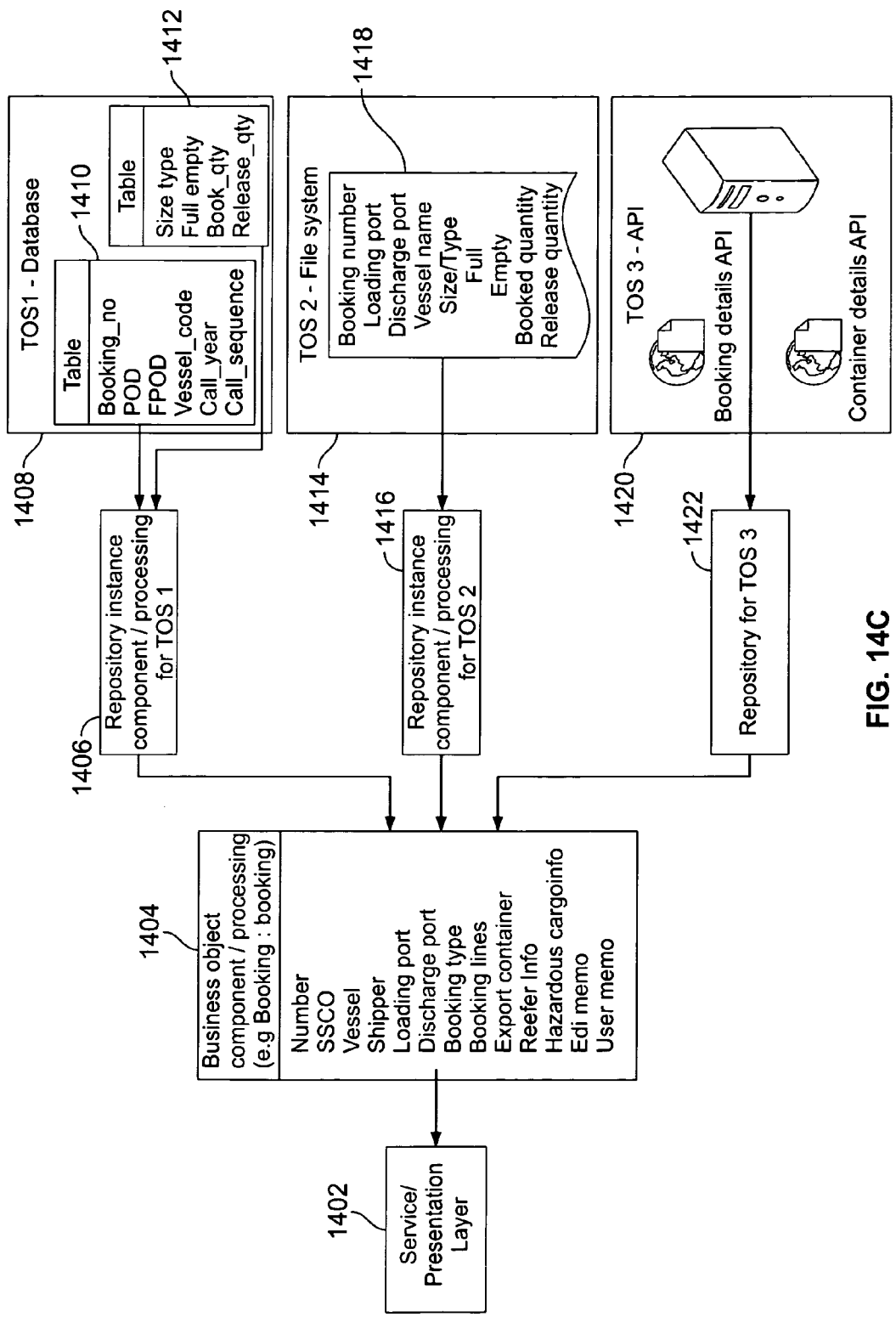
FIG. 14C shows an exemplary sequence diagram involving an illustrative business object processing consistent with one or more aspects of the innovations herein.

FIG. 14C shows an exemplary sequence diagram involving an illustrative booking process and TOS agnostic processing consistent with one or more aspects of the innovations herein. FIG. 14C is a specific example illustrating the process outlined in FIG. 14D. Detailed examples of code which may be used by elements of systems performing the described exemplary methods of FIGS. 14C and 14D may be found in Appendix 2, attached hereto.

A TOS 1 database 1408 is read for booking data 1410 and corresponding container data 1412 that are provided in tables in a TOS 1 specific format. The data 1410 and 1412 are read and transmitted over a network to TOS 1 repository instance component/processing 1406. A similar process occurs for each of TOS 2 repository instance component/processing 1416 and TOS 3 repository instance component/processing 1422. The TOS 2 data source 1414 stored in processing 1422 includes a file system where booking/container data 1418 are stored in database 1414 in a TOS 2 specific format different from the TOS 1 format and TOS 3 format. Once read and transmitted to the TOS 2 repository instance component/processing 1416. The TOS 3 data source is an API where booking detail API and corresponding container detail API data are read and transmitted to the TOS 3 repository instance component/processing in a TOS 3 specific format. In FIG. 14C, each repository instance component/processing corresponds to the booking business object and one of three TOS types. The booking business object has a plurality of associated functions and properties, such as a booking number, steamship company, vessel, shipper, loading port, discharge port, booking type, booking lines, export container, reefer info, hazardous cargo info, EDI memo, user memo, and the like. These properties may have a one-to-one correspondence to the data stored in the TOS databases 1412, 1418 and 1420, or may have a one-to-many correspondence.

Each TOS repository instance component/processing 1406, 1416 and 1422 performs processing to process/transform the data of a TOS specific format retrieved from a corresponding database into the business object format that is a TOS agnostic format. In FIG. 14C, the transformation/mapping process occurs from the TOS specific format to the business object format, but may also be performed from the business object format to the TOS specific format as well. The retrieved data that is converted into the TOS agnostic business object format is transmitted from any of the TOS repository instance component/processing 1406, 1416, 1422 to the business object component/processing 1404. The business object component/processing 1404 performs processing on the business object data according to the user input. The result is output to the service/presentation layer 1402 for further processing and/or display to a user interface.

Figure 14D:
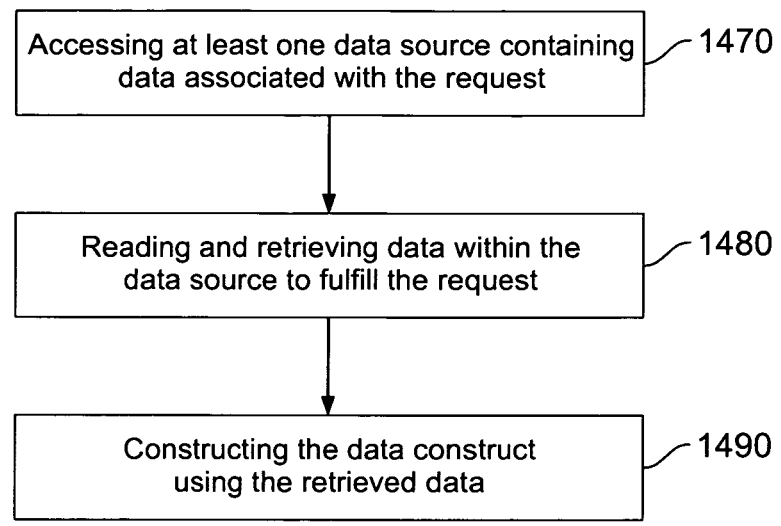
FIG. 14D shows another exemplary flow chart involving illustrative business object processing consistent with one or more aspects of the innovations herein.

FIG. 14D shows an exemplary flow chart involving illustrative repository based TOS agnostic processing consistent with one or more aspects of the innovations herein. The process begins at step 1470 with accessing at least one data source containing data associated with the request. Next, data is read and retrieved within the data source to fulfill the request at step 1480. Then, the data construct is constructed at step 1490 using the retrieved data from step 1480.

Processing User Request in TOS Agnostic

Figure 15:
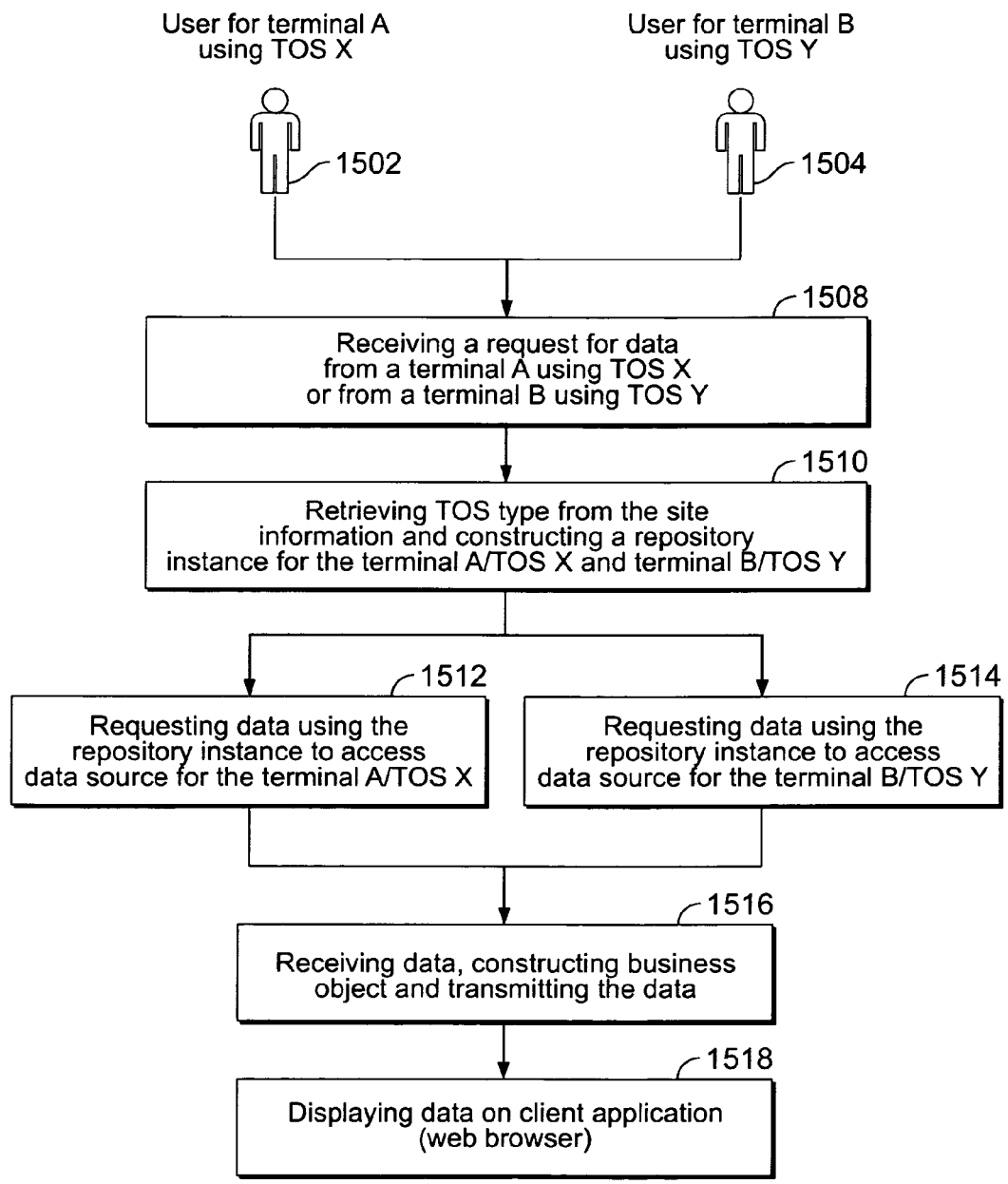
FIG. 15 shows an exemplary flow of processing performed via an illustrative TOS agnostic system and associated processing consistent with one or more aspects of the innovations herein.

FIG. 15 shows an exemplary flow of processing performed via an illustrative TOS agnostic system and associated processing consistent with one or more aspects of the innovations herein. The inventive systems and methods are not limited to a user of a specific Terminal Operating System and terminal. Instead, the TOS agnostic system allows a plurality of users to access a plurality of terminals operating under any of a plurality of Terminal Operating Systems. Referring to FIG. 15, users 1502 and 1504 represent different users accessing a plurality of terminal sites operating under different Terminal Operating Systems. For example, user 1502 desiring access to a Terminal A site that implements a TOS X while user 1504 desires access to a Terminal B that implements a TOS Y, where the TOS X and TOS Y are incompatible with each other. In particular, each Terminal Operating System operates based on a proprietary language and/or data format. The same information stored by one TOS database may be described so as to be unrecognizable and unusable to a different TOS database.

Conventionally, a user who wishes to access data of terminal sites using different Terminal Operating Systems would need to access an interface specific to the Terminal Operating System of that terminal site. However, consistent with aspects of the present innovations, requests for data are processed regardless of the Terminal Operating System used such that each user 1502, 1504 is able to access any desired terminal site. At step 1508, a request for data is received for any or both Terminal A and Terminal B by the TOS agnostic system. For example, a user interface provides a list of terminals for a user to select. At step 1510, a TOS type is determined based on the request. The system may determine correspondence between a selected terminal and the TOS associated with the terminal. Based on the determined TOS type, a repository instance is constructed for the Terminal requesting data. The construction of the repository instance is discussed in greater detail below in FIG. 17A-17B. Next, one of steps 1512 and 1514 are executed based on the Terminal making the data request. Step 1512 requests data using the repository instance created to access data source for the Terminal A using the Terminal Operating System X. Likewise, step 1514 requests data using the repository instance created to access data source for the Terminal B using the Terminal Operating System Y. At step 1516, data is received to the repository instance, whereby the data is then processed to construct business object data. The retrieved data from a TOS database is converted into a common data format in order to provide a common business object data format. The business object data are then transmitted to the user making the data request. At step 1518, the system displays the business object data to the user via a client application such as a web browser or other user interface. In this manner, a user is able to retrieve data from any Terminal operating any Terminal Operating System from a TOS agnostic system.

Figure 16:
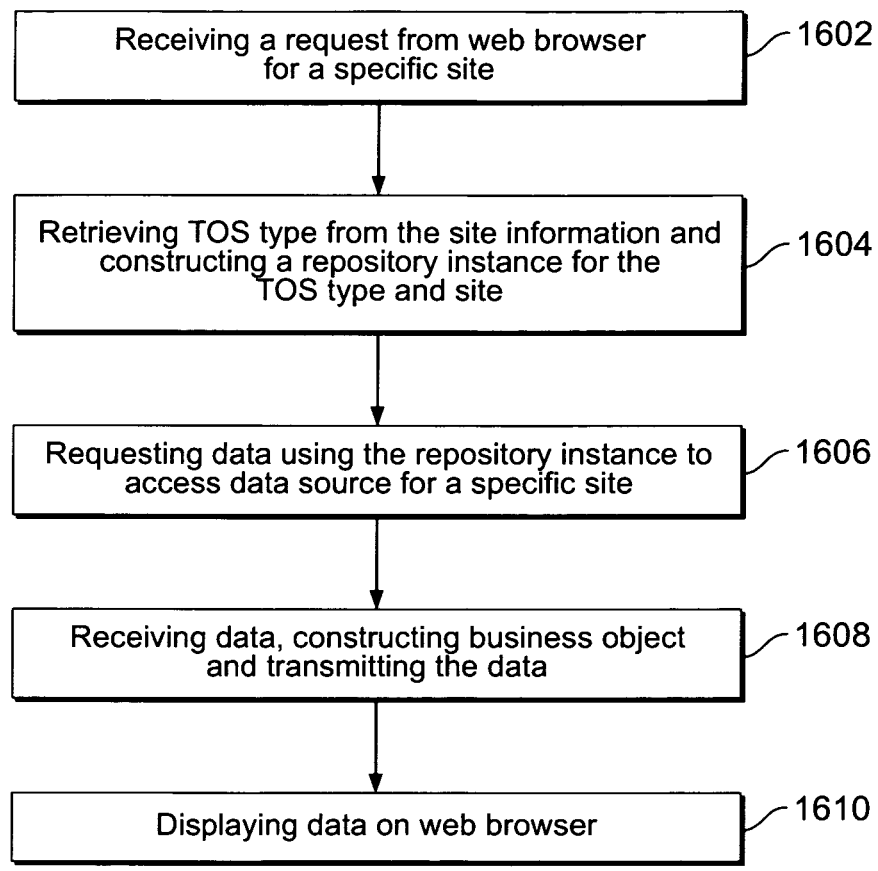
FIG. 16 shows an exemplary work flow diagram of illustrative TOS agnostic processing consistent with one or more aspects of the innovations herein.

FIG. 16 shows an exemplary work flow diagram of illustrative TOS agnostic processing consistent with one or more aspects of the innovations herein. At step 1602, a request is received from a user interface such as a web browser for a specific terminal site among a plurality of terminal sites. At step 1604, a TOS type is determined from the terminal site information. Based on the determined TOS type, a repository instance is constructed within the TOS agnostic system specific to the TOS type and terminal site.

At step 1606, the TOS agnostic system requests data from the terminal site to store in the repository instance. Next, the requested data is received at step 1608 and is processed by the TOS agnostic system to create a set of business objects. The business objects are then transmitted to the user interface and are displayed at step 1610.

Repository Locator

Figure 17A:
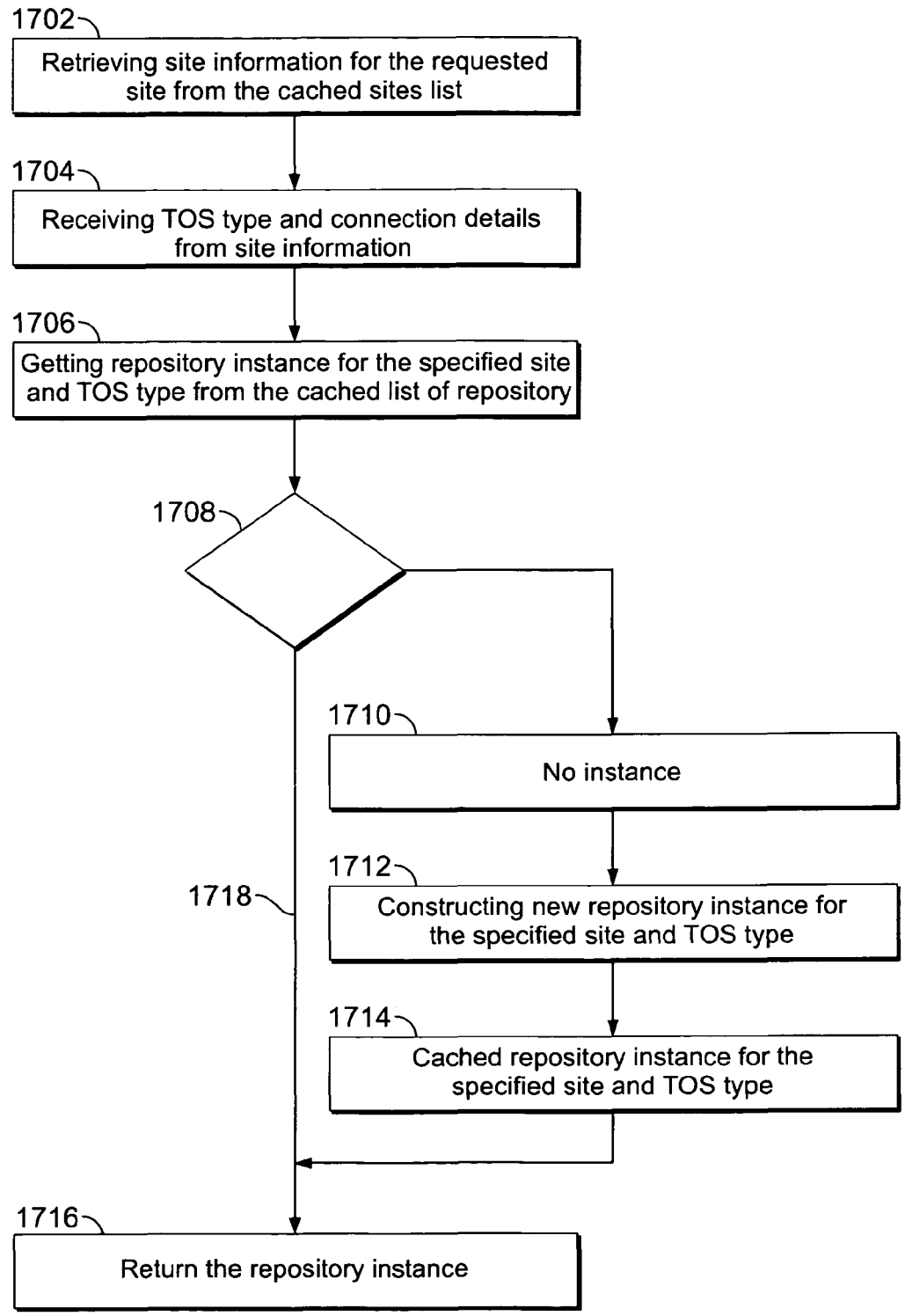
FIG. 17A shows an exemplary flow diagram of illustrative TOS agnostic repository locator processing consistent with one or more aspects of the innovations herein.

FIG. 17A shows an exemplary flow diagram of illustrative TOS agnostic repository locator processing consistent with one or more aspects of the innovations herein. At step 1702, terminal site information is retrieved for a requested terminal site based on a cached list of terminal sites. At step 1704, based on the retrieved terminal site, a Terminal Operating System type corresponding to the terminal site is determined and connection information is retrieved from terminal site information. Next, step 1706 attempts to obtain a repository instance for the specified terminal site and corresponding TOS type from a cached list of repository instances. At the decision step 1708, if it is determined that the TOS agnostic system has previously constructed a repository instance for the requested terminal and TOS type, then the cached repository instance is returned at step 1716. However, if it is determined that no repository instance exists for the specified terminal and TOS type, then a new repository instance is constructed for the specified terminal and TOS type. Once created, the repository instance is cached at step 1714 and returned to the user at step 1716.

Figure 17B:
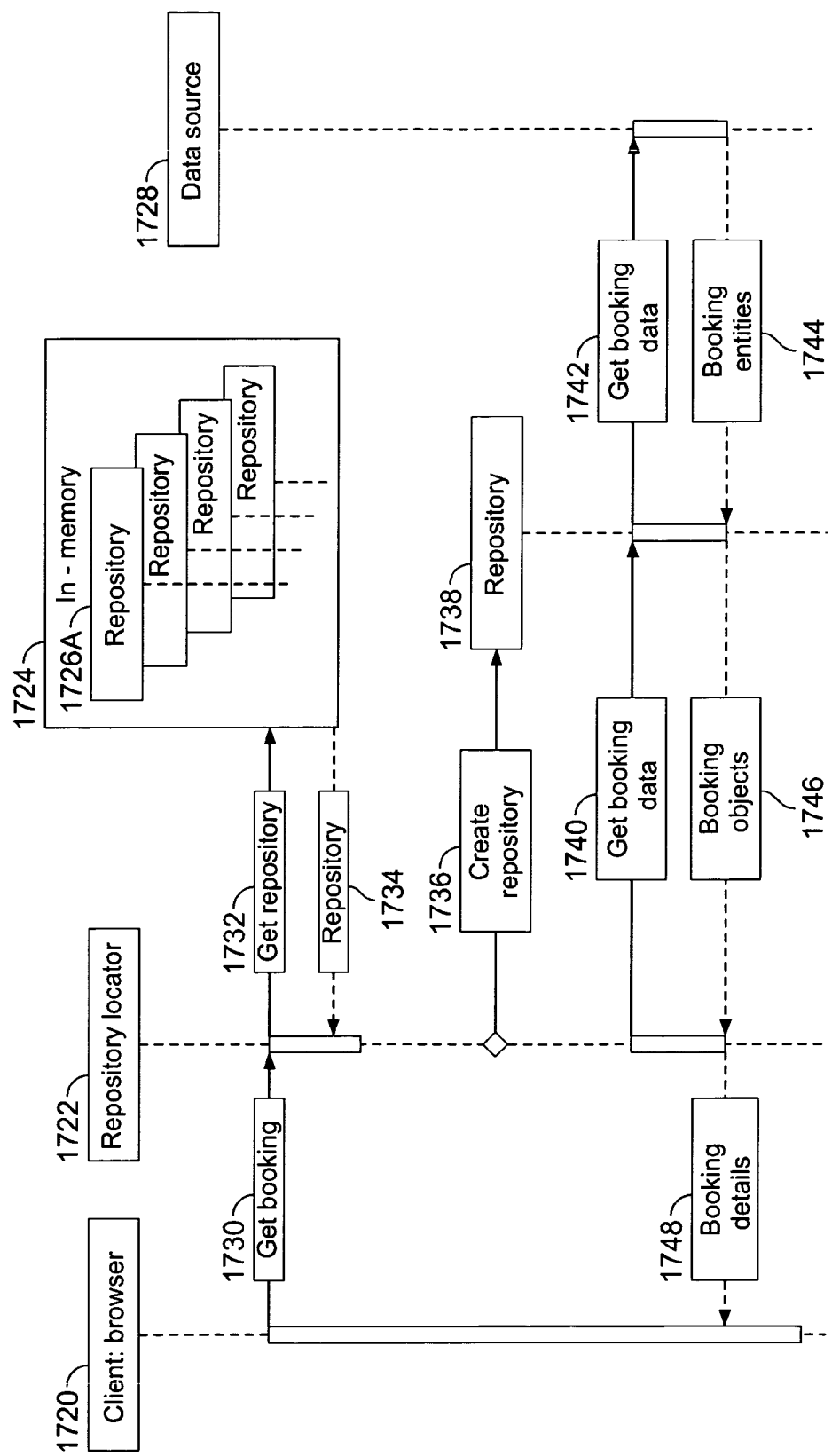
FIG. 17B shows an exemplary sequence diagram involving an illustrative booking process and TOS agnostic processing consistent with one or more aspects of the innovations herein.

FIG. 17B shows an exemplary sequence diagram involving an illustrative booking process and TOS agnostic processing consistent with one or more aspects of the innovations herein. A user 1720 operates a client/browser to input a request 1730 for TOS data, which in this case refers to booking data request 1730. The repository locator 1722 receives this request and first attempts to locate a stored repository 1724 from among a plurality of repository instances 1726 that corresponds to the booking request. If a match is found, then the corresponding booking repository is returned to the repository locator 1722 at step 1734, and the requested booking details 1748 from the located repository 1726A are returned to the browser 1720 and output to a user.

However, if no repository instance is located that corresponds to the booking request 1730, then a create repository function 1736 is called to generate a booking repository 1738. Once created, the repository locator 1722 calls a get booking data 1740 function to the repository 1738 to retrieve the requested booking data from the data source 1728. The repository 1738 then calls a get booking data 1742 function to the data source 1728 to obtain the requested booking information. In response, the data source 1728 returns booking entities 1744 in a format of the data source to the repository 1738. The repository 1738 then performs processing on the booking entities 1744 to map/convert/transform them into booking business objects 1746 in a data source agnostic format.

The booking objects 1746 are then transmitted from the repository 1738 to the repository locator 1722 which may process the booking objects 1746 into booking details 1748. The repository locator 1722 then transmits the booking details 1748 to the browser 1720 in response to the booking request 1730. In this system, the browser needs not be compatible with the operating system or data format of the data source 1728 in order to request and receive information from the data source 1728 since the booking entities 1744 are processed into booking objects 1746 that are data source agnostic.

Figure 20:
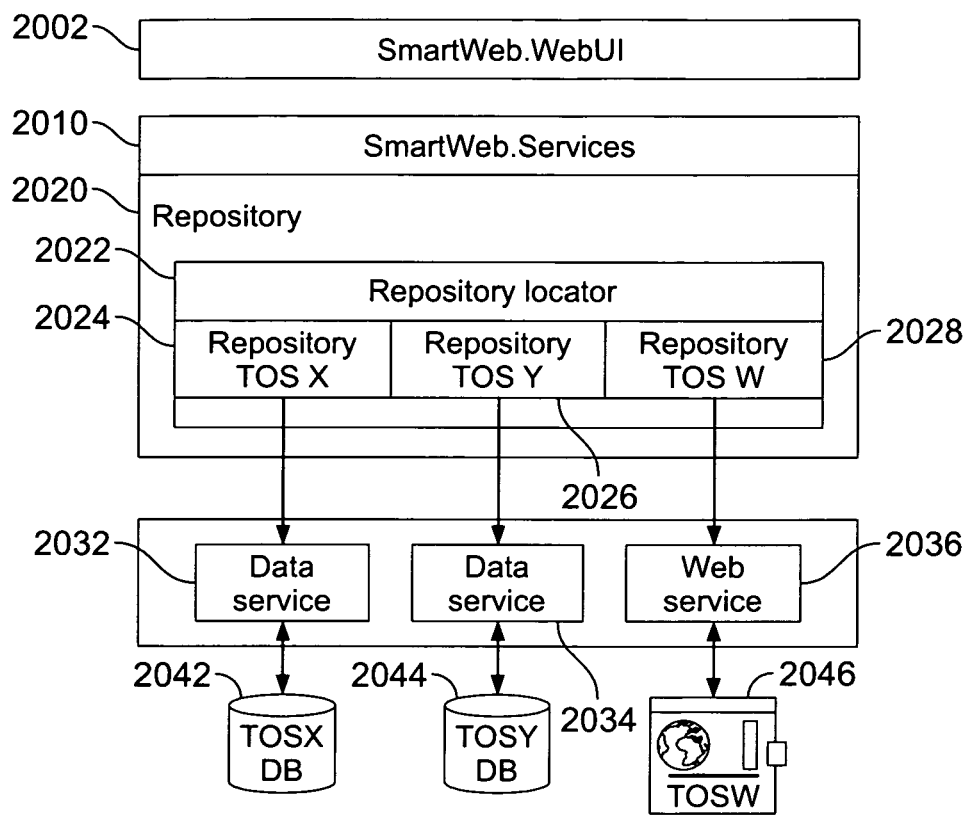
FIG. 20 is a block diagram depicting an illustrative repository locator hierarchy/structure for an exemplary TOS agnostic system consistent with one or more aspects of the innovations herein.

FIG. 20 is a block diagram depicting an illustrative repository locator hierarchy/structure for an exemplary TOS agnostic system consistent with one or more aspects of the innovations herein. A web interface 2002 displays the retrieved database data to the requesting user. The services layer 2010 processes and stores the retrieved data via a repository 2020. The cached repositories retrieve data through the use of respective data services 2032, 2034 and web service 2036. For example, the data service 2032 interfaces with the TOS1 DB for storage into repository 2024. The web service 2036 may similarly retrieve requested data from a web source 2046 for caching in repository 2028.

Layer Architecture of TOS Agnostic System

Figure 18:
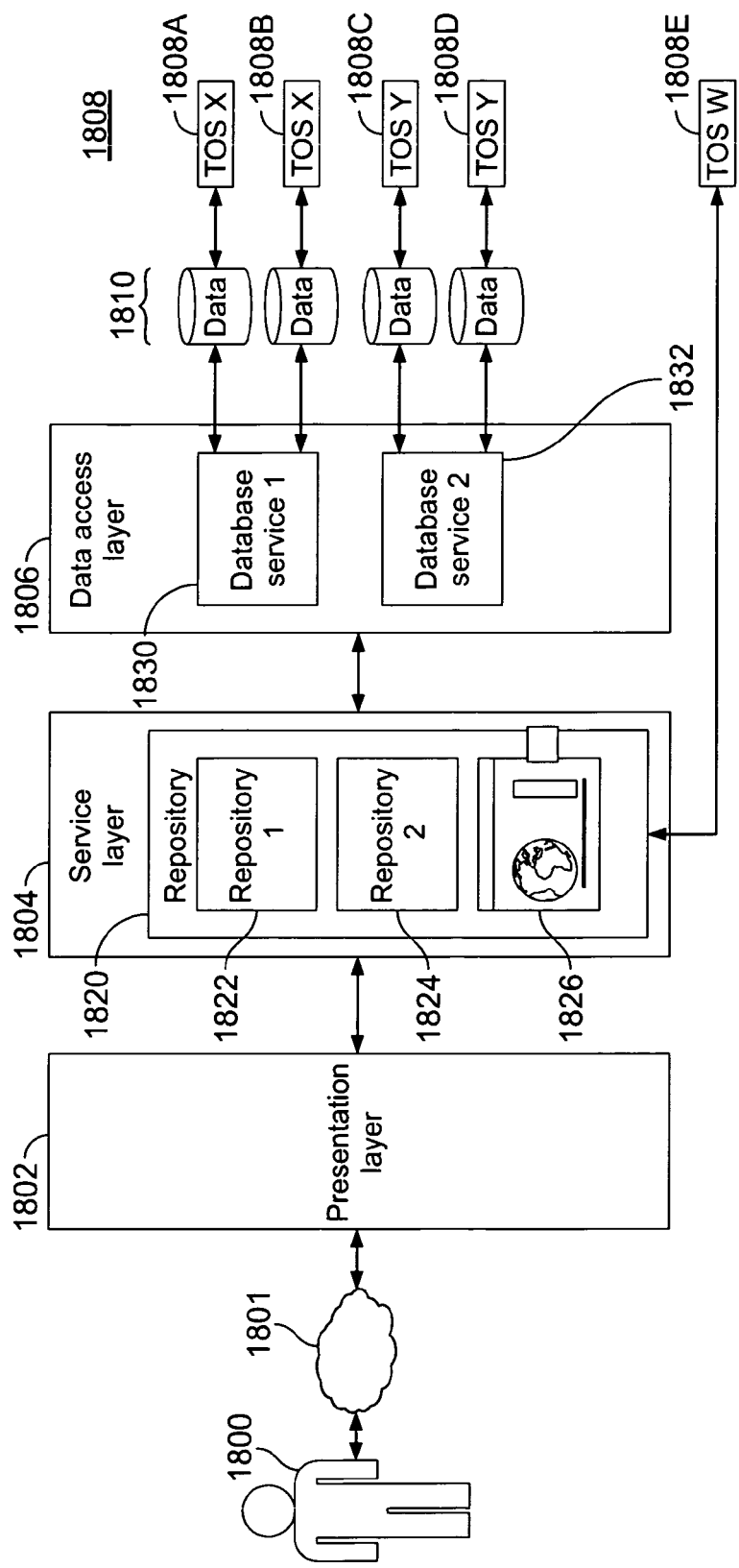
FIG. 18 is a block diagram depicting one illustrative layer architecture for an exemplary TOS agnostic system consistent with one or more aspects of the innovations herein.

FIG. 18 is a block diagram depicting one illustrative layer architecture for an exemplary TOS agnostic system consistent with one or more aspects of the innovations herein. A user 1800 operates a computing device that connects to a network 1801 to view a presentation layer. The presentation layer 1802 receives data from a service layer 1804 that stores and processes terminal data from a plurality of TOS types. The service layer 1804 includes a repository 1820 including a plurality of repository instances 1822, 1824, 1826, etc. The repository instances connected to plurality of data sources 1810 operating under different Terminal Operating Systems 1808. The data access layer 1830 obtains the requested terminal data from any of a plurality of databases 1810 via corresponding database services 1830, 1832. A database service is provided for each TOS type such that each database corresponding to TOS X is accessible by database service 1830. Similarly, each database corresponding to TOS Y is accessible by database service 1832.

Figure 19:
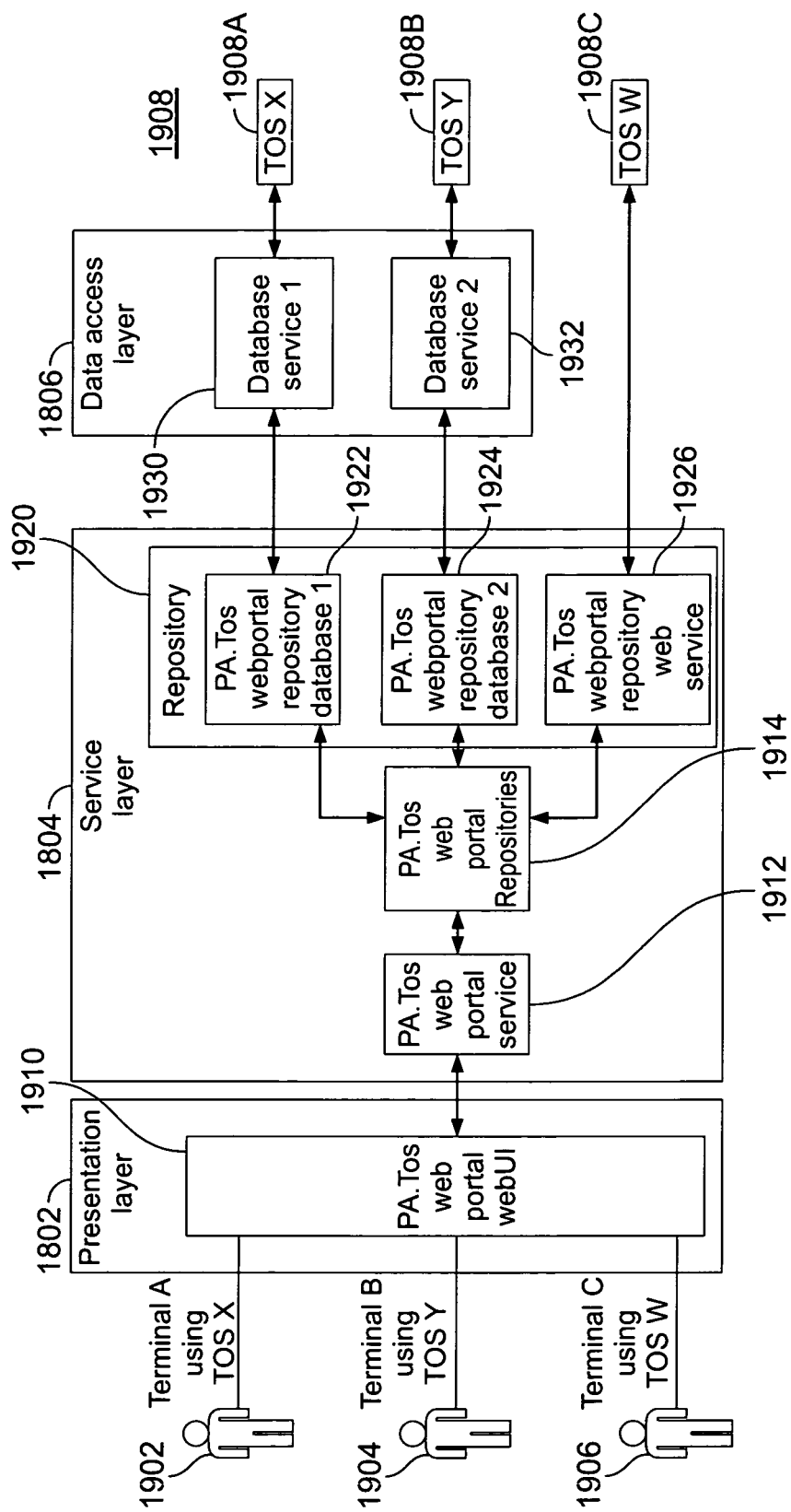
FIG. 19 is a block diagram depicting illustrative layer architecture and associated processing modules for an exemplary TOS agnostic system consistent with one or more aspects of the innovations herein.

FIG. 19 is a block diagram depicts an illustrative layer architecture and associated processing modules for an exemplary TOS agnostic system consistent with one or more aspects of the innovations herein. In FIG. 19, each user 1902, 1904 and 1906 inputs a request to the presentation layer 1802 to access data from different terminal using different Terminal Operating Systems. Description of elements already described are omitted for brevity.

PA.Tos.smartWeb.WebUI at step 1910 represents a server component has been built based on MS ASP.NET MVC framework. This component is designed Model-View-Controller (MVC) design pattern and responsible to receive and process user request, and construct and send response to user. Next, PA.Tos.smartWeb.Service 1912 is a service component that receives user requests from the Controller in PA.Tos.smartWeb.WebUI component. The service component calls methods in repositories to process user requests. It retrieves data from repository, sends data to repository to update data source, process business logic, and constructs response and returns to Controller in PA.Tos.smartWeb.WebUI component. PA.Tos.smartWeb.Repositories 1914 is a server component that implements Repository Locator which instantiates Repository instance for a terminal and TOS type depending on the user request.

PA.Tos.smartWeb.Repository.Database2 1924 is a Repository instance for a specific database of a TOS. The Repository instance knows type of the database, how to communicate with the database, where is the database, etc. Repository instance constructs business entities from data specific to TOS type or convert any information in business entities to data be used in TOS specific database.

PA.Tos.smartWeb.Repository.WebService 1926 is a Repository instance used to retrieve or send data to TOS data source using Web Service. The Repository instance knows type of web service, service contract, data contract, operation contract, how to communicate, where is the service access, etc. Repository instance constructs business entities from data specific to TOS type or convert any information in business entities to data be used in TOS specific data source.

TOS Agnostic Processing

Figure 21:
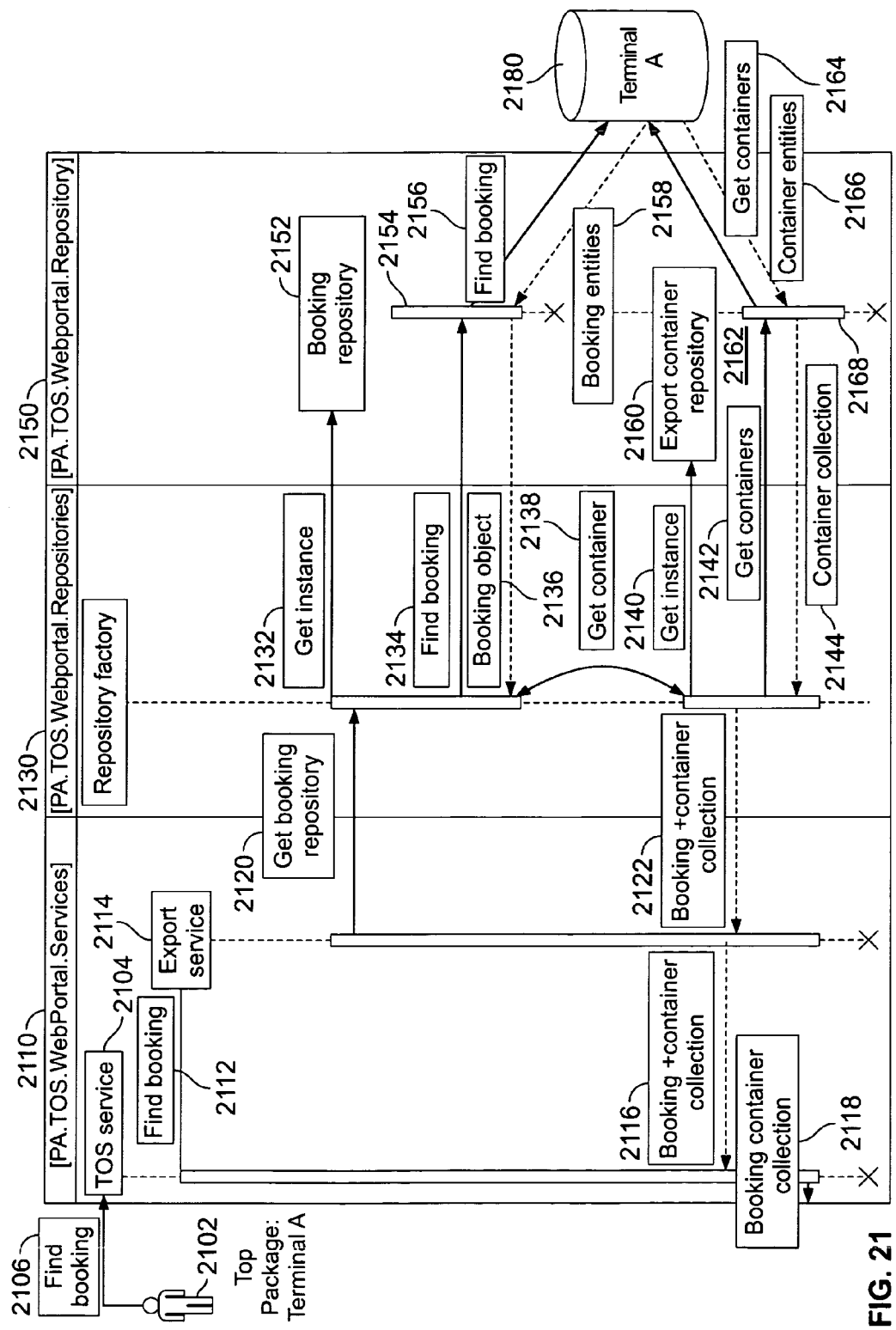
FIG. 21 shows an exemplary sequence diagram involving an illustrative booking process and TOS agnostic processing consistent with one or more aspects of the innovations herein.

FIG. 21 shows an exemplary sequence diagram involving an illustrative booking process and TOS agnostic processing consistent with one or more aspects of the innovations herein. Referring to FIG. 21, illustrative processing may begin at step 2106 where a user logs into a Terminal A via a web-based user interface and inputs a request for booking information for the Terminal A database. For example, a user may request information for a booking number BK123456. Next, the TOS Agnostic service 2104 receives and processes the user request for the booking information. The service 2104 calls a FindBooking method 2112 in export service 2114. The export service 2114 implements methods related to export business processes. The FindBooking method 2112 is processed by booking repository 2152. The export service 2114 first requests a booking repository instance from the repository factory 2130 using the GetBookingRepository method. The repository factory 2130 is a repository locator that returns the repository instance for Terminal A. The repository factory 2130 requests a booking repository for Terminal A using the GetInstance method. The booking repository 2152 retrieves and stores the booking information for Terminal A from a Terminal A database.

Next, the FindBooking method 2134 is defined in the export service 2114 to call the FindBooking method 2156 of the booking repository 2152 to request the booking information corresponding to booking number BK123456 of Terminal A. FindBooking method 2156 accesses the Terminal A database and obtains the requested booking information from the Terminal A database as booking entities 2158. The booking entities 2158 are then stored in the booking repository 2152 as booking objects 2136. For instance, the booking entities 2158 retrieved from the Terminal A as raw data that are converted/translated into a booking business object 2136. The booking objects 2136 are then returned to the export service 2114.

Further, GetContainer 2138 is an internal method call to retrieve container information related to the requested booking. Similar to the GetBookingRepository method, the export service 2114 executes a GetContainer method 2142 to the repository factory 2130 to obtain container information corresponding to the booking information requested by the user. GetInstance method 2140 requests a container repository 2160 instance for the Terminal A. The GetContainers method 2142 implemented by the export service 2114 requests the container data related to the booking information from the container repository 2160. The container repository 2160 retrieves data related to export containers corresponding to the booking number from the Terminal A database using the GetContainers method 2146. In response, the Terminal A database transmits the requested data as container entities 2166. The booking entities 2158 and container entities 2166 are provided in the format of the Terminal A operating system incompatible with the format of other Terminal Operating Systems. Therefore, the container repository 2160 converts/translates the raw container data 2166 of the Terminal A into a container object 2144 to be added to the container repository 2160. Once the booking object 2136 and corresponding container object 2144 are returned to the export service 2114, then the booking and container objects collection 2116 are returned to the TOS Agnostic service 2104. The TOS Agnostic service 2104 processes the business object data 2116 and displays booking and container objects 2118 to the user via a web-based user interface.

Additional Services/Service Layer Aspects

In addition to the basic architectural features set forth above, the service layer may serve as a baseline for integration for/between various illustrative components that may be associated with the TOS interfaces/Terminal Operating Systems herein, e.g., other web applications and Terminal Operating Systems like M21, with respect to which various implementations herein may communicate. Here, for example, the present disclosure and Appendices herein shows how various functionality and information is passed and processed between web applications and a TOS (e.g., M21) via or throughout the service layer. For example, computer program code associated with M21 helping illustrate such features is contained in the "TOS Data Access Library" of the attached compact disc.

With regard to Equipment Interchange Report (EIR) features, generating EIR is data and business logic-intensive process. Many data are collected from one or more TOS databases, such as an M21 database, and archived database(s). Those data are manipulated in various process and applied business logic to be presented in printed format. Further, gate-activity modules in disparate systems or web applications may implement such processes and maintain them separately. In some implementations, ReportService functionality may be utilized to provide with all data for EIR to be used for presentation but hide details of business logic and data access processes. This improves the maintainability and extensibility of the application.

Interface Aspects

Many of the systems and processes described above, as well as other features and functions, may be employed with, supported by, and/or interact with various user interfaces. In one aspect, the systems and methods provided herein include multiple interfaces, e.g., accessible via internet connection and/or other network connection. In some embodiments, an interface combines the functionalities of a summary report and status update, which allows a user to access, review and update statuses of various elements in the shipping process.

Any information that can be reviewed and updated includes but is not limited to information relating to: Bookings (see, e.g., FIGS. 22A, 23A, and 23B); Trouble Resolution (see, e.g., FIGS. 24A and 25), Equipment interchange reports (EIRs) (see, e.g., FIG. 26A); Cargo and equipment status (see, e.g., FIG. 26A); Equipment pre-authorization (see, e.g., FIG. 26A); Equipment control (see, e.g., FIGS. 27 and 28A, 30A, and 30B); Vessel management (see, e.g., FIG. 29); multi-functional home portal (see, e.g., FIG. 31); Hazardous Goods (see, e.g., FIGS. 32A, 32B); Bills of lading (see, e.g., FIGS. 34A, 34B, 34C, and 34D); Containers (see, e.g., FIGS. 36A, 36B and 36C); Free day Demurrage assignments (see, e.g., FIGS. 34A-36C); Release (see, e.g., FIGS. 34A-36C); Trucker assignments and information (see, e.g., FIGS. 38A, 38B, and 38C); Dray In Containers (see, e.g., FIG. 40); Rail exports (see, e.g., FIG. 41); among other things. For example, in some embodiments, information concerning a booking is reviewed. In some embodiments, information concerning a booking is updated. In some embodiments, information concerning one or more containers within a booking is reviewed. In some embodiments, information concerning one or more containers within a booking is updated. In some embodiments, information concerning a booking or one or more containers within a booking is both reviewed and updated.

Another implementation allows the system to interface with other systems such as transportation/trucking/tracking applications such as VoyagerTrack. As just one straightforward illustration among many innovative features, for example, users can request pre-mount of a container on wheels for later pickup. This can be the next day, for example. Such implementations save substantial time when trucks arrive to pick up containers. If the containers are previously mounted with wheels, such as the night before, then the trucks do not have to wait upon arrival for the containers to be mounted to wheels before picking them up.

Further, and for example also via interface/intercommunication with tracking application(s) such as VoyagerTrack, users can pay demurrage payments online. This allows for faster transactions by removing problems before they happen. Or, in another variation, the system can again interface with such tracking application(s) VoyagerTrack to request to be notified when a container is available for pick-up, waiting until availability to dispatch the trucker.

The systems and methods herein also allow for various interfacing with other applications such as VRU/IVR (Voice Response Unit/Interactive Voice Response) and tracking system VoyagerTrack. For example, a phone based interface in VRU can perform a subset of the tasks of the overall system. This allows users to access the system through a phone, if another access is not available. In essence, any network-based devices can be used to access the system It should be noted that any reference to a menu or drop down menu can include any number of data entry fields, not limited to drop down menus. Free text boxes can be used, auto populated text entry boxes, radio button selection, or any number of menu selection options can be used. Various specific illustrations herein are for exemplary purposes only.

Figure 22A:
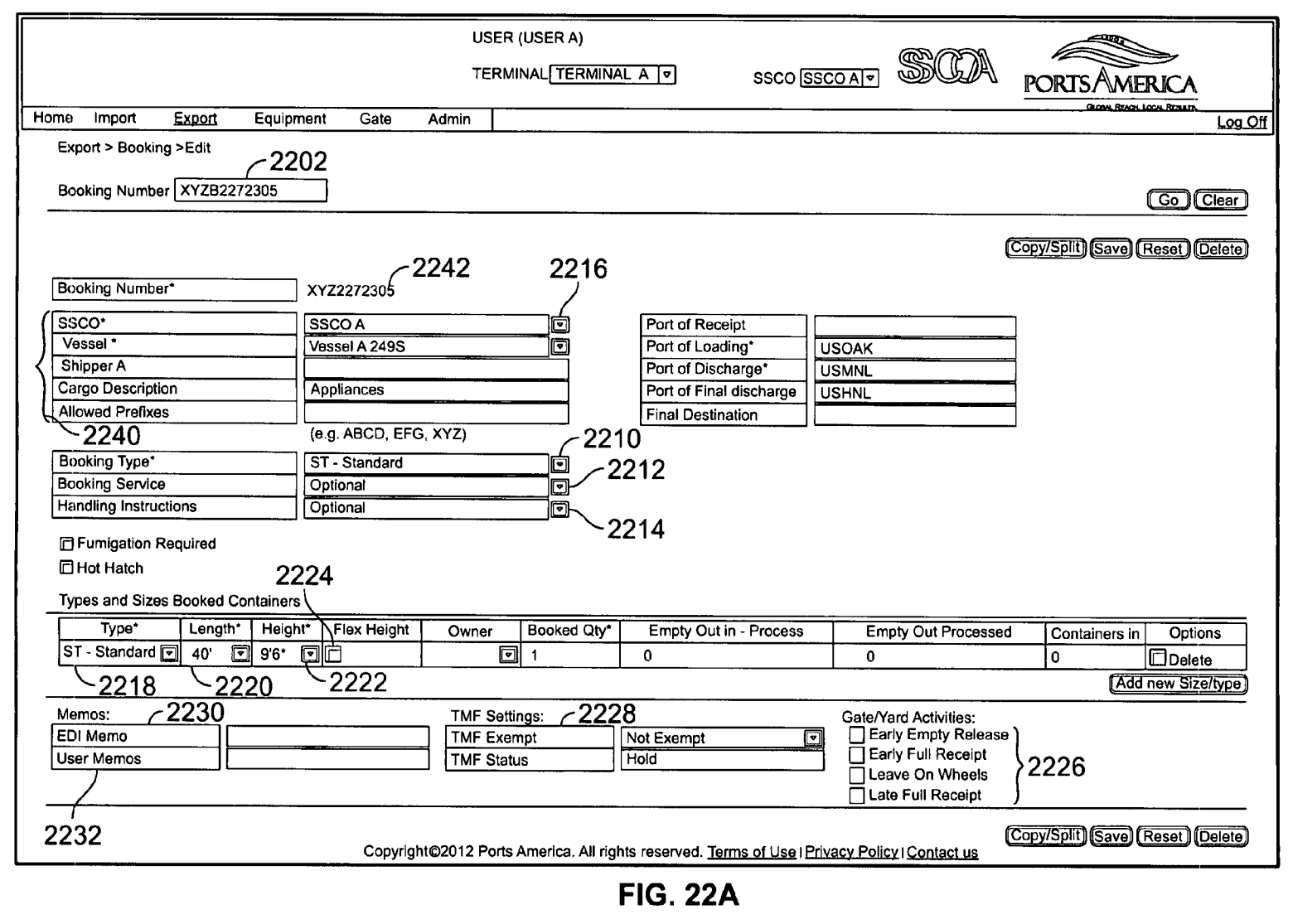

FIG. 22A includes an illustration of an implementation of the innovations disclosed here including the ability to manage export bookings. In some embodiments, a booking is a reservation for cargo movement. In some embodiments, a user can call up or search a booking by using the booking number field 2202.

When a booking is created, it is assigned booking number 2242 (for example) that can be used for future reference. Bookings are typically created by SSCOs 2216 via EDI and contain information such as: 2240 Vessel/Voyage, Load port, Destination port, Transship Port, Shipper, Cargo description, Booking type 2210 (ST, RE, DG), Temperature/vent (reefer), Hazardous class (DG), Booking Memo, and Number and Type of containers booked. One example implementation includes an interface with the complete TOS Web Portal application which can provide SSCOs with access to the Terminal's booking information through a browser interface. Additionally, it is possible for the SSCOs to create an export booking or modify and existing booking using TOS Web Portal implementations.

In some implementations, a user can select a booking type from a dropdown menu. According to one particular implementation, a set of selectable booking types in the drop down menu can comprise AK (awkward), BB (break bulk), BN (bundle), DG (dangerous), DO (door off), DR (dangerous reefer), HD (hide), MT (empty), RE (reefer), and ST (standard). However, other implementations can include only some of these and/or can include other selections.

In some embodiments, a user can select a reefer type from a dropdown menu. Exemplary reefer types include but are not limited to CA-controlled atmosphere, IN-insulated, MX-maxtend, MA-modified atmosphere, RE-Reefer, and etc.

In some embodiments, a user can select a SSCO type from a dropdown menu. Exemplary SSCOs include but are not limited to SSCOA, SSCOB, SSCOC, SSCOD, SSCOE, SSCOF, SSCOG and etc.

In some embodiments, a user can select handling instructions based on cargo descriptions from a dropdown menu. Exemplary cargo descriptions include but are not limited to accessible hazardous material, away from foodstuff, away from living quarters, away from heat, block stowage, except on desktop, fumigation required, floating crane handling, GEN, keep cool, LAT, not overstow, ondeck protected, on deck stowage, on desktop, ondeck stowage, overside deliver, overside delivery by quay crane, shoreside delivery by mobile crane, temperature control, too stowage, under deck, under deck away from heat, under deck top; under waterline, ventilation instructions, and etc.

In some embodiments, a user can select prefix for a container from a dropdown menu. Exemplary prefix included but is not limited to ABCD, EFG, XYZ, XXXU, XXYU, XXZU, and etc.

Other features which can be selected from this interface include Booking Service 2212, Handling Instructions 2214. Further, users can inspect and edit information regarding Booked Container types and sizes. Thus, a booking type 2218, can be selected, length, 2220, height, 2222, as well. The system even allows for a user to select Flex height 2224 which can allow a number of containers to be used for a particular booking, that fall within a range of heights. In some embodiments, a user can select a booking service from a dropdown menu. Exemplary booking services include but are not limited to carrier unit, cotton, daikin reefer, dirty reefer, door, off, flatrack, food grade, garment, high capacity, leased only, mesh screen reefer, metal scrap, new reefer and etc.

Further, EDI memos and User memos can be entered as well 2230 and 2232. And TMF Settings can be selected, such as TMF Exempt, TMF Status, etc. Finally, the Gate and Yard activities can be edited form this interface, 2226. Such features as Early and Empty Release, Early Full Receipt, Leave on Wheels, and/or Late Full Receipt for this booking. In some embodiments, a user has the option to save, copy, reset or delete the booking. An exemplary diagram of a Manage Booking interface is found in FIG. 22A. In some embodiments, a user can select a TMF exempt status from a dropdown menu. Exemplary TMF exempt statuses include but are not limited to not exempted, rail exempt, trans-ship exempt and etc.

Figure 22B:
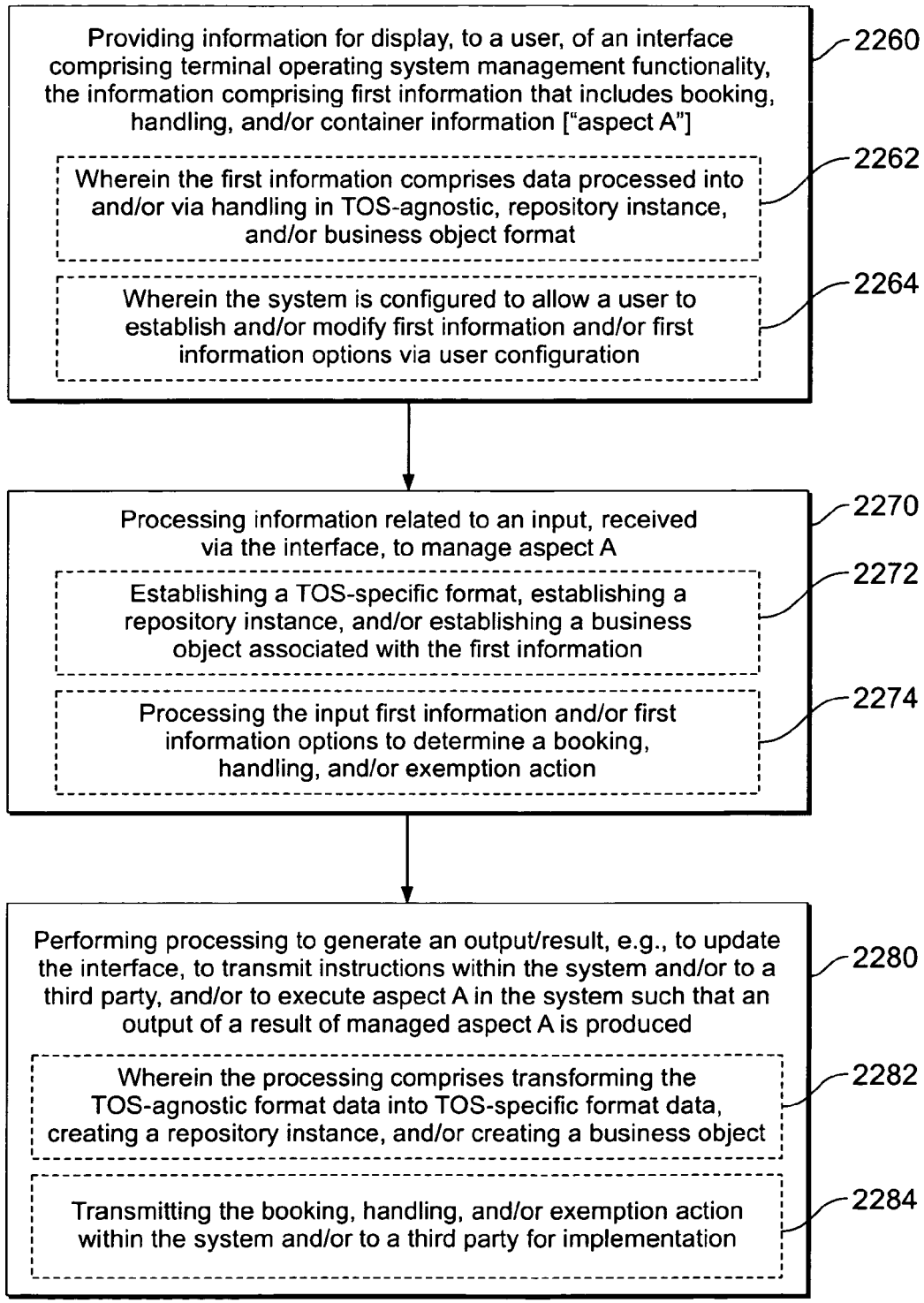
FIG. 22B is a flowchart of illustrative Manage Booking functionality consistent with one or more aspects of the innovations herein.

FIG. 22B is a flowchart of an illustrative manage booking functionality consistent with one or more aspects of the innovations herein. While several such flowcharts are shown for certain user interfaces herein, it should be understood that such functionality may be implemented in connection with any of the user interfaces either shown or described herein. According to one illustrative implementation, manage booking functionality of FIGS. 22A and 22B may include 3 steps. First, at 2260, an illustrative method of performing manage booking functionality may include providing information for display, to a user, of an interface comprising Terminal Operating System management functionality, the information comprising first information that includes booking, handling, and/or container information. Here, as is true for all of the flowcharts with regard to their associated user interfaces, such first information may be one or more of the various fields of information shown in FIG. 22A and/or described elsewhere herein, such as booking type, booking service, handling instructions, allowed prefixes, SSCO, flex height, TMF settings, etc. For the purposes of illustration, this example of first information, here 'booking, handling, and/or container information,' may be referred to herein as "aspect A." Second, such manage booking functionality may include processing information related to an input, received via the interface, to manage the aspect A, at 2270. Lastly, such manage booking functionality may include performing processing to generate an output/result, e.g., to update the interface, to transmit instructions within the system and/or to a third party, and/or to execute the aspect A in the system such that an output of a result of management of aspect A is produced, at 2280.

In some optional embodiments, the step of providing information for display may include data processed into and/or via handling in TOS-agnostic, repository instance, and/or business object format, at 2262. In other optional embodiments, such information provided for display may be provided via a system configured to allow a user to establish and/or modify the first information and/or first information options via user configuration, at 2264. In some optional embodiments, such manage booking functionality may include establishing a TOS-specific format, a repository instance, and/or a business object associated with the first information, at 2272. In other optional embodiments, such manage booking functionality may include processing the input first information and/or first information options to determine a booking, handling, and/or exemption action, at 2274. Such processing, in some optional embodiments, may comprise transforming the TOS-agnostic format data into TOS-specific format data, creating a repository instance, creating a business object, and/or performing other processing associated with such formats/constructs, at 2282. Furthermore, such manage booking functionality may include transmitting the booking, handling and/or exemption action within the system, such as out to a user interface or for implementation, and/or to a third party for implementation, action or display, at 2284.

Another example embodiment includes the ability to affect a change to a booking request. An example diagram of a change booking request interface is found in FIG. 23A. For example, after locating a specific booking, it is possible for a user to modify the booking information in an interface such as that shown in FIG. 23A. Users can access features via a Change Booking button 2350 and Change button 2358. This can include moving containers from one booking to another, changing the vessel call or Port of Discharge as needed. For example, in this interface the Containers 2356 can be listed with detailed information as well. And W/D status 2354 as well as Yard Status 2352 can be included.

Figure 23A:
FIG. 23A is a diagram of an exemplary Change Booking user interface consistent with one or more aspects of the innovations herein.
Figure 23B:
FIG. 23B is a diagram of an exemplary Change Booking Report user interface consistent with one or more aspects of the innovations herein.

A Change Booking Report, such as the example shown in FIG. 23B, can be used to review the changes to particular bookings. In FIG. 23A, a user can input who the change is submitted from and to 2378. Further, the CBR#2360, the CBR Type 2362, From 2364, To 2366, Submitted 2368, Reviewed 2370, Status, 2372, Originator, 2374 and Remarks 2376 can all be viewed.

The systems and methods herein can also be adapted to interface with other applications, such as VoyagerTrack. By doing so, users of the system are able to manage and facilitate resolution of trouble issues. This includes managing trouble tickets created by the TOS. SSCO users have the ability to organize and view trouble tickets using various filters. The trouble tickets can be delivered in any number of ways including, but not limited to email, phone, other alert.

Figure 24A:
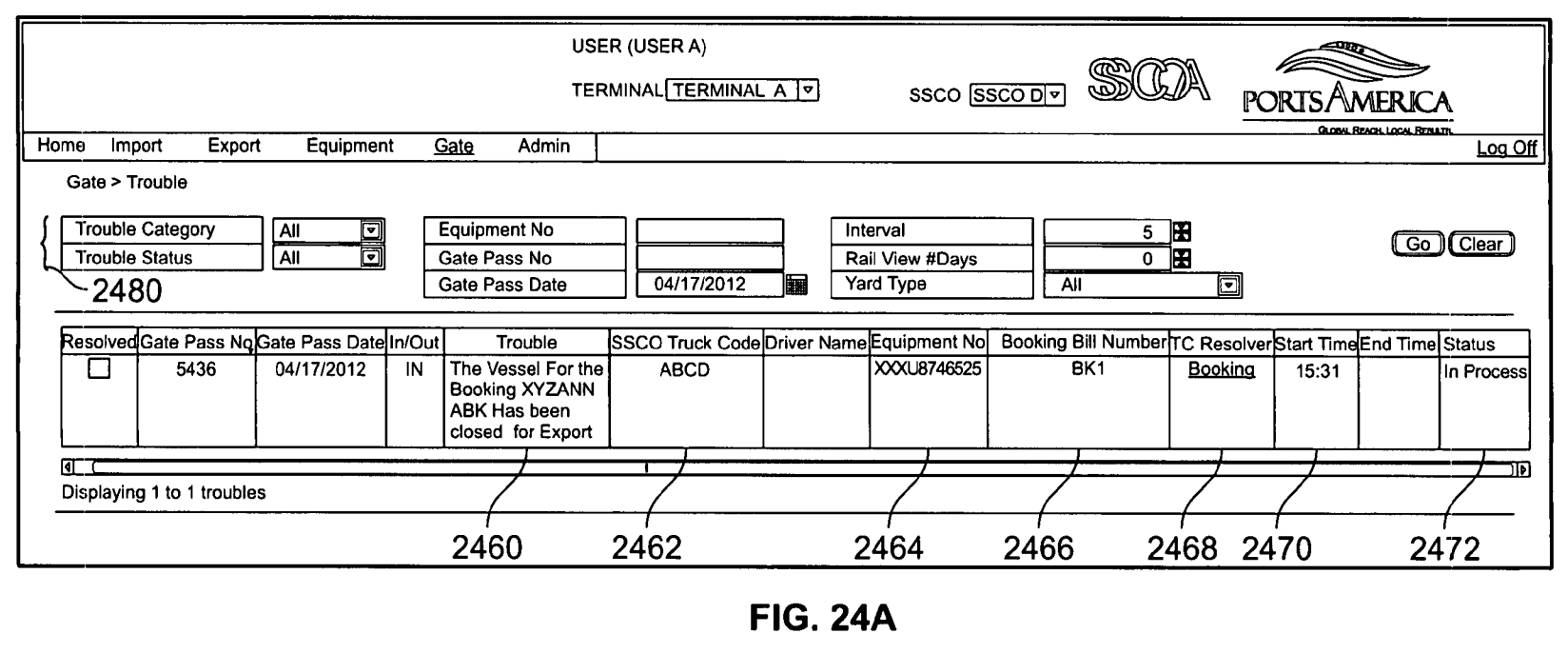

As an example, and as shown in the illustrative diagram of the Trouble Resolution System in FIG. 24A, a user has the ability to filter specific types of trouble and click the TC resolver link to review related information stores in the TOS. Trouble Category and Trouble Status can be selected 2480. The Trouble information 2460, SSCO Truck Code 2462, Equipment Number 2464, Booking Bill Number 2466, TC Resolver 2468, Start and End Times 2470 and Status 2472, among other items can all be viewed. Further, these troubles can be linked to a more detailed interface to help resolve the particular trouble. By clicking a ticket (e.g., a request for trouble shooting), a user is able to gather more detailed information about that ticket.

Figure 24B:
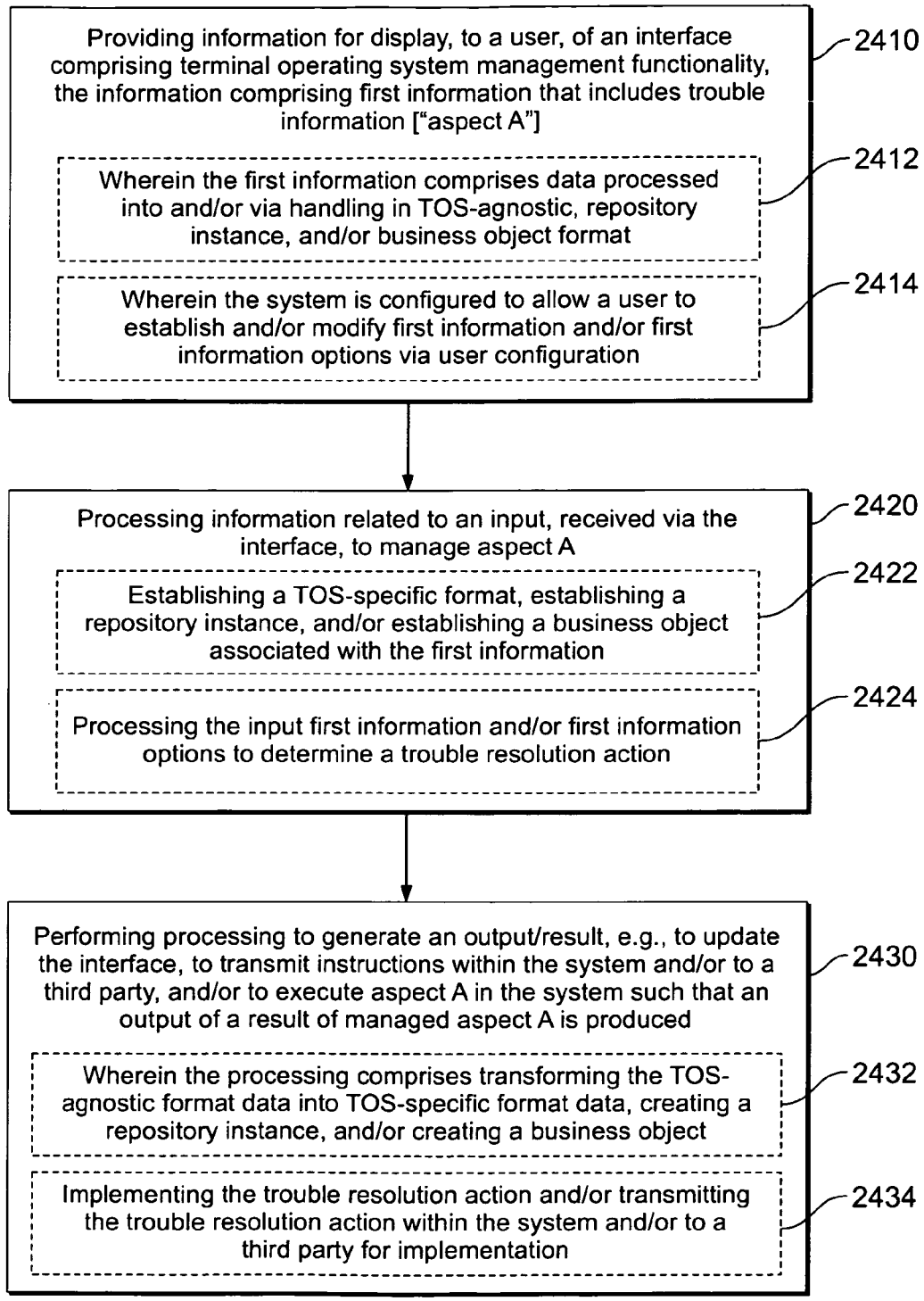
FIG. 24B is a flowchart of illustrative trouble resolution user interface consistent with one or more aspects of the innovations herein.

FIG. 24B is a flowchart of an illustrative trouble resolution user interface consistent with one or more aspects of the innovations herein. According to one illustrative implementation, such trouble resolution user interface may include 3 steps. First, at 2410, such trouble resolution user interface may include providing information for display, to a user, of an interface comprising Terminal Operating System management functionality, the information comprising first information that includes trouble or trouble-related information. For the purposes of illustration, this example of first information, here 'trouble information,' may be referred to herein as "aspect A." Second, such trouble resolution user interface may include processing information related to an input, received via the interface, to manage the aspect A, at 2420. Last, such trouble resolution user interface may include performing processing to generate an output/result, e.g., to update the interface, to transmit instructions within the system and/or to a third party, and/or to execute the aspect A in the system such that an output of a result of management of aspect A is produced, at 2430.

In some optional embodiments, the step of providing information for display may include data processed into and/or via handling in TOS-agnostic, repository instance, and/or business object format, at 2412. In other optional embodiments, such information provided for display may be provided via a system configured to allow a user to establish and/or modify the first information and/or first information options via user configuration, at 2414. In some optional embodiments, such trouble resolution user interface may include establishing a TOS-specific format, a repository instance, and/or a business object associated with the first information, at 2422. In other optional embodiments, such trouble resolution user interface may include processing the input first information and/or first information options to determine a trouble resolution action, at 2424. Such processing, in some optional embodiments, may comprise transforming the TOS-agnostic format data into TOS-specific format data, creating a repository instance, and/or creating a business object, or performing processing associated with any such constructs, at 2432. Furthermore, such trouble resolution user interface may include implementing the trouble resolution action and/or transmitting the trouble resolution action within the system and/or to a third party for implementation, at 2434.

Figure 25:
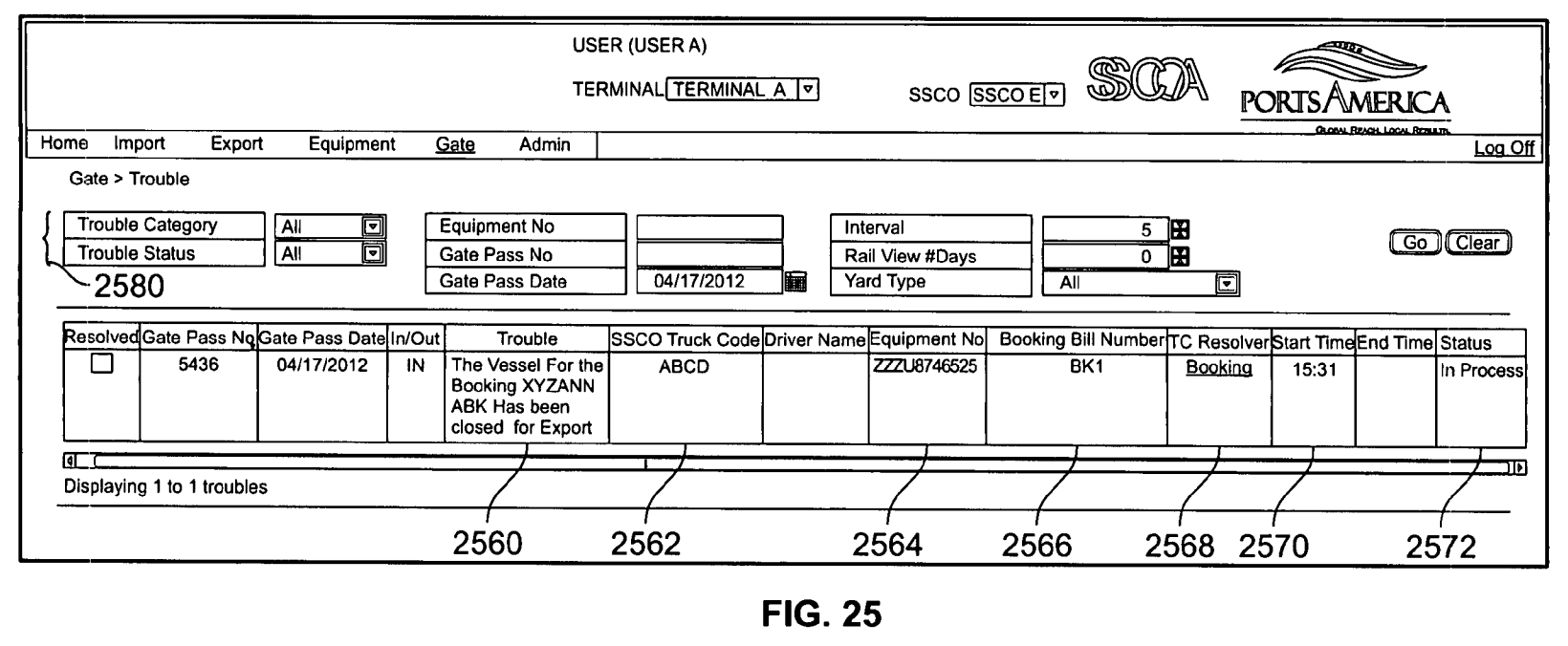

An illustrative implementation of a linked example interface is shown in FIG. 25. Here, users can choose options to update data and potentially correct problems so that the affected parties, (e.g. driver and terminal clerk) can resolve the trouble. Example inputs can include Trouble Category and Status 2580, Trouble information 2560, SSCO Truck Code 2562, Equipment Number 2564, Booking Bill Number 2566, TC Resolver 2568, Start and End times 2570 and Status 2572 among others.

The systems and methods herein can also be configured such that the users to receive information about equipment interchanges, Equipment Interchange Reports (EIR) and inspections. These can be supplied by the system in the form of a report. Example reports are found in FIGS. 26A and 27.

The system can create an equipment interchange and inspection report using data gathered from the TOS.

For example, in FIG. 26A, the information about container movement activity can be checked, such as the Full In/Out, Empty In/Out, Chassis In/Out and Rail In/Out, 2698. The Rail In/Out can be a virtual representation of activity with the rail companies. Further, details can be shown for multiple bookings such as the EIR 2680, Date 2682, Trucker 2684, Move Type 2686, Cntr No, 2688, SSCO 2690, Seal Number 2692, Chassis Number 2694 and Gate Pass Number 2696 among others.

Figure 26B:
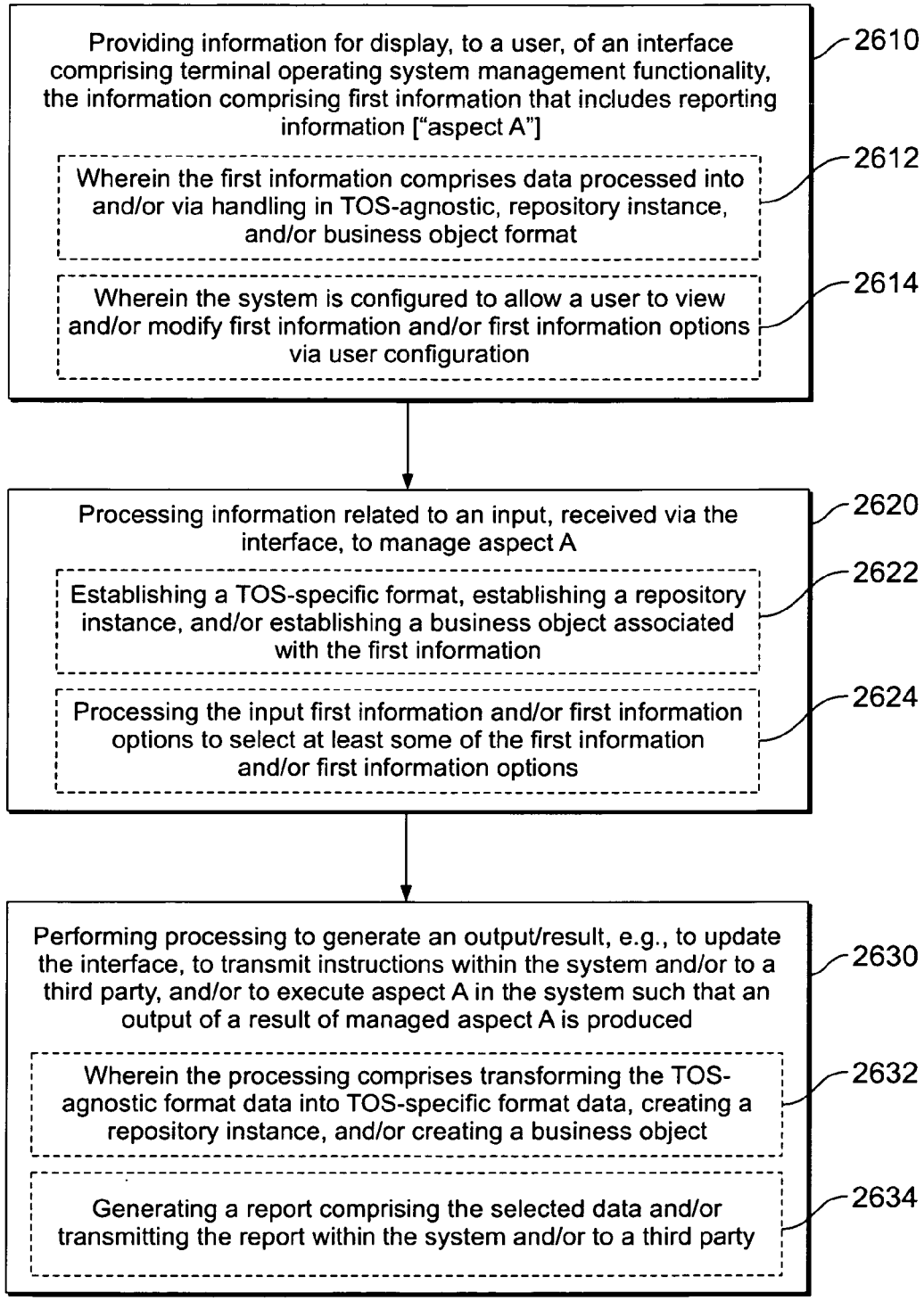
FIG. 26B is a flowchart of an illustrative Equipment Interchange Report user interface consistent with one or more aspects of the innovations herein.

FIG. 26B is a flowchart of an illustrative equipment interchange report (EIR) user interface consistent with one or more aspects of the innovations herein. According to one illustrative implementation, such equipment interchange report user interface may include 3 steps. First, at 2610, such equipment interchange report user interface may include providing information for display, to a user, of an interface comprising Terminal Operating System management functionality, the information comprising first information that includes reporting information. For the purposes of illustration, this example of first information, here 'reporting information,' may be referred to herein as "aspect A." Second, such equipment interchange report user interface may include processing information related to an input, received via the interface, to manage the aspect A, at 2620. Last, such equipment interchange report user interface may include performing processing to generate an output/result, e.g., to update the interface, to transmit instructions within the system and/or to a third party, and/or to execute the aspect A in the system such that an output of a result of management of aspect A is produced, at 2630.

In some optional embodiments, the step of providing information for display may include data processed into and/or via handling in TOS-agnostic, repository instance, and/or business object format, at 2612. In other optional embodiments, such information provided for display may be provided via a system configured to allow a user to establish and/or modify the first information and/or first information options via user configuration, at 2614. In some optional embodiments, such equipment interchange report user interface may include establishing a TOS-specific format, a repository instance, and/or a business object associated with the first information, at 2622. In other optional embodiments, such equipment interchange report user interface may include processing the input first information and/or first information options to select at least some of the first information and/or first information option, at 2624. Such processing, in some optional embodiments, may comprise transforming the TOS-agnostic format data into TOS-specific format data, creating a repository instance, and/or creating a business object, or performing processing associated with any such constructs, at 2632. Furthermore, such equipment interchange report user interface may include generating a report comprising the selected data and/or transmitting the report within the system and/or to a third party, at 2634.

Figure 27:
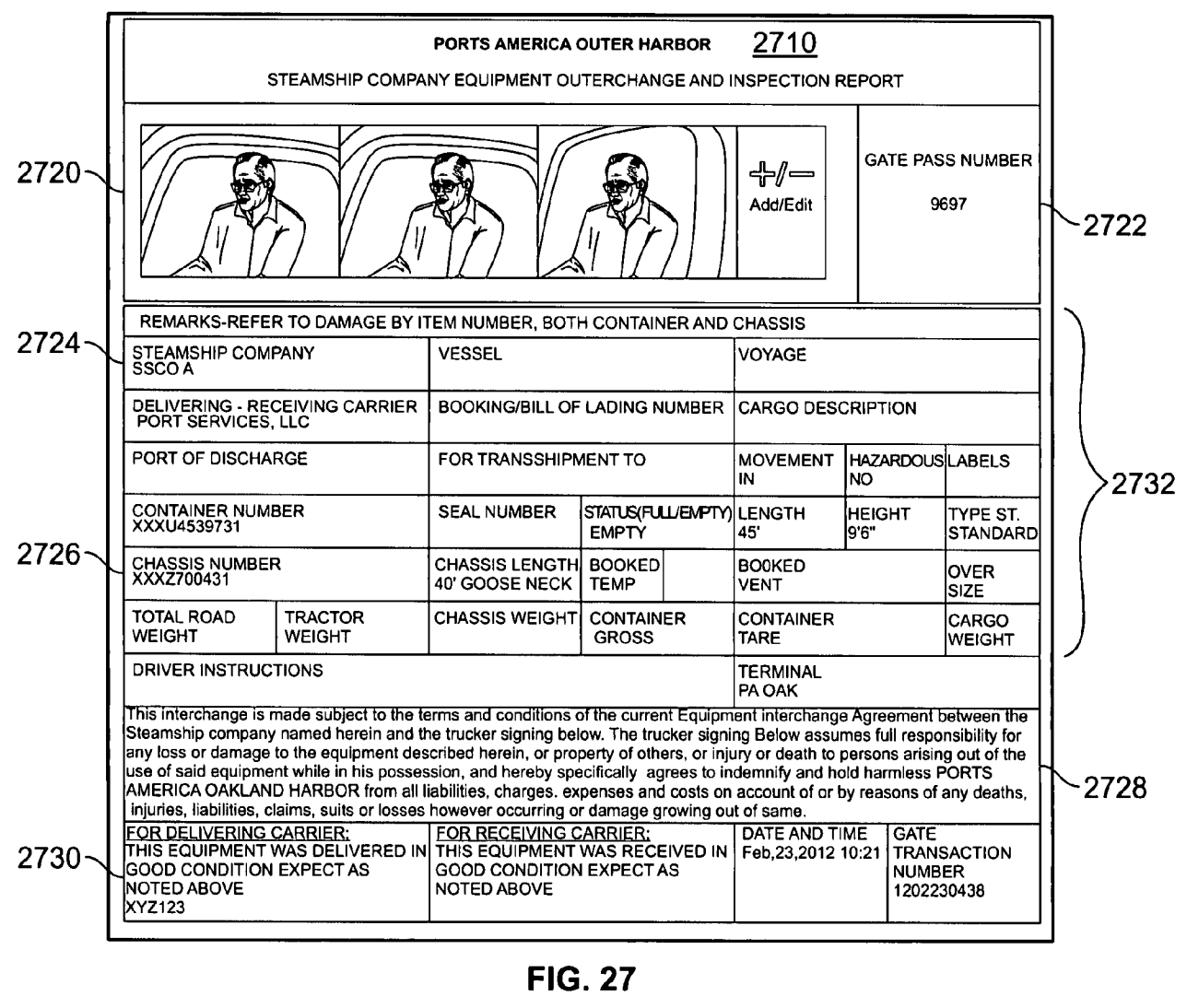

An example EIR for one container is shown in FIG. 27. In this example the title 2710 shows the company name and the port name. Here details of the report are shown for this particular container 2732. For example, the picture of the trucker who moved move this container can be shown 2720. The Gate Pass Number 2722 is also present. The details of the SSCO 2724, details of the Chassis Number 2726, and notes for the Interchange 2728 and Delivering Carrier 2730 can also be found here.

Yet another ability of the system is to allow users to view (create, modify) equipment releases. An example diagram shows a sample equipment release in FIG. 28A consistent with one or more aspects of the innovations herein. Details can be checked on this interface including, the Release Number 2820, Length, 2830, Type 2832, Height, 2834, Owner 2836, Booked quantity, 2838, Out Quantity 2840, In progress Quantity 2842, Flex Height selection 2844 and Options 2846 among others.

Figure 28A:
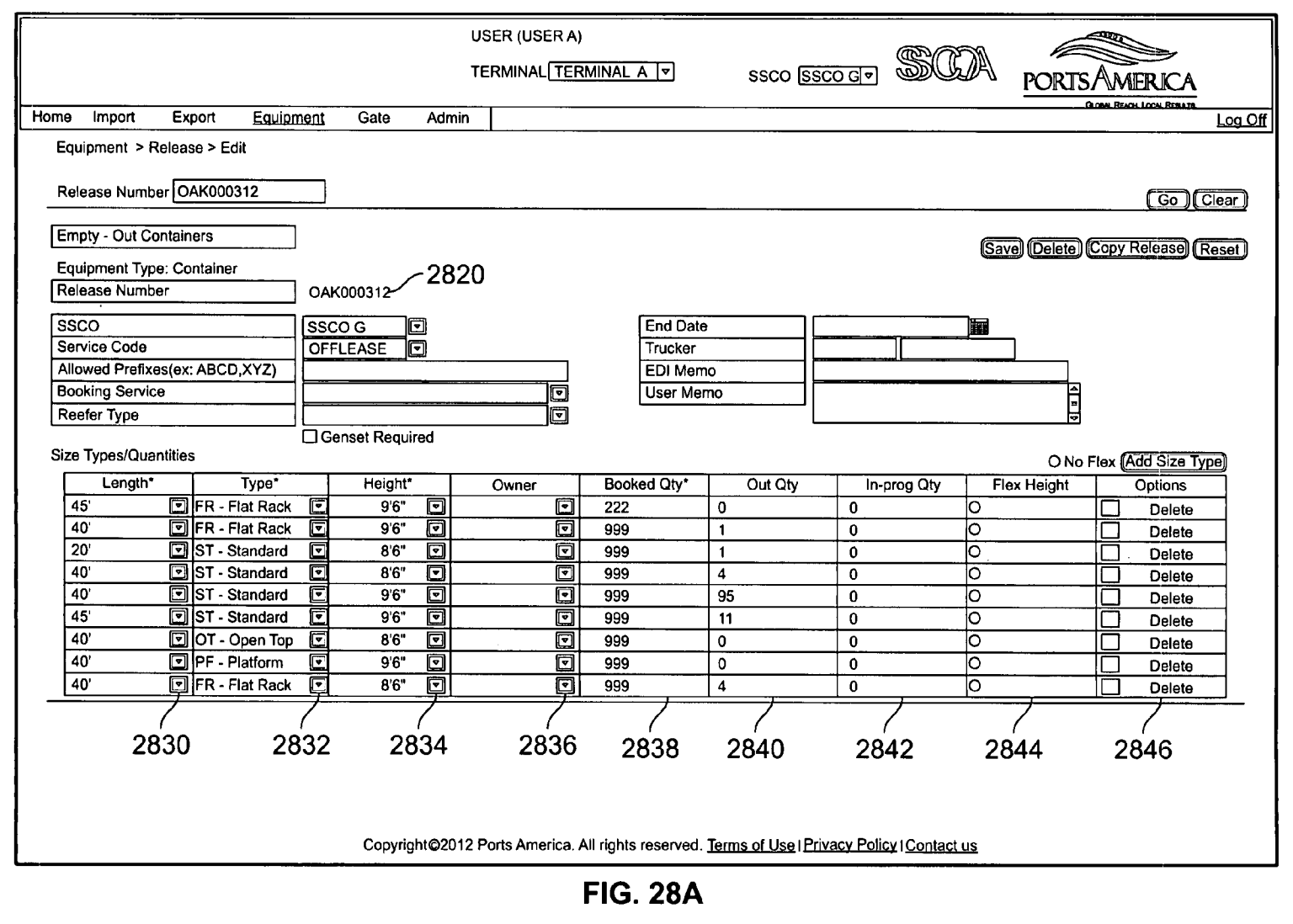
Figure 28B:
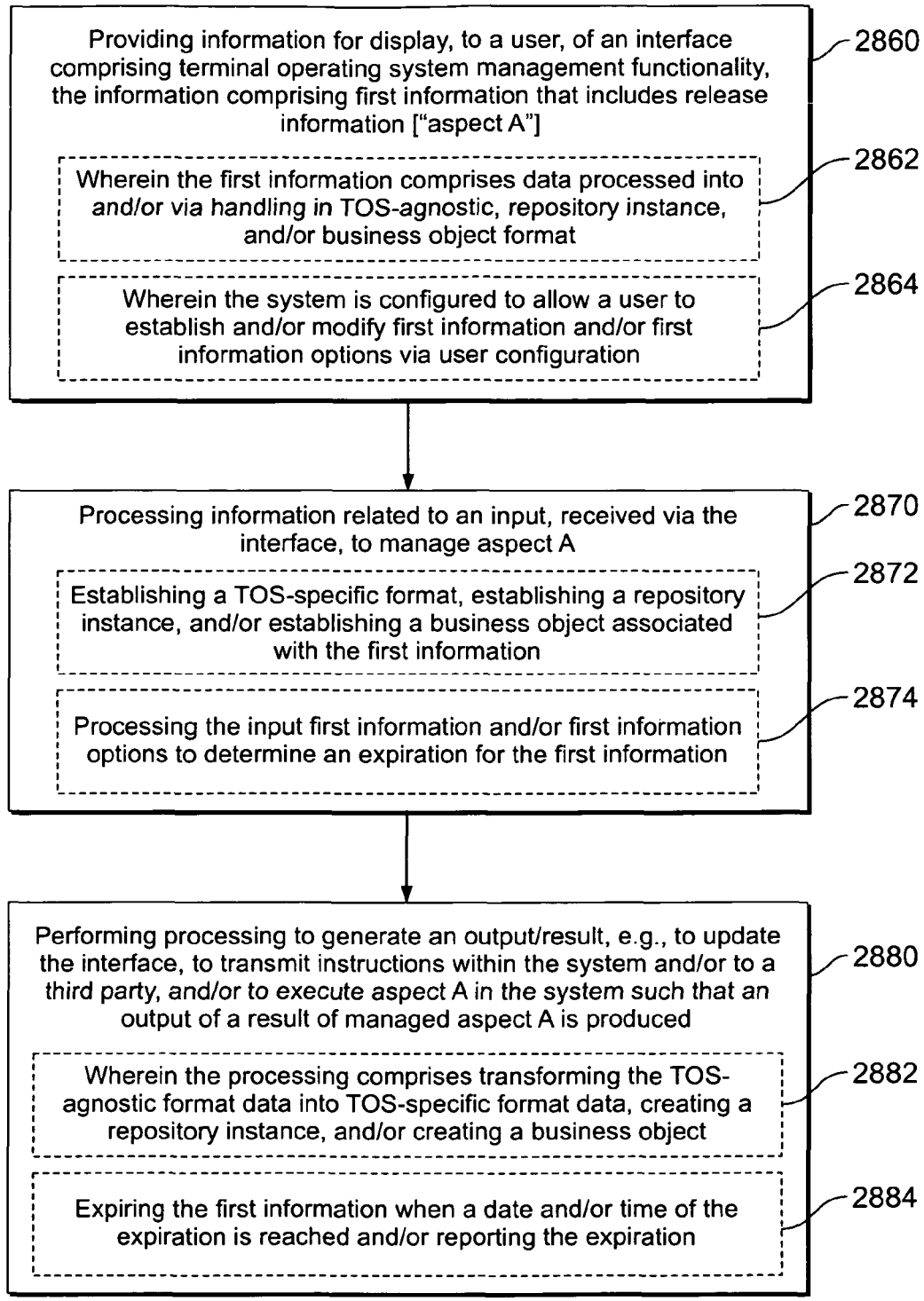
FIG. 28B is a flowchart of an illustrative Equipment Release user interface consistent with one or more aspects of the innovations herein.

FIG. 28B is a flowchart of an illustrative equipment release user interface consistent with one or more aspects of the innovations herein. According to one illustrative implementation, such equipment release user interface may include 3 steps. First, at 2860, such equipment release user interface may include providing information for display, to a user, of an interface comprising Terminal Operating System management functionality, the information comprising first information that includes release information. For the purposes of illustration, this example of first information, here 'release information,' may be referred to herein as "aspect A." Second, such equipment release user interface may include processing information related to an input, received via the interface, to manage the aspect A, at 2870. Last, such equipment release user interface may include performing processing to generate an output/result, e.g., to update the interface, to transmit instructions within the system and/or to a third party, and/or to execute the aspect A in the system such that an output of a result of management of aspect A is produced, at 2880.

In some optional embodiments, the step of providing information for display may include data processed into and/or via handling in TOS-agnostic, repository instance, and/or business object format, at 2862. In other optional embodiments, such information provided for display may be provided via a system configured to allow a user to establish and/or modify the first information and/or first information options via user configuration, at 2864. In some optional embodiments, such Equipment Release user interface may include establishing a TOS-specific format, a repository instance, and/or a business object associated with the first information, at 2872. In other optional embodiments, such Equipment Release user interface may include processing the input first information and/or first information options to determine an expiration for the first information, at 2874. Such processing, in some optional embodiments, may comprise transforming the TOS-agnostic format data into TOS-specific format data, creating a repository instance, and/or creating a business object, or performing processing associated with any such constructs, at 2882. Furthermore, such Equipment Release user interface may include expiring the first information when a date and/or time of the expiration is reached and/or reporting the expiration, at 2884.

FIG. 29 shows an example diagram of a sample export vessel manager interface. The export vessel manager can allow users to manage the details of every vessel export in the system. Details can be examined here including a Vessel/Booking Summary 2930 including Length, Booked, Containers In, To Come and Late Receipt information. Further, the interface can show information related to No Partial, 2940, Late Receipt, 2942, Early Receipt, 2944, Booking Number 2950, Length 2952, Height 2954, Type 2956 among others.

User Interface/GUI

Exemplary implementations of the system user interface/GUI can contain features that allow users to navigate the system and also efficiently complete the forms and gather information. Examples of such user interfaces/GUIs can be found in FIGS. 30A, 31, 33 and 34A.

FIG. 30A is a diagram showing illustrative features and functionality for exemplary Equipment Control for Multiple Actions processing. Here, for example, a user can apply or remove a particular action or service code to a set of containers or chassis. The interface provides information on existing service codes and equipment states and performs edit checks on the permissibility of said user action. Information about the Equipment Number 3070, Status, 3072 and Service Code 3074, among others can be accessed here. Further, in certain embodiments, the user can select from dropdown options under the "action for container" section 3076. Such an example drop down options include but are not limited to one or more of authorize container receipt, empty in for vessel, off-lease, for sale, reposition, out for repairs, not to be returned empty, to be off-leased, to be sold, export dray-off, genset required, hot hatch, delete all actions and etc. Such actions can be applied multiple sets of containers designated on the interface.

In some implementations, a user can select a service code from a dropdown menu. Exemplary service codes include but are not limited to none, offlease, out for repairs, for sale, reposition, and etc.

Figure 30B:
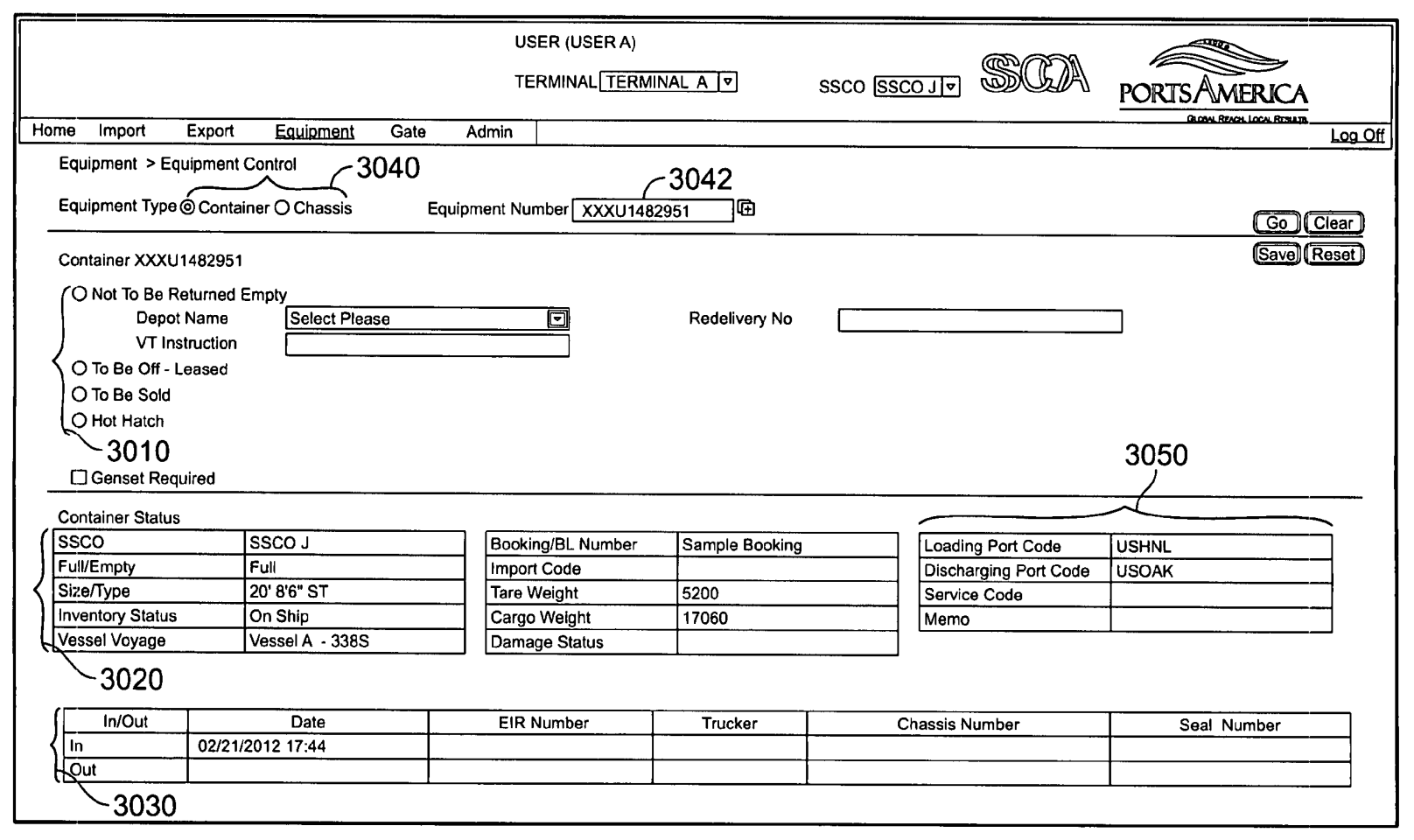

FIG. 30B is a diagram showing illustrative user features and functionality for an exemplary Equipment Control page for Single Actions processing. As in the case of Multiple Action processing, the user can apply or remove a particular action or service code to a single container or chassis. In this case, the interface provides more information regarding the chosen piece of equipment and presents the user with valid action options. The Equipment Type 3040 can be selected as well as Container information 3010 such as whether it is to be returned empty, to be off-leased, sold, hot hatch, etc. Hot hatch is an example where it should be loaded so as to be accessible first, and not inappropriately stowed beneath non-hot hatch containers in the yard or on the ship Further Container status can be viewed 3020, EIR details 3030, and Port information 3050 among others.

Figure 30C:
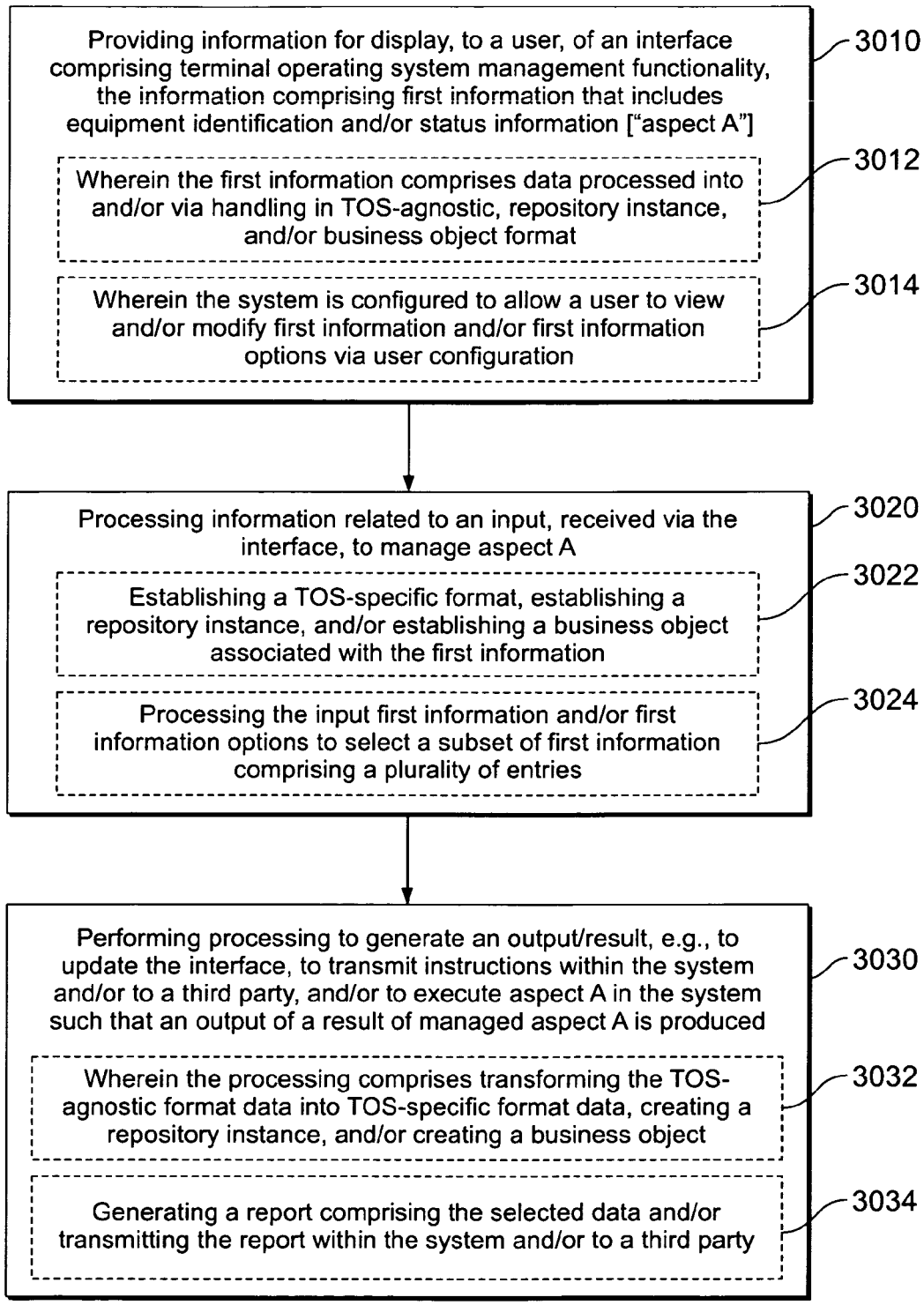
FIG. 30C is a flowchart of an illustrative Equipment Control user interface consistent with one or more aspects of the innovations herein.

FIG. 30C is a flowchart of an illustrative equipment control user interface consistent with one or more aspects of the innovations herein. According to one illustrative implementation, such equipment control user interface may include 3 steps. First, at 3010, such equipment control user interface may include providing information for display, to a user, of an interface comprising Terminal Operating System management functionality, the information comprising first information that includes equipment identification and/or status information. For the purposes of illustration, this example of first information, here 'equipment identification and/or status information,' may be referred to herein as "aspect A." Second, such equipment control user interface may include processing information related to an input, received via the interface, to manage the aspect A, at 3020. Last, such equipment control user interface may include performing processing to generate an output/result, e.g., to update the interface, to transmit instructions within the system and/or to a third party, and/or to execute the aspect A in the system such that an output of a result of management of aspect A is produced, at 3030.

In further optional embodiments, the step of providing information for display may include data processed into and/or via handling in TOS-agnostic, repository instance, and/or business object format, at 3012. In other optional embodiments, such information provided for display may be provided via a system configured to allow a user to establish and/or modify the first information and/or first information options via user configuration, at 3014. In some optional embodiments, such equipment control user interface may include establishing a TOS-specific format, a repository instance, and/or a business object associated with the first information, at 3022. In other optional embodiments, such equipment control user interface may include processing the input first information and/or first information options to select a subset of first information comprising a plurality of entries, at 3024. Such processing, in some optional embodiments, may comprise transforming the TOS-agnostic format data into TOS-specific format data, creating a repository instance, and/or creating a business object, or performing processing associated with any such constructs, at 3032. Furthermore, such equipment control user interface may include generating a report comprising the selected data and/or transmitting the report within the system and/or to a third party, at 3034.

Figure 31:
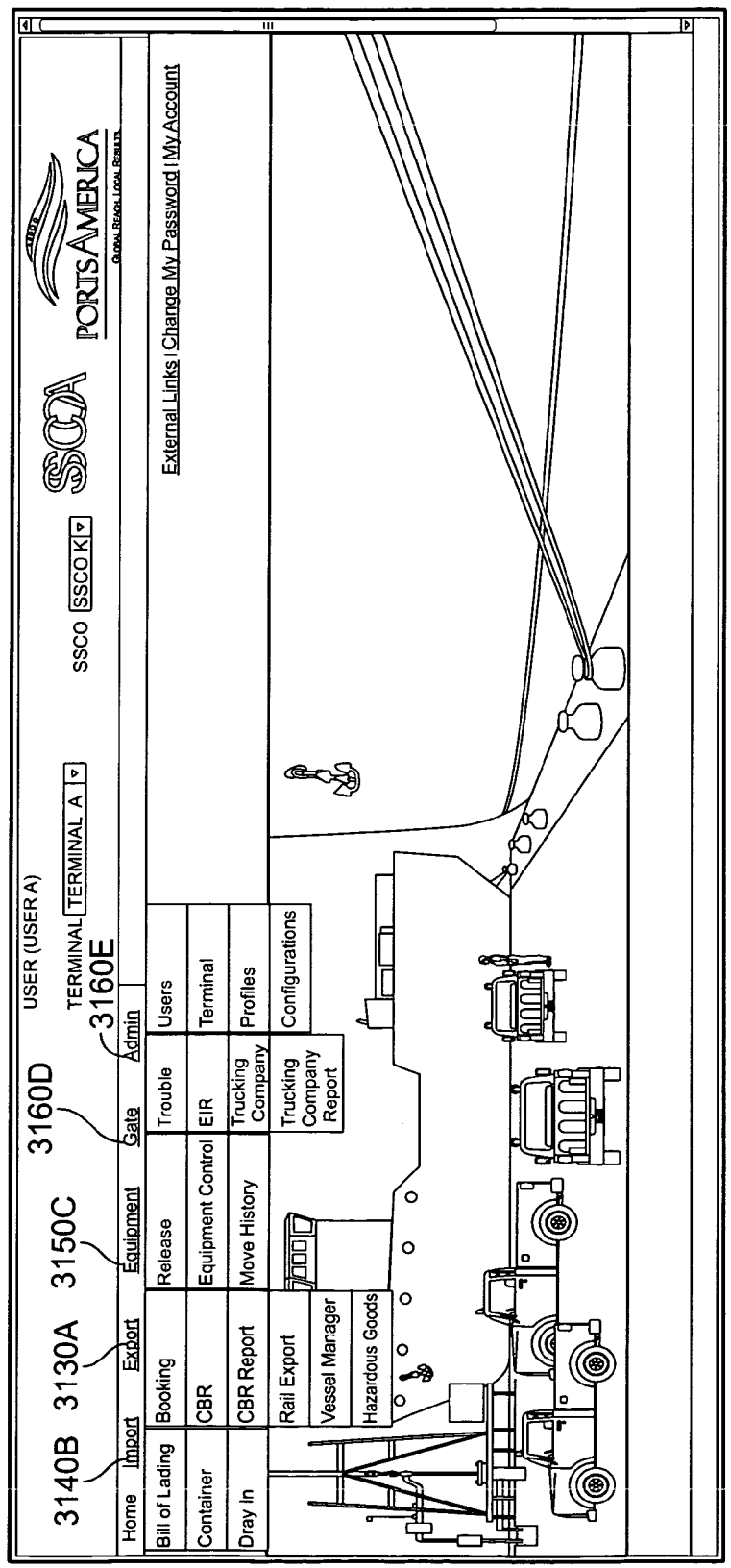
FIG. 31 is a diagram of an exemplary a Home Screen illustrating dropdown options for various functionalities.

FIG. 31 provides examples of illustrative drop-down menus that can be used for navigation. Element 3130A illustrates dropdown options available for the Export function, including, for example, booking, CBR, CBR report, rail export, vessel manager, hazardous goods and etc. Element 3140B illustrates dropdown options available for the Import function, including, for example, bill of lading, container, dray in and etc. Element 3150C illustrates dropdown options available for the Equipment function, including, for example, release, equipment control, move history and etc. Element 3160D illustrates dropdown options available for the Gate function, including, for example, trouble EIR, trucking company, trucking company report and etc. Element 3160E to 3170E illustrates dropdown options available for the Admin function, including, for example, terminal, profiles, configurations, and etc.

FIG. 32A is an example Hazardous Goods Container List interface. It is a combination of a summary report and update tool. This is an example in which a user can manage details of a booking without having to individually go into the system to achieve such a goal, using, for example, many editable fields in the summary report. For example, a summary report can be generated corresponding to a particular booking number that is entered in booking number field 3202. For example, a user can switch between summary pages for different bookings by changing the booking number field. When container number field 3204 is left empty, a summary report is generated corresponding to the booking number, which lists all containers in the particular booking. The interface depicts a summary page for hazardous goods items within in a specific booking, in general connection with container numbers. Further, information about the containers in the particular booking can be provided as a listing of containers 3220 to a user and updated by the user via many editable fields. A user can elect to add new containers to the booking via the add new container field 3222. Editable field 3230 is provided such that a user can add or update information concerning hazardous items in a container. Specific hazardous items are identified in hazardous item field 3240, which can also be edited. For example, in Container XXXU041966, hazardous items 07-1.2 and 0038-1.2 are specified. As indicated, a user can select specific containers among all the containers listed for a particular booking via container selection tool 3224.

Figure 32B:
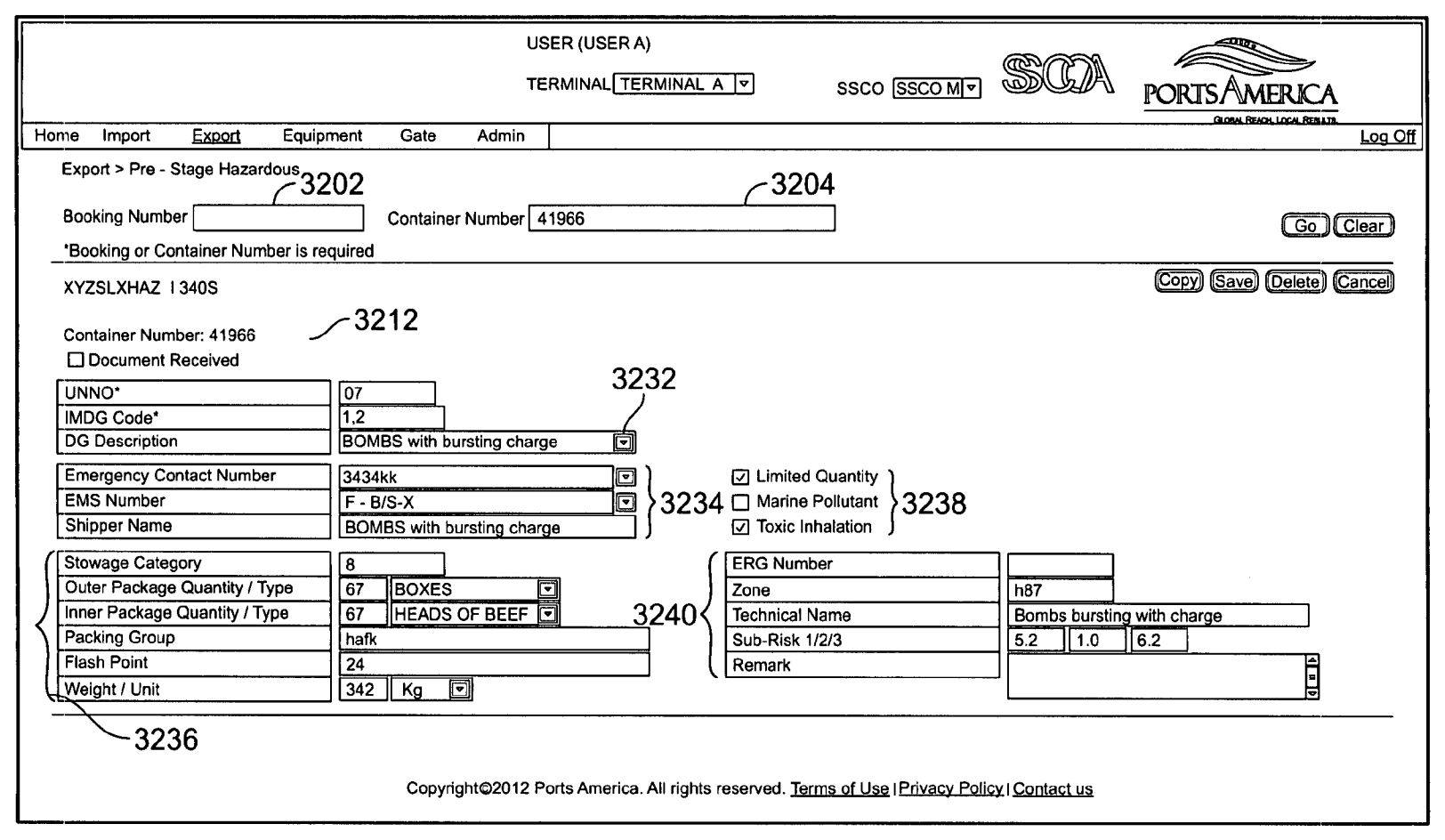

FIG. 32B depicts an exemplary hazardous goods item interface. This is another example in which a user can manage details of a booking without having to individually go into the system to achieve such a goal. In this example, the summary report is generated at a different level. Here, a user further navigates between different containers using the container number field 3204 after a booking number is already specified in booking number field 3202. The interface depicts a summary page for hazardous goods items within a specific container in a specific booking with many editable fields. The exemplary summary report includes information about the specified container (e.g., 3212). In FIG. 32A, information concerning hazardous items 07-1.2 in Container XXXU041966 is provided. Description of the item is provided via, for example, a dropdown menu 3232. Emergency contact information, EMS number and shipper information are provided by multiple fields in 3234. Here, a user can select among multiple dropdown menu or manually enter specific information. Quantity, pollutant and toxicity information can be specified; e.g., in field 3238. Packing information is provided in multiple fields in 3236. For example, a user can specify the sizes and weights of the boxes containing the hazardous items from one or more dropdown menus. Additional risk or danger information is provided in multiple fields in 3240.

Figure 33:
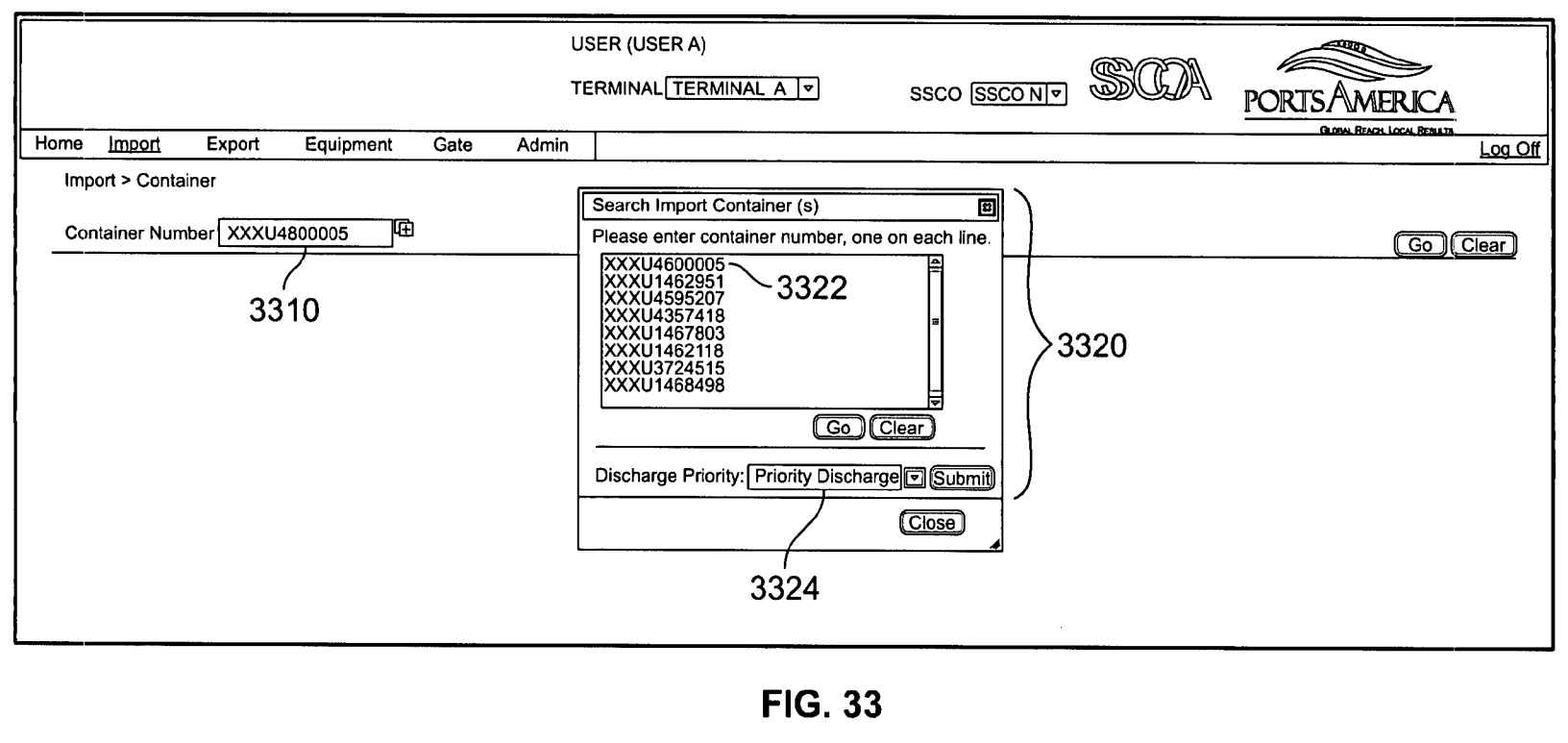

FIG. 33 depicts exemplary features of illustrative cut and paste tools/functionality, e.g., as used for multiple lists. Via utilization of such tools, a user has the ability to copy full lists of container numbers or booking numbers and then paste that list into a field which results in a new popup interface. For example, by moving the mouse to container number field 3310, an interface 3320 (e.g., a popup menu) will be presented, into which multiple container numbers 3322 can be entered. In some embodiments, interface 3320 can further include additional functional fields, such as a discharge priority field 3324 for discharging priority of a particular container using, for example, a dropdown menu. Additional buttons/actions such as submit or close can also be included in interface 3320. After submitting a container number, the user can then navigate to a multiple edit interface, such as FIG. 22A, FIG. 26A, FIG. 28A, and FIG. 33, or apply a new Discharge Priority setting to the containers specified. In additional embodiments, the functionalities depicted in FIG. 33 can be applied to booking numbers, item numbers.

Figure 34A:
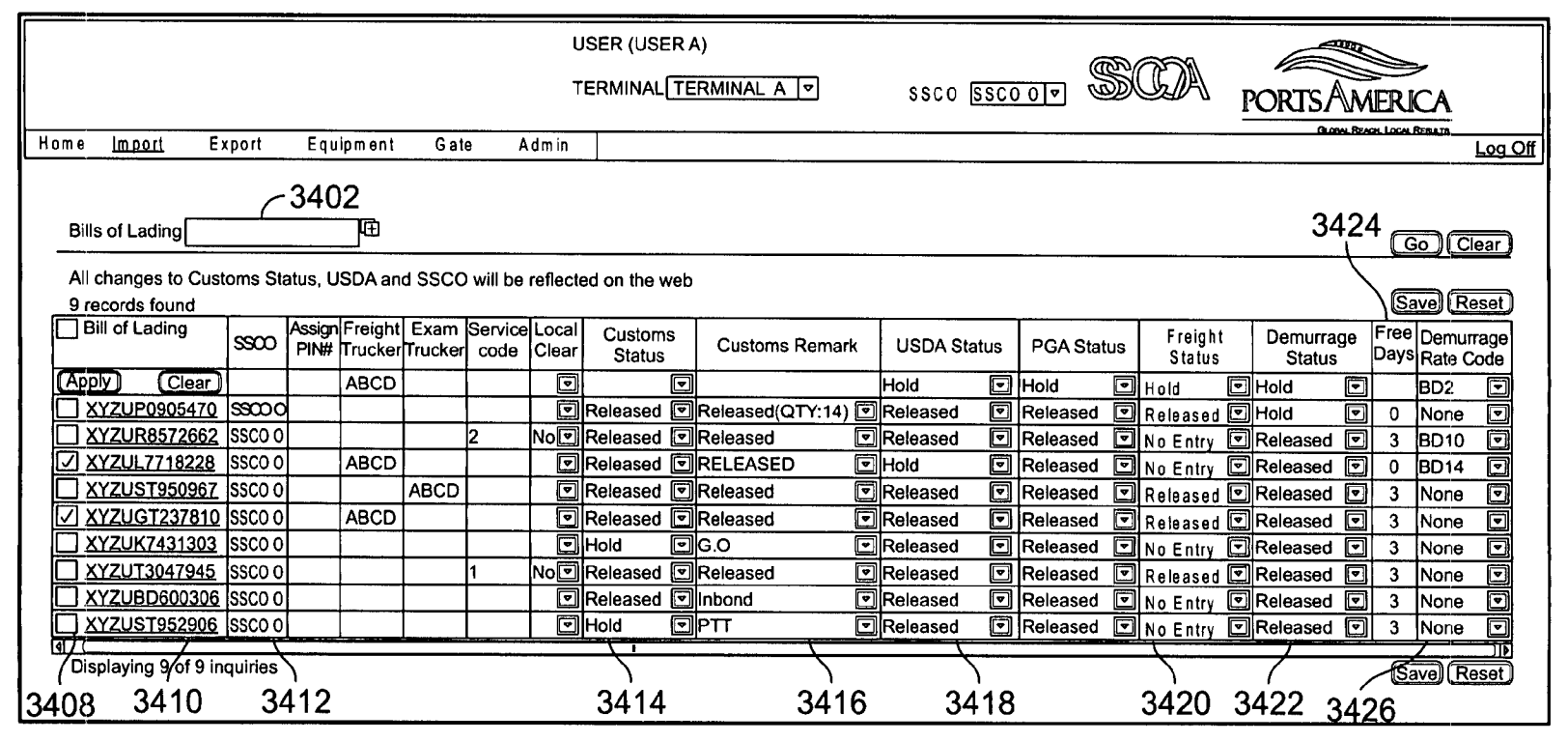

FIG. 34A depicts an exemplary bill of lading interface, again with multiple editable fields. Multiple records are listed in field 3410. Field 3408 provides a user the ability to select and update one or more records by checking the boxes corresponding to the items. Information concerning customs status, customs remarks, and USDA status, are included in corresponding editable fields 3414, 3416, 3418, respectively. Based on the information received, a user can update one or more status by using one or more corresponding dropdown menus. Freight status is displayed in field 3420 and can be updated using one or more dropdown menus. Number of free days of the demurrage can be entered via field 3424. Demurrage rate code is displayed in field 3426 and can be edited via, for example, one or more dropdown menus.

Figure 34B:
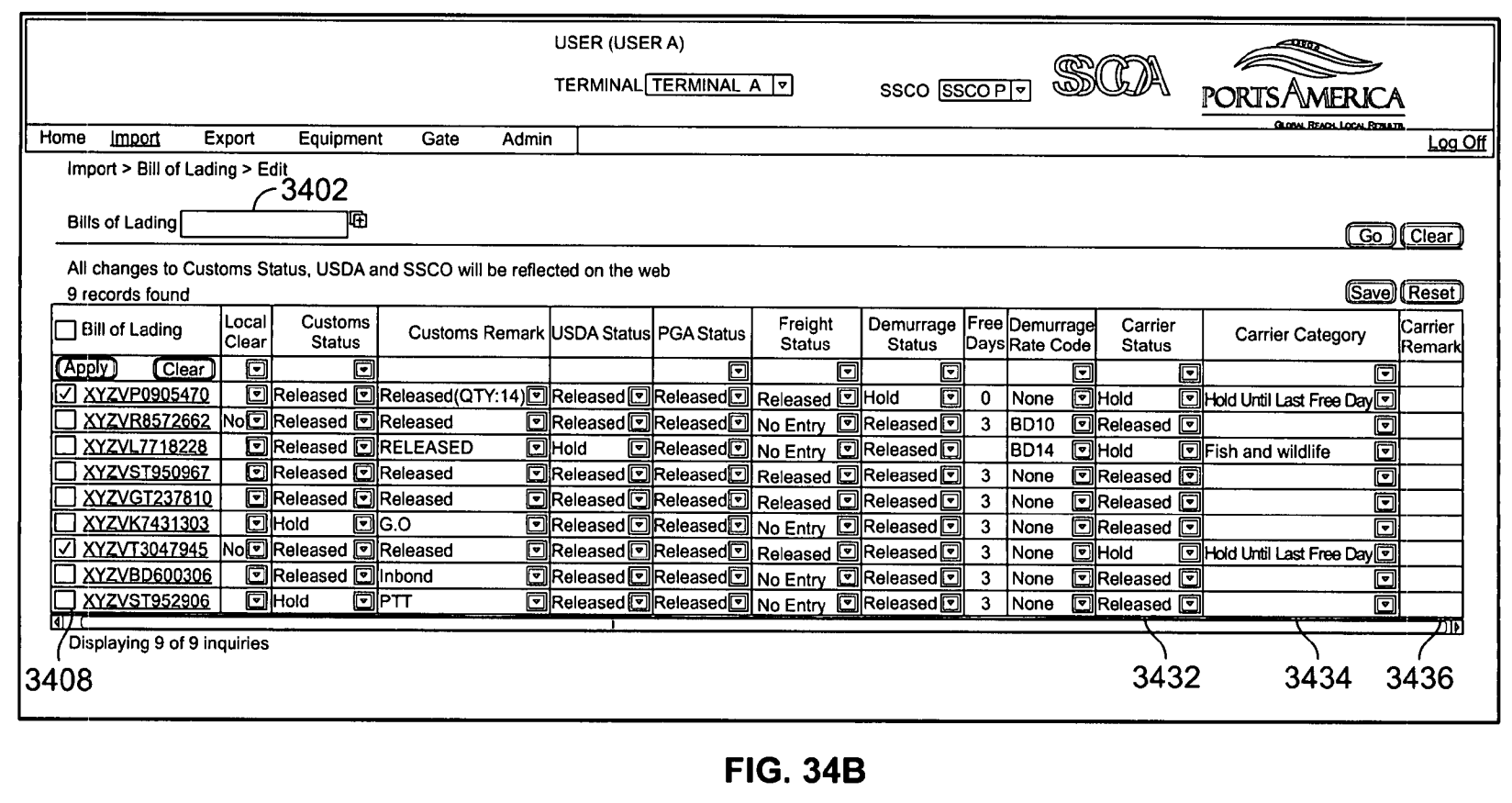

FIG. 34B depicts another exemplary bill of lading interface, again with multiple editable fields. Here an extension of the interface depicted in FIG. 34A is shown. For example, carrier status, carrier category and carrier remark are found in in fields 3432, 3434 and 3436. Again, via a combination of summary list and editable fields, a user can view and change records for a bill of lading and containers associated to same FIG. 34C depicts a detailed view of an exemplary bill of lading user interface. For example, a detailed summary is generated for a record selected by checking the corresponding box in field 3408. Details concerning bill of lading record T3047945 are shown. A user can navigate to a different bill of lading by using field 3440. For example, customs status and remark, USDA status and remark, and carrier status and remark are shown in field 3442. Origin, port of discharge, destination, consignee, truck assignment and hazardous goods information care included in field 3446. Further, information concerning the container in the bill of lading is also provided, for example, in field 3444. A user can review and edit information concerning the bill of lading via one or more editable fields and/or one or more dropdown menu.

Figure 34D:
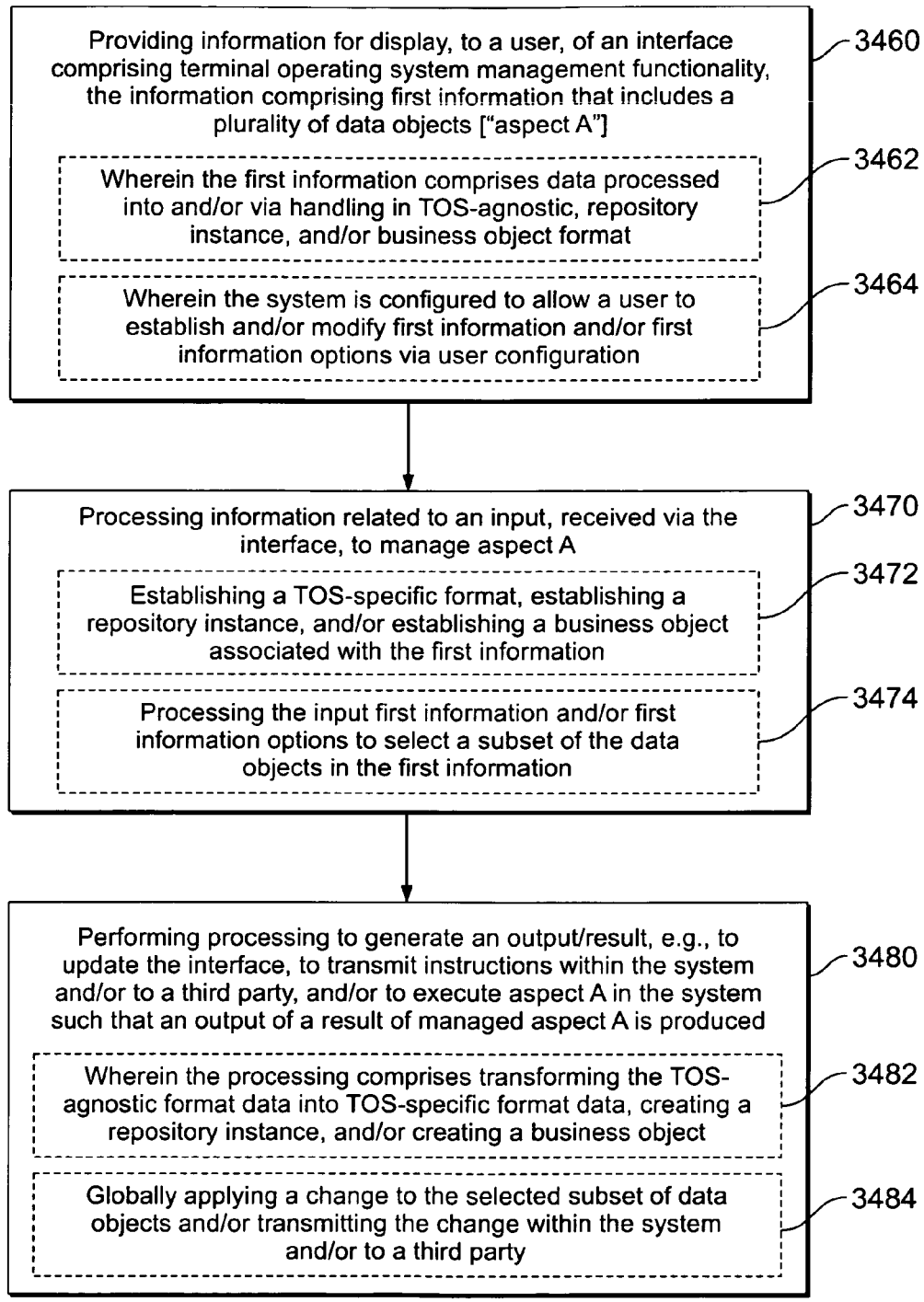
FIG. 34D is a flowchart of an illustrative Bill of Lading (Import) user interface consistent with one or more aspects of the innovations herein.

FIG. 34D is a flowchart of an illustrative bill of lading (import) user interface consistent with one or more aspects of the innovations herein. According to one illustrative implementation, such bill of lading (import) user interface may include 3 steps. First, at 3460, such bill of lading (import) user interface may include providing information for display, to a user, of an interface comprising Terminal Operating System management functionality, the information comprising first information that includes a plurality of data objects. For the purposes of illustration, this example of first information, here 'a plurality of data objects,' may be referred to herein as "aspect A." Second, such bill of lading (import) user interface may include processing information related to an input, received via the interface, to manage the aspect A, at 3470. Last, such bill of lading (import) user interface may include performing processing to generate an output/result, e.g., to update the interface, to transmit instructions within the system and/or to a third party, and/or to execute the aspect A in the system such that an output of a result of management of aspect A is produced, at 3480.

In some optional embodiments, the step of providing information for display may include data processed into and/or via handling in TOS-agnostic, repository instance, and/or business object format, at 3462. In other optional embodiments, such information provided for display may be provided via a system configured to allow a user to establish and/or modify the first information and/or first information options via user configuration, at 3464. In some optional embodiments, such bill of lading (import) user interface may include establishing a TOS-specific format, a repository instance, and/or a business object associated with the first information, at 3472. In other optional embodiments, such bill of lading (import) user interface may include processing the input first information and/or first information options to select a subset of the data objects in the first information, at 3474. Such processing, in some optional embodiments, may comprise transforming the TOS-agnostic format data into TOS-specific format data, creating a repository instance, and/or creating a business object, or performing processing involving such constructs, at 3482. Furthermore, such bill of lading (import) user interface may include globally applying a change to the selected subset of data objects and/or transmitting the change within the system and/or to a third party, at 3484.

Figure 35:
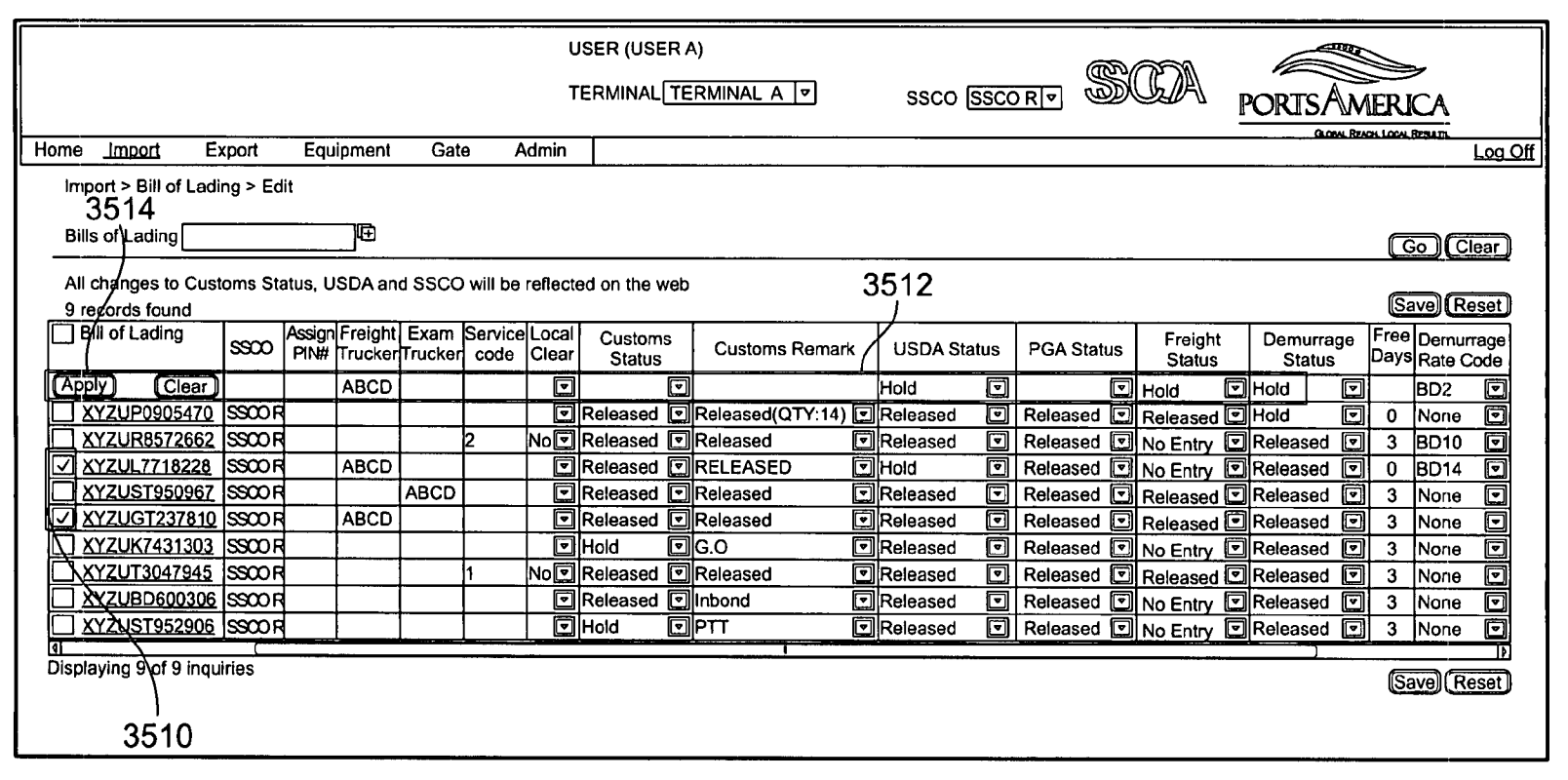

Additionally, FIG. 35 depicts a sample diagram illustrating the "apply all" function. Using this function, a user can assign information to multiple containers without having to select each individually. For example, multiple items can be selected by checking the corresponding boxes in field 3510. An action, e.g., local clear status, customs status, customs remarks, USDA status, freight status, demurrage status, number of free days, demurrage range code, and etc. can be applied to the selected items by clicking the apply button 3514. Actions specified in the top box 3512 fill down to the specified containers.

Figure 36A:
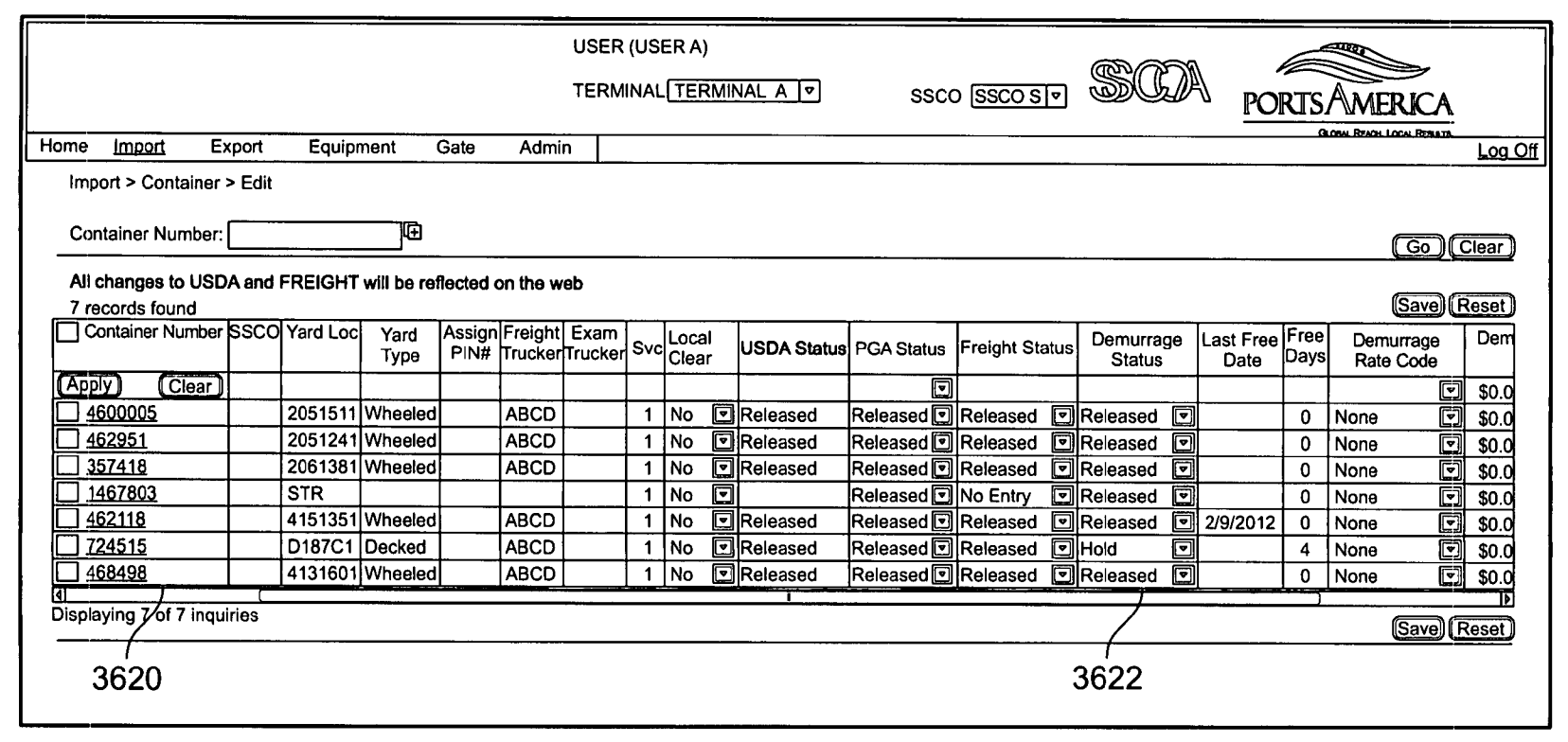
Figure 36B:
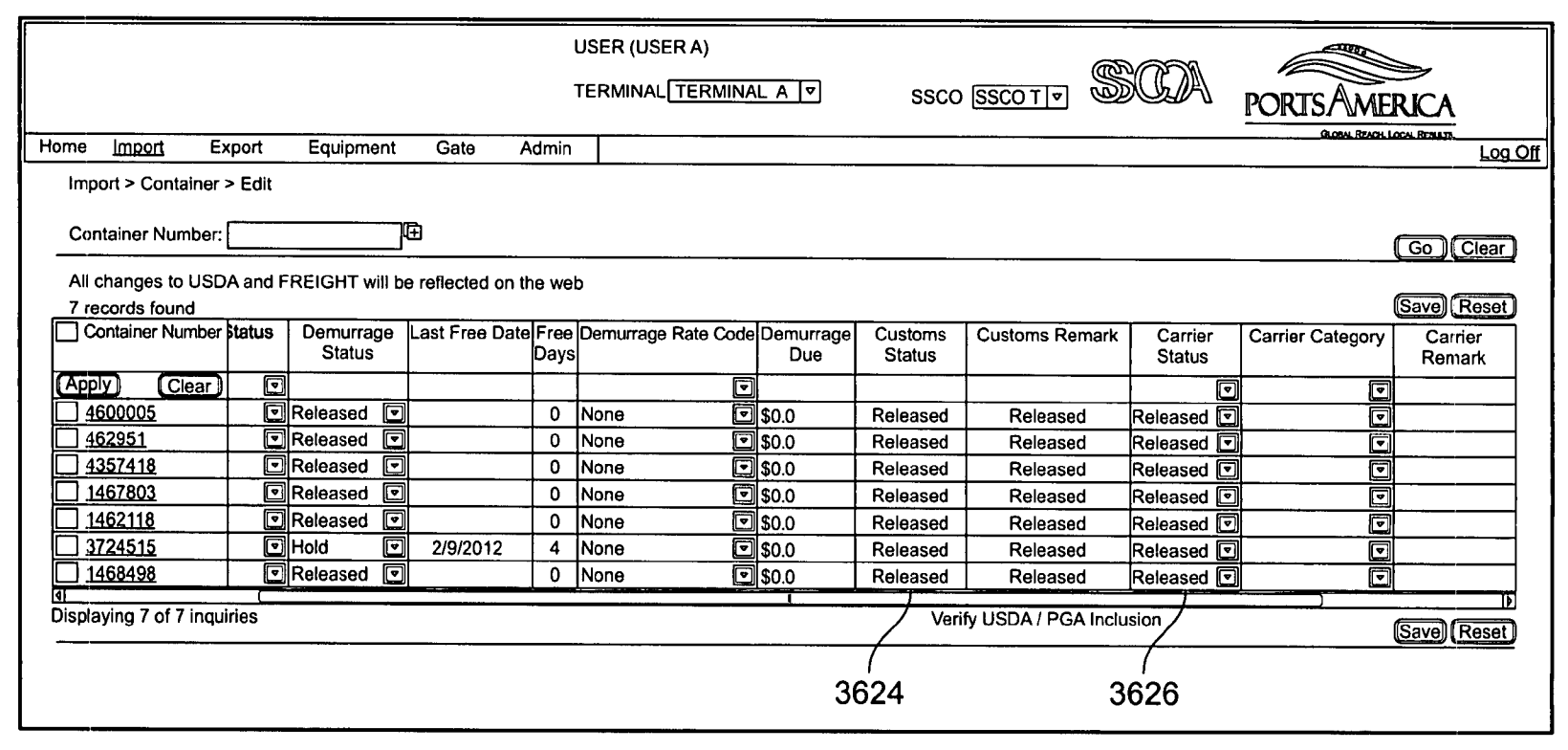

FIG. 36A and FIG. 36B depict illustrative diagram of the Import Container Edit functionality. The exemplary interface is similar to that of the sample bill of lading interface shown in FIGS. 34A and 34B. Here the user can: apply or release various holds such as freight, carrier and customs; change demurrage rate codes; and assign pin numbers or trucking companies for container pick-up. For import container, emphasis is placed on identifying container number in field 3620 and displaying/editing demurrage status in field 3622, customs status in field 3624, and carrier status in field 3626. Similar to the functionalities shown for the bill of lading interface in in FIGS. 34A and 34B, a user can enter, update or revise information via manual entry or using one or more dropdown menus or free text fields.

And in certain embodiments, drop down menus can be used to select entries for population of fields. For example, users can select, in the carrier category 3626, options such as anyone of but not limited to: contact SSCO EQ control dept, FDA hold, fish and wildlife, hold pending diversion, hold until last free day, other, US Coast Guard, Other.

FIG. 36C depicts an illustrative diagram of a sample Import Container Detail user interface. Here, for example, system in configured to provide a user interface including more detailed information about a container's status within a particular bill of lading. A user can navigate between different containers by using field 3630. Freight status, customs status and remark, USDA status and remark, and carrier status and remark are shown in field 3632. Terminal hold, delivery, and hazardous goods information care included in field 3634. Service code, port of loading and discharge information is displayed in field 3636. Type, size and status information of the container is shown in field 3638. Carrier and demurrage information is displayed in 3640. Yard and truck information is shown in field 3642. A user can review and edit information concerning the container via one or more editable fields and/or one or more dropdown menu. Further, information concerning the container in the bill of lading is also provided as a reference, for example, in field 3634.

FIG. 37 depicts an illustrative a diagram showing an example of the auto suggest/auto complete and/or validation functionalities. The auto suggestion, auto complete and validation functionalities can be applied in any context, in connection with booking, container, or bill of lading. Here, an example is provided in connection with freight trucker. When a user selects freight trucker field 3710 (e.g., by moving the computer mouse over the field), an expanded interface is provided. As the user types the trucker code, the application suggests valid codes from the database and provides further information about the Trucking Company status. Information of multiple trucking companies, including names is provided. Further, auto population of boxes can occur as the user begins to type in an entry. For example, users can select, in the Freight Trucker 3710 box, one or more trucking companies that have four letter designations. For example, if LTKC corresponds to Luck Transportation Inc., then typing in "LU" in the box would auto populate the box with suggestions, and Luck Transportation would come up first, allowing the user to select that company selection without having to finish typing. Further a number of other suggestions 3712 can be suggested by the system, allowing the user to select from them as well.

Figure 38A:
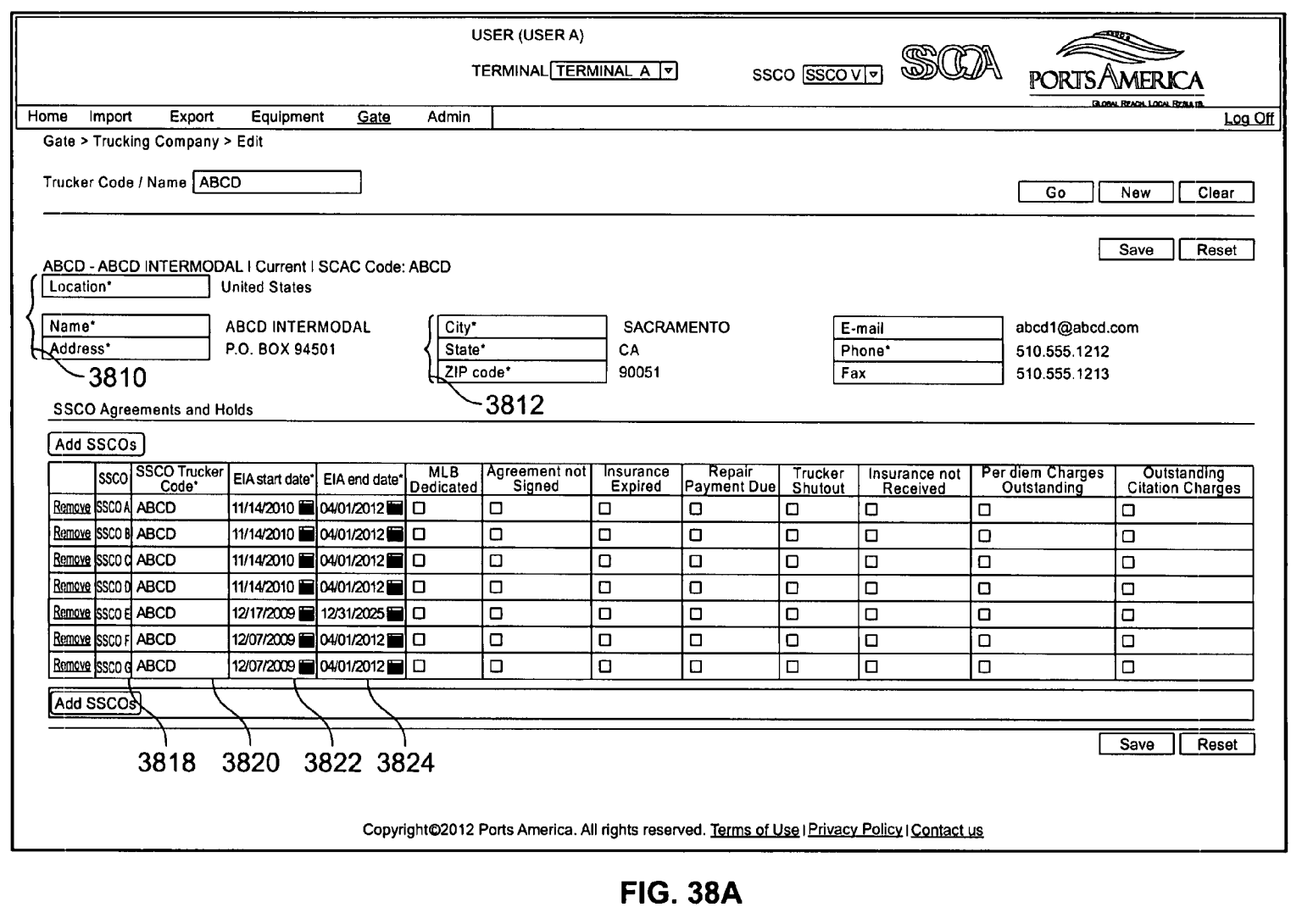

Additionally, a link button, can also be provided. Via the link button, a user can access information concerning a trucking company at the trucker maintenance page, such as shown in FIG. 38A. Additional information is provided, including but not limited to Yard information in field 3714. The user can also update and correct information concerning the particular trucking company via the link button. Again, a user can review and edit information concerning the trucking company via one or more editable fields and/or one or more dropdown menu.

FIG. 38A depicts an illustrative diagram of a sample trucker maintenance Interface, for example, accessible from a link button on a dropdown or expanded interface, such as the one shown in FIG. 37. Here, users can update the status of company agreements and place various holds on the Trucking Company's ability to service containers for a particular Steamship Company. A user can navigate between different trucking companies via field 3802. Once a trucking company is specified, a summary report is generated, which includes multiple editable fields such as location fields 3810 and 3812 for name and address of the company, as well as telephone, fax and email contact information. Assignment information (e.g., SSCO agreement and holds) for the trucking company is shown in fields 3818, 3820, 3822, and 3824; thus providing a tool for the user to keep track of the location and availability of the trucking company within a particular time frame. Here, a user can also review and edit information concerning the trucking company via one or more editable fields and/or one or more dropdown menu.

Figure 38B:
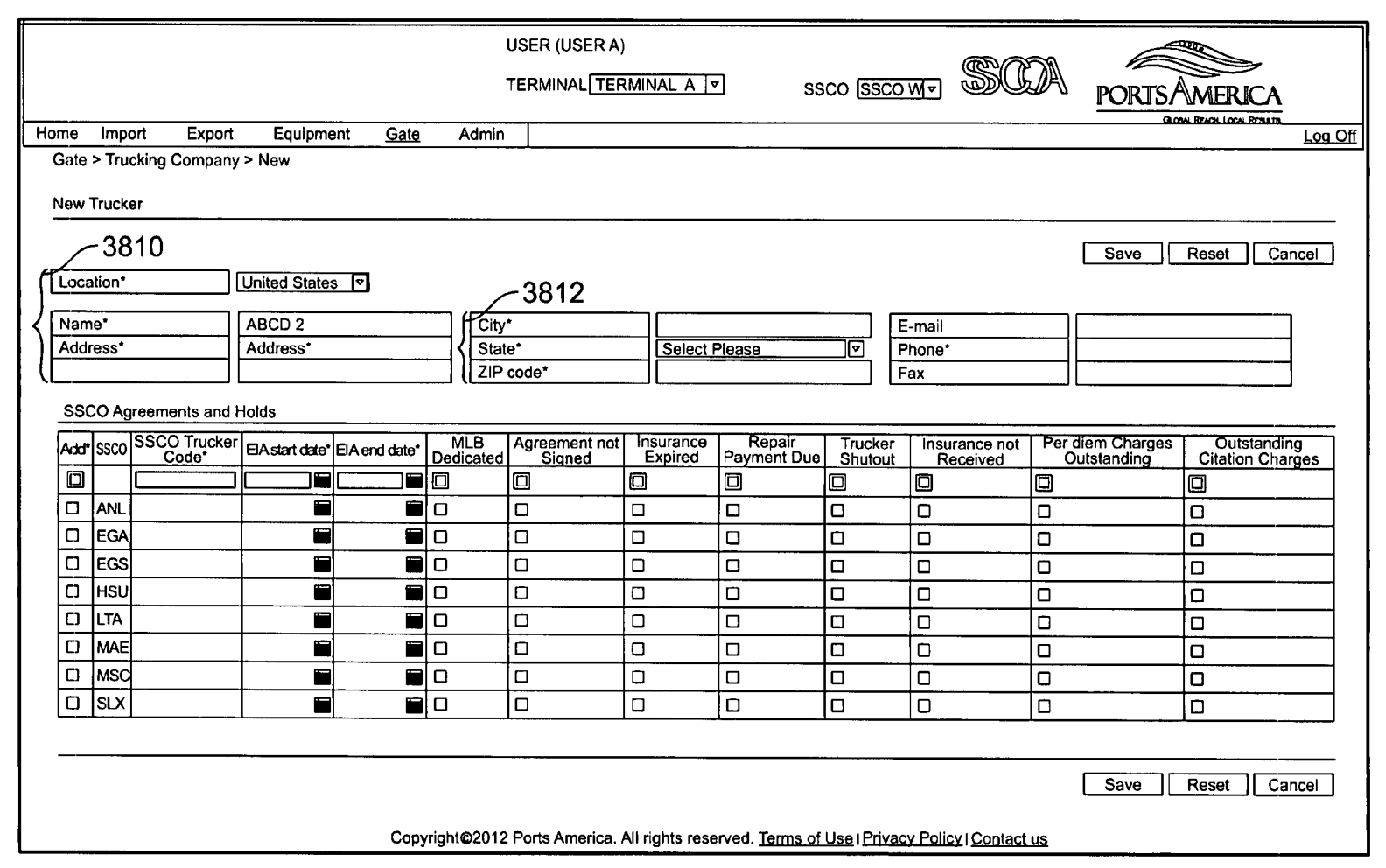

FIG. 38B depicts an illustrative diagram of a sample Create New Trucker Maintenance Interface. When a trucking company has not been previously entered in the database, a user can create a new record of the trucking via the tool depicted in FIG. 38B. Location fields 3810 and 3812 can be used for entering information such as name and address of the company, as well as telephone, fax and email contact. Assignment information (e.g., SSCO agreement and holds) for the trucking company can also be entered.

Figure 38C:
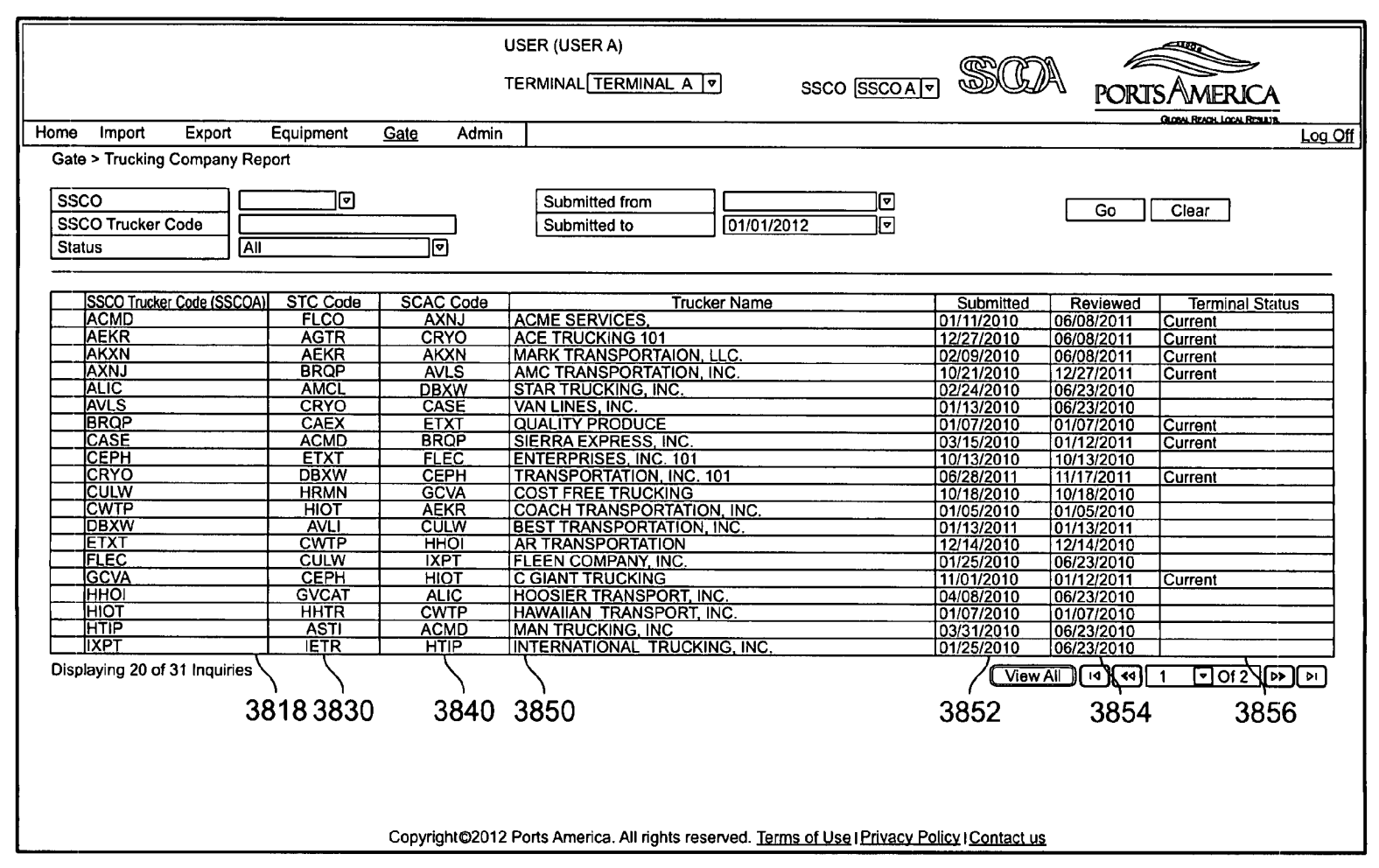

FIG. 38C depicts an illustrative screenshot of a sample Trucking Company Report page. Here, users can query the status of one or more trucking companies, delete new Trucking Company requests, or edit pending trucker codes, by using SSCO trucker code (e.g., field 3818), STC code (e.g., field 3830), SCAC code (e.g., field 3840), trucker name (e.g., field 3850), time of submission and review (e.g., fields 3852 and 3854), and terminal status (e.g., field 3856).

Figure 39A:
FIG. 39A is a diagram of an exemplary administrator or user search interface consistent with one or more aspects of the innovations herein.

FIG. 39A depicts an illustrative diagram of a sample Admin User Search page. Here, administrative users can query users by name (e.g., field 3910), Company Type (e.g., field 3912), Site, Steamship Company or name; delete or lock a user; or edit a user's rights and permissions. Relevant results are shown, including login name (e.g., field 3914), Name of the user (e.g., fields 3916 and 3918), and contact information of the user (e.g., field 3920).

Figure 39B:
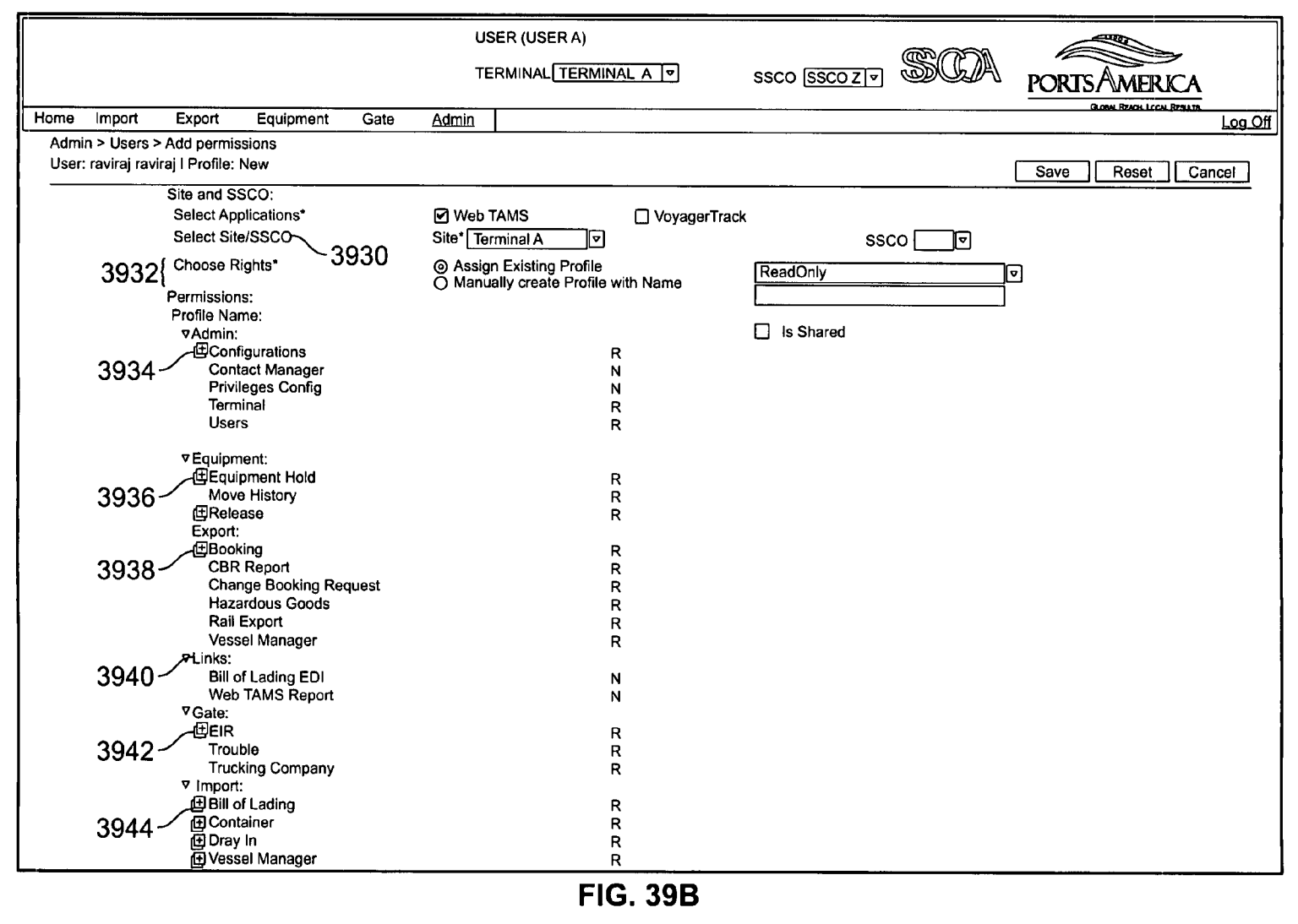

FIG. 39B depicts an illustrative diagram of a sample Admin User Rights page. Here, administrative users can assign users rights for various modules and fields, such as fields 3930, 3932, 3934, 3936, 3938, 3940, 3942 and 3944. Users can have Full rights, Pending rights, Read-Only or No rights to specific functions. In particular, the editable fields are controlled by the Admin functions. For example, most users will not have the right to edit information that needs official approval, for example, customs and USDA status and etc. The accuracy of data entry is ensured for granting authorization at multiple levels. In some embodiments, an end user is granted the right to edit only the fields that the user has intimate knowledge of. For example, an Equipment Control SSCO representative will be granted the rights to edit one or more fields containing information for the trucking companies that do business with their SSCO. A booking department SSCO user, on the other hand, will be granted the rights to edit one or more fields containing information of the booking such as those relate to the origin location, destination, goods type, and quantity, and etc. In some embodiments, accuracy of the data entered is further ascertained by a backend error-checking mechanism against a database containing the relevant information—for example, a database of shipping companies, a database of containers, a database of hazardous goods, a database of trucking companies, and etc. In some embodiments, a user receives a notification if an error is identified. In some embodiments, a user will be granted the rights to review data entries to ensure accuracy. In some embodiments, a user will be granted the rights to correct errors in the data entries.

Figure 40:
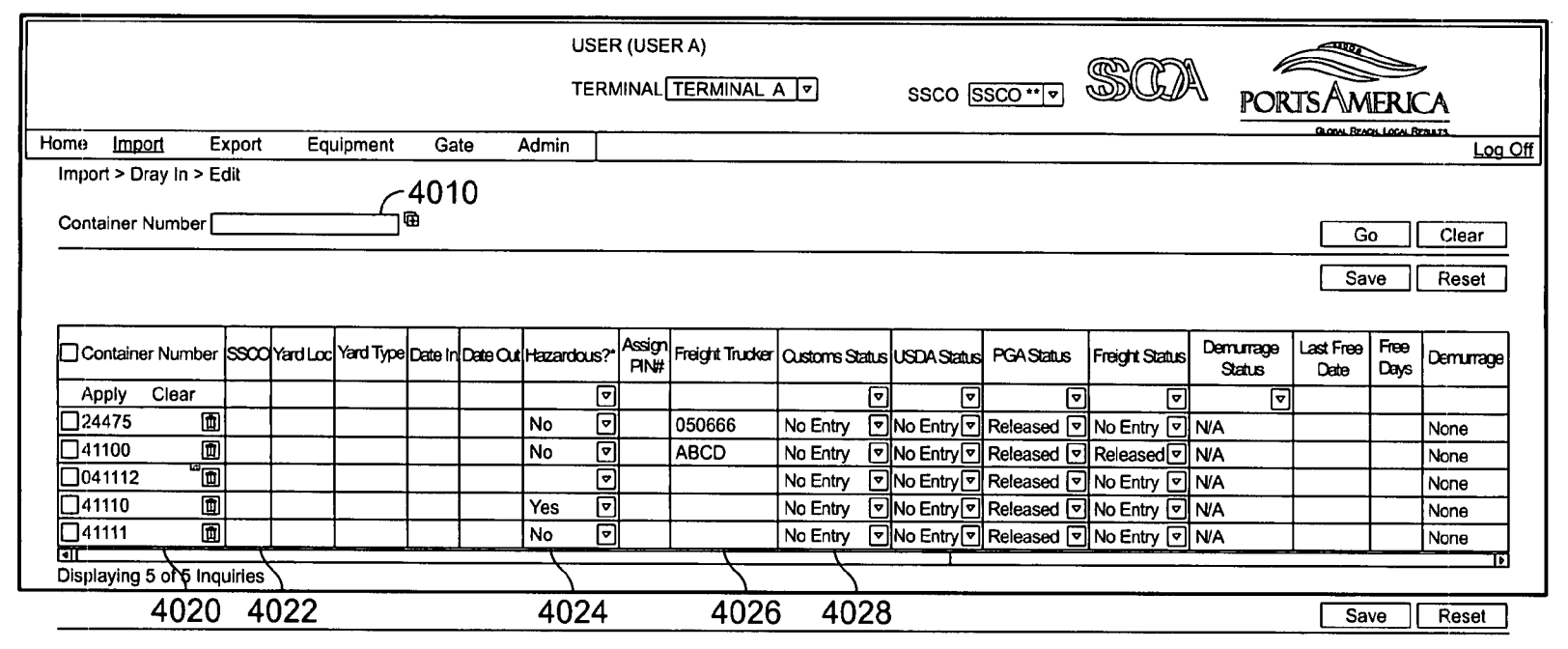

FIG. 40 depicts an illustrative diagram of a sample Dray In Containers page. Here, the user can designate a container for admission to the terminal as a Dray-In to later be picked up as an import. Alternatively, the user can query such containers already received and edit their status by applying known holds. Again, the user can search containers using a container field 4010. Information concerning one or more containers are included in field 4020, listing the corresponding SSCO information (e.g., field 4022), hazardous information (e.g., field 4024), Freight trucker information (e.g., field 4026), customs status (e.g., field 4028), and etc. Regarding the Freight Trucker filed, 4026, the system can provide a link button for each or selected trucking company codes. If the user selects the link, the system can navigate to a Trucker Maintenance screen, such as the one found in FIG. 38A above. And some embodiments allow the system to require certain fields to be filled in before the submission can be saved. For example, if the user forgets or fails to select a "hazardous cargo" 4024 selection, the system can highlight that in red and ask the user to fill in more details. Additionally, a user can also review and edit information concerning the container via one or more editable fields and/or one or more dropdown menu.

Figure 41:
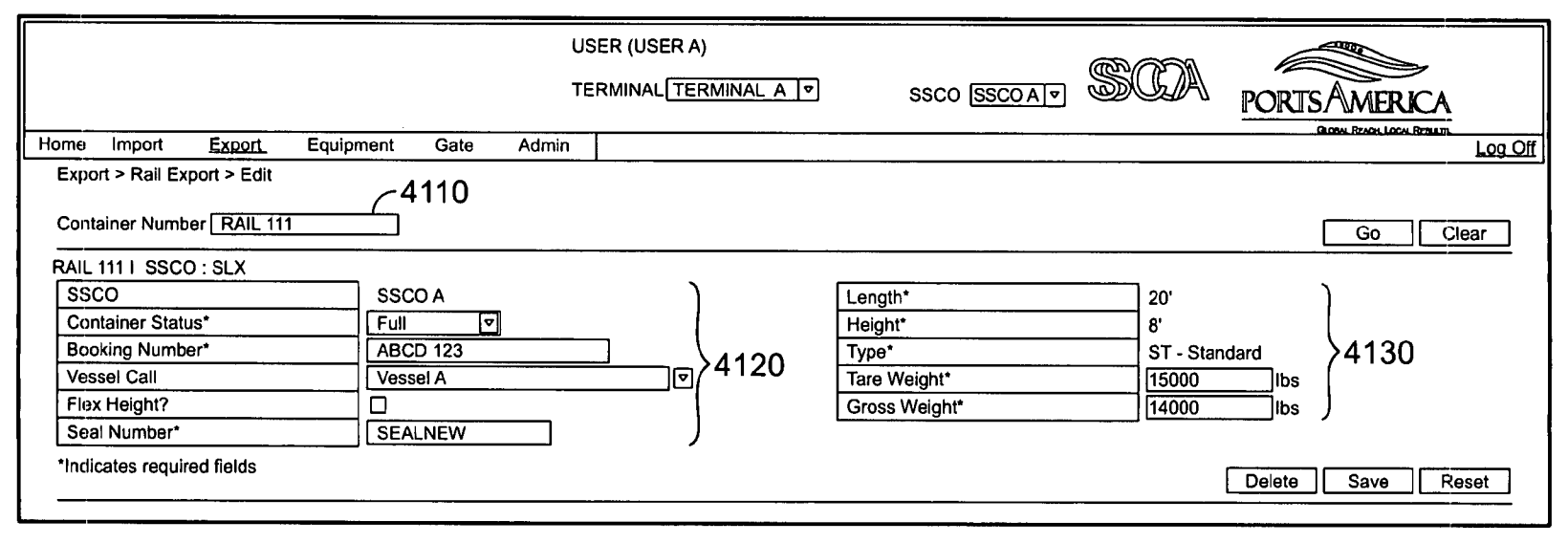

FIG. 41 depicts an illustrative diagram of a sample Rail Exports page. Here, the user can assign a Booking and Vessel call to an anticipated Rail container. Further details for the container, such as size-type, weight and seal number can also be specified. The user can search containers using a container field 4110. Information concerning the rail export such as booking number, vessel call, SSCO, container status are displayed in field 4120. Size and weight information are displayed in field 4130. Here, a user can also review and edit information concerning the rail export via one or more editable fields and/or one or more dropdown menu.

Additional Services/Service Layer Aspects

In addition to the basic architectural features set forth above, the service layer may serve as a baseline for integration for/between various illustrative components that may be associated with the TOS interfaces/Terminal Operating Systems herein, e.g., other web applications and Terminal Operating Systems like M21, with respect to which various implementations herein may communicate. Here, for example, Appendices A, C and D as well as computer program code provided on CD herewith shows how various functionality and information is passed and processed between web applications and M21 via or throughout the service layer. For example, computer program code associated with M21 helping illustrate such features is contained in the "TOS Data Access Library" of the attached compact disc.

With regard to Equipment Interchange Report (EIR) features, generating EIR is data and business logic-intensive process. Many data are collected from one or more TOS databases, such as an M21 database, and archived database(s). Those data are manipulated in various process, and applied business logic to be presented in printed format. Further, gate-activity modules in disparate systems or web applications may implement such processes and maintain them separately. In some implementations, ReportService functionality may be utilized to provide with all data for EIR to be used for presentation but hide details of business logic and data access processes. This improves the maintainability and extensibility of the application.

Implementations and Other Nuances

The innovations herein may be implemented via one or more components, systems, servers, appliances, circuits, other subcomponents, or distributed between such elements. When implemented as a system, such system may comprise, inter alia, components such as software modules, general-purpose CPU, RAM, etc. found in general-purpose computers, and/or FPGAs and/or ASICs found in more specialized computing devices. In implementations where the innovations reside on a server, such a server may include or involve components such as CPU, RAM, etc., such as those found in general-purpose computers.

Additionally, the innovations herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the innovations herein may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

Innovative software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and other media. Computer readable media herein, however, does not encompass/include transitory media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules or other data constituting the functionality herein, embodied in some non-transitory format. Further, communication media may include wired media such as a wired network or direct-wired connection, and wireless media such as acoustic, RF, infrared and other wireless media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission. Also, the modules can be implemented as hardware logic circuitry implementing the functions encompassed by the innovations herein. Finally, the modules can be implemented using special purpose instructions (SIMD instructions), field programmable logic arrays or mixtures of those or other suitable elements which provide the desired level performance and cost.

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though computer readable media herein does not encompass/include transitory media.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the inventions have been specifically described herein, it will be apparent to those skilled in the art to which the inventions pertains that variations and modifications of the various implementations shown and described herein may be made without departing from the spirit and scope of the inventions. Accordingly, it is intended that the inventions be limited only to the extent required by the applicable rules of law.

The invention claimed is:

1. A method for processing information involving terminal operating systems, the method comprising:
   causing, by a presentation layer processor, a TOS-agnostic interface to be displayed to a user, the interface comprising terminal operating system (TOS) management functionality;
   receiving, by the presentation layer processor, an input, via the interface, to manage the TOS management functionality;
   providing, by the presentation layer processor, a TOS-agnostic output, via the interface, indicative of a result of managing the TOS management functionality;
   determining, by a repository factory processor, a TOS type associated with the input from among a plurality of TOS types;

constructing, by the repository factory processor, a repository instance for the TOS type, the constructing comprising selecting a first instance type from a plurality of instance types and resolving an appropriate service for the first instance type, wherein each of the plurality of instance types corresponds to one of the plurality of TOS types;

managing, by a service layer processor, the TOS management functionality, using the repository instance to access a data source, the management generating first data having a TOS-specific format corresponding to the TOS type and data of a data type comprising at least one of reporting data, release data, and bill of lading data;

determining, by a business logic processor, from the data type, an appropriate first business object for processing the first data from among a plurality of business objects, wherein each business object is configured to process data of a specific data type regardless of which TOS-specific format is used for the data of the specific data type;

constructing, by the business logic processor, the first business object using the first data; and generating, by the business logic processor, as a function of the first business object, the TOS-agnostic output through processing of the first data;

wherein the TOS-agnostic interface is the same regardless of which TOS type is determined to be associated with the data source, and wherein at least one of the processors is a hardware processor.

2. The method of claim 1, wherein the first data comprises equipment interchange report (EIR) information including an initial EIR interface and an EIR report summary page linked to the initial EIR interface, the EIR report summary page comprising a summary of information from an actual EIR document.

3. The method of claim 1, wherein the first data comprises equipment interchange report (EIR) information including an initial EIR interface and an image of an associated, actual equipment interchange report, the actual EIR being linked to the initial EIR interface.

4. The method of claim 1, wherein the first data comprises equipment interchange report (EIR) information comprising an initial EIR interface and one or more fields for user selection of container movement activity or options, including Full In, Full Out, Empty In, Empty Out, Chassis In, Chassis Out, Rail In and/or Rail Out.

5. The method of claim 1, wherein the first data comprises equipment interchange report (EIR) information including an initial EIR interface and a list of equipment interchange reports associated with a selected equipment, move type, and/or move date, wherein the list includes a column of buttons that link the user directly to associated, actual equipment interchange reports and/or to summaries of the actual EIRs for each EIR in the list.

6. The method of claim 1, wherein the first data comprises equipment interchange report (EIR) information including an initial EIR interface and an EIR report summary page linked to the initial EIR interface, the EIR report summary page comprising a summary of information from an actual EIR document and one or more images of a trucker who dropped equipment or a container off at a terminal.

7. The method of claim 1, wherein the first data comprises equipment interchange report (EIR) information including an initial EIR interface and an EIR report summary page linked to the initial EIR interface, the EIR report summary page comprising a summary of information from an actual EIR document and a field that contains notes regarding a delivering carrier.

8. The method of claim 1, wherein the first data comprises equipment release information including an initial equipment release interface and a 'copy release' button that creates a copy of a presently displayed equipment release.

9. The method of claim 1, wherein the first data comprises equipment release information including an initial equipment release interface and an 'end date' field including a calendar button that allows the user to select a date an equipment release will expire.

10. The method of claim 1, wherein the first data comprises equipment release information including an initial equipment release interface having a list of containers associated with an equipment release, the list of containers having a column with a flex height selection option associated with each listed container.

11. The method of claim 1, wherein the first data comprises equipment release information including an initial equipment release interface having a service code drop-down menu with selections including Offlease, Out For Repairs, For Sale, and/or Reposition.

12. The method of claim 1, wherein the first data comprises equipment release information including an initial equipment release interface having a booking service drop-down menu with selections including Carrier Unit, Cotton, Daikin Reefer, Dirty Reefer, Door Off, Flatrack, Food Grade, Garment, High Capacity, Lease Only, Mesh Screen Reefer, Metal Scrap, and/or New Reefer.

13. The method of claim 1, wherein the first data comprises equipment release information including an initial equipment release interface having an allowed prefixes graphical user interface selection field, which informs a computing system to execute instructions that provide the computing system with additional processing functionality to guide the user to enter only prefixes that were used previously.

14. The method of claim 1, wherein the first data comprises bill of lading information including a list of containers associated with a bill of lading and administrative information associated with the listed containers, the administrative information including assigned pin number, freight trucker information, and exam trucker information.

15. The method of claim 1, wherein the first data comprises bill of lading information including a list of containers associated with a bill of lading and administrative information associated with the listed containers, the administrative information including a carrier status drop-down menu, a carrier category drop-down menu, and a carrier remark editable field.

16. The method of claim 1, wherein the first data comprises bill of lading information including a list of containers associated with a bill of lading and interface information, the interface information comprising a field for selecting an action, an apply button, and a graphical user interface feature that allows the user to select multiple containers from the list of containers and apply the selected action to the selected containers by selecting the apply button.

17. The method of claim 1, wherein the first data comprises bill of lading information including a list of containers associated with a bill of lading and administrative information associated with the listed containers, the administrative information comprising demurrage information including a demurrage status drop-down menu, a free days column, and a demurrage rate code drop-down menu.

18. The method of claim 1, wherein the first data comprises bill of lading information including a list of containers associated with a bill of lading and a popup graphical user interface tool, wherein the popup graphical user interface tool includes a field into which lists of multiple containers may be entered and/or pasted, and a discharge priority field for discharging priority of selected container(s).

19. The method of claim 18 wherein the discharge priority field comprises a drop-down menu of selectable options for discharging priority of the selected container(s).

20. The method of claim 1, wherein the first data comprises bill of lading information including a list of containers associated with a bill of lading, wherein updates to the bill of lading are applied to all of the containers in the list of containers associated with the bill of lading.

21. The method of claim 1, further comprising:
processing, by the business logic processor, the TOS-agnostic output into formatted second data having the TOS-specific format; and
transmitting, by the service layer processor, the formatted second data to the data source.

22. A computing system for processing information involving terminal operating systems, the computing system comprising:
a presentation layer processor configured to:
cause a TOS-agnostic interface to be displayed to a user, the interface comprising terminal operating system (TOS) management functionality;
receive an input, via the interface, to manage the TOS management functionality; and
provide a TOS-agnostic output, via the interface, indicative of a result of managing the TOS management functionality;
a repository factory processor configured to:
determine a TOS type associated with the input from among a plurality of TOS types; and
construct a repository instance for the TOS type, the constructing comprising selecting a first instance type from a plurality of instance types and resolving an appropriate service for the first instance type, wherein each of the plurality of instance types corresponds to one of the plurality of TOS types;
a service layer processor configured to manage the TOS management functionality, using the repository instance to access a data source, the management generating first data having a TOS-specific format corresponding to the TOS type and data of a data type comprising at least one of reporting data, release data, and bill of lading data; and
a business logic processor configured to:
determine, from the data type, an appropriate first business object for processing the first data from among a plurality of business objects, wherein each business object is configured to process data of a specific data type regardless of which TOS-specific format is used for the data of the specific data type;
construct the first business object using the first data; and
generate, as a function of the first business object, the TOS-agnostic output through processing of the first data;
wherein the TOS-agnostic interface is the same regardless of which TOS type is determined to be associated with the data source, and wherein at least one of the processors is a hardware processor.

23. The computing system of claim 22, wherein:
the business logic processor is further configured to process the TOS-agnostic output into formatted second data having the TOS-specific format; and
the service layer processor is further configured to transmit the formatted second data to the data source.

24. The computing system of claim 22, wherein the first data comprises equipment interchange report (EIR) information including an initial EIR interface and an EIR report summary page linked to the initial EIR interface, the EIR report summary page comprising a summary of information from an actual EIR document.

25. The computing system of claim 22, wherein the first data comprises equipment interchange report (EIR) information including an initial EIR interface and an image of an associated, actual equipment interchange report, the actual EIR being linked to the initial EIR interface.

26. The computing system of claim 22, wherein the first data comprises equipment interchange report (EIR) information comprising an initial EIR interface and one or more fields for user selection of container movement activity or options, including Full In, Full Out, Empty In, Empty Out, Chassis In, Chassis Out, Rail In and/or Rail Out.

27. The computing system of claim 22, wherein the first data comprises equipment interchange report (EIR) information including an initial EIR interface and a list of equipment interchange reports associated with a selected equipment, move type, and/or move date, wherein the list includes a column of buttons that link the user directly to associated, actual equipment interchange reports and/or to summaries of the actual EIRs for each EIR in the list.

28. The computing system of claim 22, wherein the first data comprises equipment interchange report (EIR) information including an initial EIR interface and an EIR report summary page linked to the initial EIR interface, the EIR report summary page comprising a summary of information from an actual EIR document and one or more images of a trucker who dropped equipment or a container off at a terminal.

29. The computing system of claim 22, wherein the first data comprises equipment interchange report (EIR) information including an initial EIR interface and an EIR report summary page linked to the initial EIR interface, the EIR report summary page comprising a summary of information from an actual EIR document and a field that contains notes regarding a delivering carrier.

30. The computing system of claim 22, wherein the first data comprises equipment release information including an initial equipment release interface and a 'copy release' button that creates a copy of a presently displayed equipment release.

31. The computing system of claim 22, wherein the first data comprises equipment release information including an initial equipment release interface and an 'end date' field including a calendar button that allows the user to select a date that an equipment release will expire.

32. The computing system of claim 22, wherein the first data comprises equipment release information including an initial equipment release interface having a list of containers associated with an equipment release, the list of containers having a column with a flex height selection option associated with each listed container.

33. The computing system of claim 22, wherein the first data comprises equipment release information including an initial equipment release interface having a service code drop-down menu with selections including Offlease, Out For Repairs, For Sale, and/or Reposition.

34. The computing system of claim 22, wherein the first data comprises equipment release information including an initial equipment release interface having a booking service drop-down menu with selections including Carrier Unit, Cotton, Daikin Reefer, Dirty Reefer, Door Off, Flatrack, Food Grade, Garment, High Capacity, Lease Only, Mesh Screen Reefer, Metal Scrap, and/or New Reefer.

35. The computing system of claim 22, wherein the first data comprises equipment release information including an initial equipment release interface having an allowed prefixes graphical user interface selection field, which informs the computing system to execute instructions that provide the computing system with additional processing functionality to guide the user to enter only prefixes that were used previously.

36. The computing system of claim 22, wherein the first data comprises bill of lading information including a list of containers associated with a bill of lading and administrative information associated with the listed containers, the administrative information including assigned pin number, freight trucker information, and exam trucker information.

37. The computing system of claim 22, wherein the first data comprises bill of lading information including a list of containers associated with a bill of lading and administrative information associated with the listed containers, the administrative information including a carrier status drop-down menu, a carrier category drop-down menu, and a carrier remark editable field.

38. The computing system of claim 22, wherein the first data comprises bill of lading information including a list of containers associated with a bill of lading and interface information, the interface information comprising a field for selecting an action, an apply button, and a graphical user interface feature that allows the user to select multiple containers from the list of containers and apply the selected action to the selected containers by selecting the apply button.

39. The computing system of claim 22, wherein the first data comprises bill of lading information including a list of containers associated with a bill of lading and administrative information associated with the listed containers, the administrative information comprising demurrage information including a demurrage status drop-down menu, a free days column, and a demurrage rate code drop-down menu.

40. The computing system of claim 22, wherein the first data comprises bill of lading information including a list of containers associated with a bill of lading and a popup graphical user interface tool, wherein the popup graphical user interface tool includes a field into which lists of multiple containers may be entered and/or pasted and a discharge priority field for discharging priority of selected container(s).

41. The computing system of claim 40, wherein the discharge priority field comprises a drop-down menu of selectable options for discharging priority of the selected container(s).

42. The computing system of claim 22, wherein the first data comprises bill of lading information including a list of containers associated with a bill of lading, wherein updates to the bill of lading are applied to all of the containers in the list of containers associated with the bill of lading.

\* \* \* \* \*